US008686596B2

(12) United States Patent
Huss et al.

(10) Patent No.: US 8,686,596 B2
(45) Date of Patent: Apr. 1, 2014

(54) FUSE BOX SYSTEM AND METHOD

(76) Inventors: Roy Allen Huss, Cleveland, NC (US); Jerry Anthony Dufour, Salisbury, NC (US); Kevin Mark Klughart, Denton, TX (US)

( * ) Notice: Subject to any disclaimer, the term of this patent is extended or adjusted under 35 U.S.C. 154(b) by 594 days.

(21) Appl. No.: 12/931,120

(22) Filed: Jan. 25, 2011

(65) Prior Publication Data

US 2011/0140902 A1 Jun. 16, 2011

Related U.S. Application Data

(63) Continuation-in-part of application No. 12/728,981, filed on Mar. 22, 2010, now Pat. No. 8,395,473, which is a continuation-in-part of application No. 11/169,467, filed on Jul. 8, 2008, now Pat. No. 7,683,752, which is a continuation-in-part of application No. 11/620,243, filed on Jan. 5, 2007, now abandoned.

(51) Int. Cl.
*H02J 1/00* (2006.01)

(52) U.S. Cl.
USPC ............. 307/86; 307/117; 307/126; 337/206; 337/265; 337/198; 340/639; 340/638; 340/517; 361/94; 361/752

(58) Field of Classification Search
CPC ............. H02J 1/10; H02B 11/26; H01H 9/10; H01H 9/104
USPC ............ 307/86; 340/639, 638, 644, 641, 642; 361/55, 56, 91, 104, 103, 752, 833; 337/242, 206
See application file for complete search history.

(56) References Cited

U.S. PATENT DOCUMENTS

| | | | | | |
|---|---|---|---|---|---|
| H248 | H | * | 4/1987 | Middlebrooks | 340/639 |
| 4,926,281 | A | * | 5/1990 | Murphy | 361/55 |
| 5,581,130 | A | | 12/1996 | Boucheron | |
| 5,659,283 | A | * | 8/1997 | Arratia | 337/206 |
| 5,835,324 | A | | 11/1998 | Hatton | |
| 6,775,148 | B2 | * | 8/2004 | Hong | 361/752 |
| 7,161,782 | B2 | | 1/2007 | Junteunen et al. | |
| 7,683,752 | B1 | | 3/2010 | Huss | |
| 2006/0285280 | A1 | | 12/2006 | Shyu | |

* cited by examiner

*Primary Examiner* — Fritz M Fleming
*Assistant Examiner* — Jagdeep Dhillon
(74) *Attorney, Agent, or Firm* — David W. Carstens; Kevin M. Klughart; Carstens & Cahoon, LLP

(57) ABSTRACT

A fuse box system and method providing for visual and/or remote sensing of interrupted fusing elements is disclosed. The system incorporates LEDs and/or remote sensing apparatus to permit indication of a "blown" fuse and/or circuit protection breaker. This system may be configured for both polarized and/or non-polarized applications and generally provides for indicator illumination when a fuse/breaker is blown. Some preferred embodiments may incorporate current sourcing technologies to permit operation of the system over wide range of system voltages, as well as provisions for wired and/or RF/wireless interrogation of the fuse/breaker status. Alternate embodiments including systems/methods to permit remote sensing of fuse status and/or circuit current monitoring, and may be retrofit within existing fuse/breaker panel systems in some configurations.

80 Claims, 40 Drawing Sheets

1300

1500

FUSE BOX SYSTEM AND METHOD

CROSS REFERENCE TO RELATED APPLICATIONS

This patent application is a Continuation-In-Part of patent application Ser. No. 12/728,981 for FUSE BOX SYSTEM, filed on Mar. 22, 2010, now U.S. Pat. No. 8,395,473 which was a Continuation-In-Part of application Ser. No. 12/169,467 filed on Jul. 8, 2008 now U.S. Pat. No. 7,683,752. Applicants claim benefit pursuant to 35 U.S.C. §120 and hereby incorporate by reference these patent applications.

Application Ser. No. 12/169,467 matured to U.S. Pat. No. 7,683,752 and issued on Mar. 23, 2010 and was a Continuation-In-Part of application Ser. No. 11/620,243 filed on Jan. 5, 2007, now abandoned. Applicants claim benefit pursuant to 35 U.S.C. §120 and hereby incorporate by reference these patent applications.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention concerns that of a new and improved fuse box system that combines a series of specially designed fuses in a fuse box that allows an individual to see if one or more particular fuses within the fuse box is broken.

The present invention is related to the field of electrical circuit fuse protection systems and methods, generally described in (but not limited to) U.S. Patent Classifications 337/206, 361/626, 361/752, and 439/620.26. These systems generally support a wide variety of "blade fuses" and the like, including but not limited to automotive fuses such as ATC blade fuses, MINI blade fuses, and MAXI blade fuses.

DESCRIPTION OF THE PRIOR ART

The field of prior art associated with fuse protection systems and methods generally embodies a fusible link having a resistive fuse element that "blows" or melts when the thru current sourced by a voltage source (battery, DC power supply, AC power source, etc.) and sinked by a resistive and/or reactive load exceeds a predetermined level. Other embodiments of this basic technology include a wide variety of circuit breakers that are essentially thermally/mechanically activated switches which break circuit connectivity when the load draws more than a predetermined amount of current.

Inherent in all these prior art approaches is the limitation that when a fuse "blows" or a circuit breaker trips there is generally little if any visual indication that the circuit has been compromised, other than the possibility that the load is inactive in instances where the load may provide a visual indication of circuit activity (electric lights, motors, etc.). This generally creates a problem in locating blown fuses and tripped circuit breakers in system configurations where there are a large number of circuit protection devices. This situation is exacerbated in situations where fuse panels and/or circuit breaker panels are geographically diverse within a given installation or within a given electrical context. For example, fuse panels may be spread about systems within an automotive context and circuit breaker panels may be spatially diverse within the context of a building or campus facility.

This deficiency in the prior art in many circumstances makes it difficult to diagnose circuit failures within a system context, because it is difficult if not impossible to visually inspect a fuse while installed to determine if it is blown. In each case the fuse must be removed and visually inspected or checked with a continuity tester. This deficiency can result in safety issues if critical safety systems are disabled because of fuse failures and there is no notification given that this has occurred.

Deficiencies in the Prior Art

One approach to solving this notification problem in the context of fuse systems is the use of a visible LED/resistor combination in parallel with the fusible link such that if the fusible link melts, current that would normally flow through the fusible link is diverted through a series LED/resistor combination that illuminates indicating a fuse failure. This approach is detailed within U.S. Pat. No. 7,683,752 and subsequent CIP patent application Ser. No. 12/728,981 and is hereby incorporated herein by reference.

A critical problem with this approach is that the LED will not be illuminated if the load causes the fuse to fail and the load goes open, inactive, or subsequently draws less current than required to visibly activate the LED through the series resistor. Thus, these prior art approaches while providing a visual indicator of fuse failure in some circumstances, fail to totally solve the problem of providing a visual indicia of fuse failure in all circumstances.

Other deficiencies in the prior art include an inability to monitor the load current through the fuse/breaker for the purposes of diagnosing possible circuit problems in advance of a fuse/breaker failure. Other drawbacks with using parallel LED/resistor combinations include limitations on the supply voltage for which the fuse/LED combination can be used, as the series resistor/LED combination is only viable over a narrow range of supply voltages, outside of which the LED has a significantly reduced lifespan. Another practical issue associated with all of these configurations is that once the fuse has blown, the fuse must be replaced for the circuit to be reactivated. In the field it is often the case that spare fuses are not available, making repair of these systems without readily available spare parts problematic.

Within the context of fuses and fuse box systems, the prior art does not generally teach the retrofit of existing fuse panels and/or breaker panels with systems capable of reporting fuse failures.

OBJECTIVES OF THE INVENTION

The present invention, while not being limited by the following list, can in some embodiments achieve one or more of the following objectives:

To provide a fuse box system which has all of the advantages of the prior art and none of the disadvantages.

To provide a fuse box system that may be easily and efficiently manufactured and marketed.

To provide a fuse box system that is of durable and reliable construction.

To provide a fuse box system that is economically affordable and available for relevant market segment of the purchasing public.

To provide a fuse box system that provides visual indication of fuse failure irrespective of load status.

To provide a fuse box system that permits remote interrogation of fuse status.

To provide a fuse box system that permits reuse of fuses after they have been blown.

To provide a fuse box system that can operate over a wide range of supply voltages.

To provide a fuse box system that may be retrofit into existing circuit breaker panels.

To provide a fuse box system that permits individual fused circuits to be programmed as to their fuse trip point.

To provide a fuse box system that permits all fusing elements within a fuse box to be identically constructed as to their fusing trip point.

To provide a fuse box system that prohibits replacement of a fuse with one of a higher rating.

Other objects, features, and advantages of the present invention will become more readily apparent from the following detailed description of the preferred embodiment when considered with the attached drawings and appended claims.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

System Context (0100)

As generally illustrated in FIG. 1 (0100), the general system context of the present invention may be illustrated wherein a voltage source (0110) sources current that passes through a fuse box (0120) and is sinked by a switched or unswitched load (0130). Within this context, a current return path (ground) (0140) is utilized between the source (0110) and sink (0130) and may be available for use by the fuse box system (0120). The present invention as represented by the fuse box system (0120) herein may incorporate a wide variety of features, including but not limited to a "Fusing" Element (or circuit breaker), Blown/Tripped Sensor, Blown Fuse Indicator(s), Load Sensing, Status Reporting and/or System Interrogation, ID/Circuit Tagging, etc.

Overview

The present invention concerns that of a new and improved fuse box system that combines a series of specially designed fuses in a fuse box that allows an individual to see if one or more particular fuses within the fuse box is blown/broken. The fuse has one of several different configurations, depending on whether the fuse is used in a system that is used in a polarized or non-polarized system. In each scenario, the fuse includes a number of diodes, including a plurality if light emitting diode (LED) that will be illuminated when the fuse is working and will not be illuminated when the fuse is broken and/or not working. Another embodiment utilizes only the light emitting diodes, which reduces heat generated and voltage drop to eventually what is called the load from the other embodiment.

There has thus been outlined, rather broadly, the more important features of a fuse box system that the detailed description thereof that follows may be better understood and in order that the present contribution to the art may be better appreciated. There are, of course, additional features of the fuse box system that will be described hereinafter and which will form the subject matter of the claims appended hereto.

In this respect, before explaining at least one embodiment of the fuse box system in detail, it is to be understood that the fuse box system is not limited in its application to the details of construction and to the arrangements of the components set forth in the following description or illustrated in the drawings. The fuse box system is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present fuse box system. It is important, therefore, that the claims be regarded as including such equivalent constructions insofar as they do not depart from the spirit and scope of the present invention.

Generalized System Architecture (0200)

Given the foregoing teachings of the present invention system components, the generalized system architecture for the present invention can be viewed as described in FIG. 2 (0200). In this context, the fuse box system comprises the following elements:

(a) A fuse status sensor (0211) that senses the output voltage status of a fuse and generates an output voltage proportional to the fuse output voltage;

(b) A reference voltage (0212) generator that generates a reference voltage proportional to the fuse input voltage;

(c) A comparator (0213) that compares the fuse status sensor output voltage to the reference voltage and generates an output based on this comparison; and (d) A fuse status indicator (0214) that accepts the output of the comparator and provides a status indication of the fuse based on the comparator output;

wherein the fuse input voltage is derived from a voltage source;

the fuse output voltage sources a load.

One skilled in the art will recognize that these embodiment components may be applied to invention methods discussed herein as well.

BRIEF DESCRIPTION OF THE DRAWINGS

For a fuller understanding of the advantages provided by the present invention, reference should be made to the following detailed description together with the accompanying drawings wherein.

DESCRIPTION OF THE PRESENTLY PREFERRED EXEMPLARY EMBODIMENTS

Figure 1:
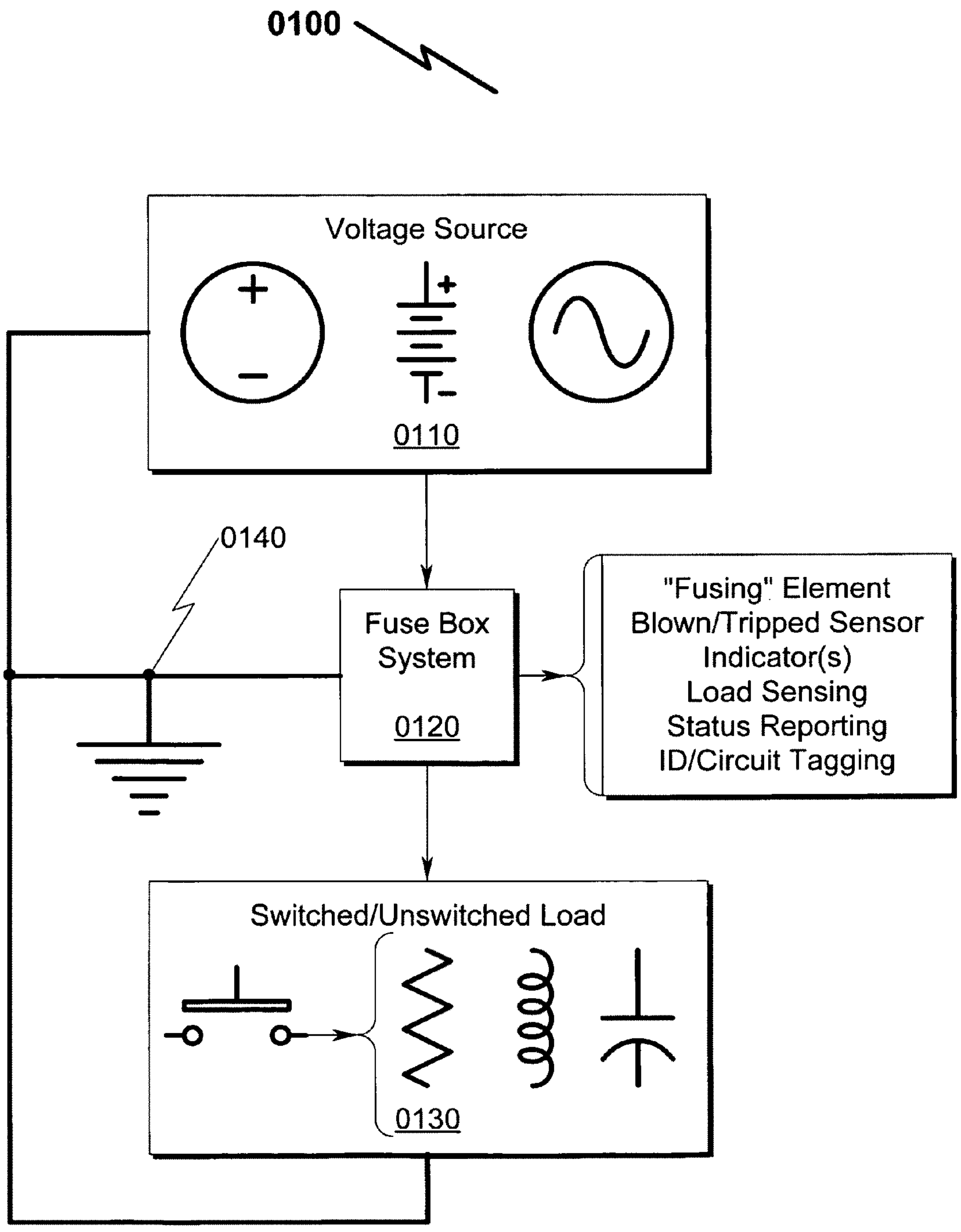
FIG. 1 illustrates a general system block overview of a preferred exemplary embodiment of the present invention.
Figure 2:
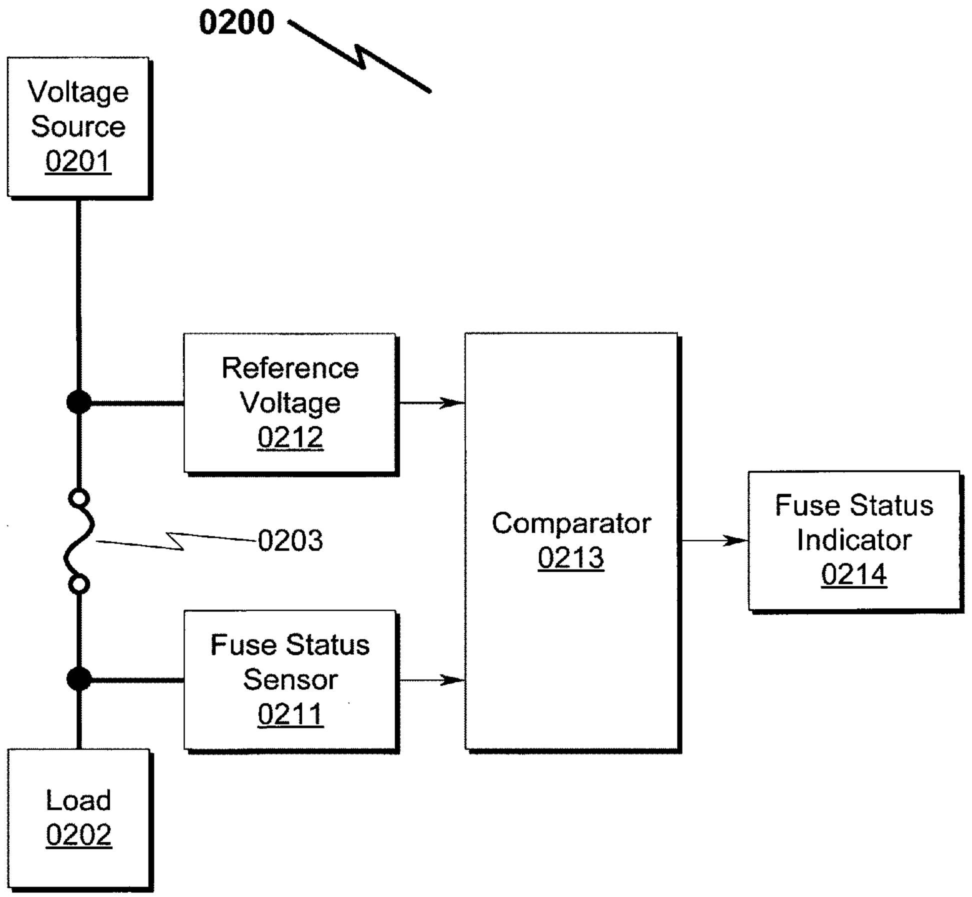
FIG. 2 illustrates a generalized system block diagram of the core components of a preferred exemplary embodiment of the present invention.
Figure 3:
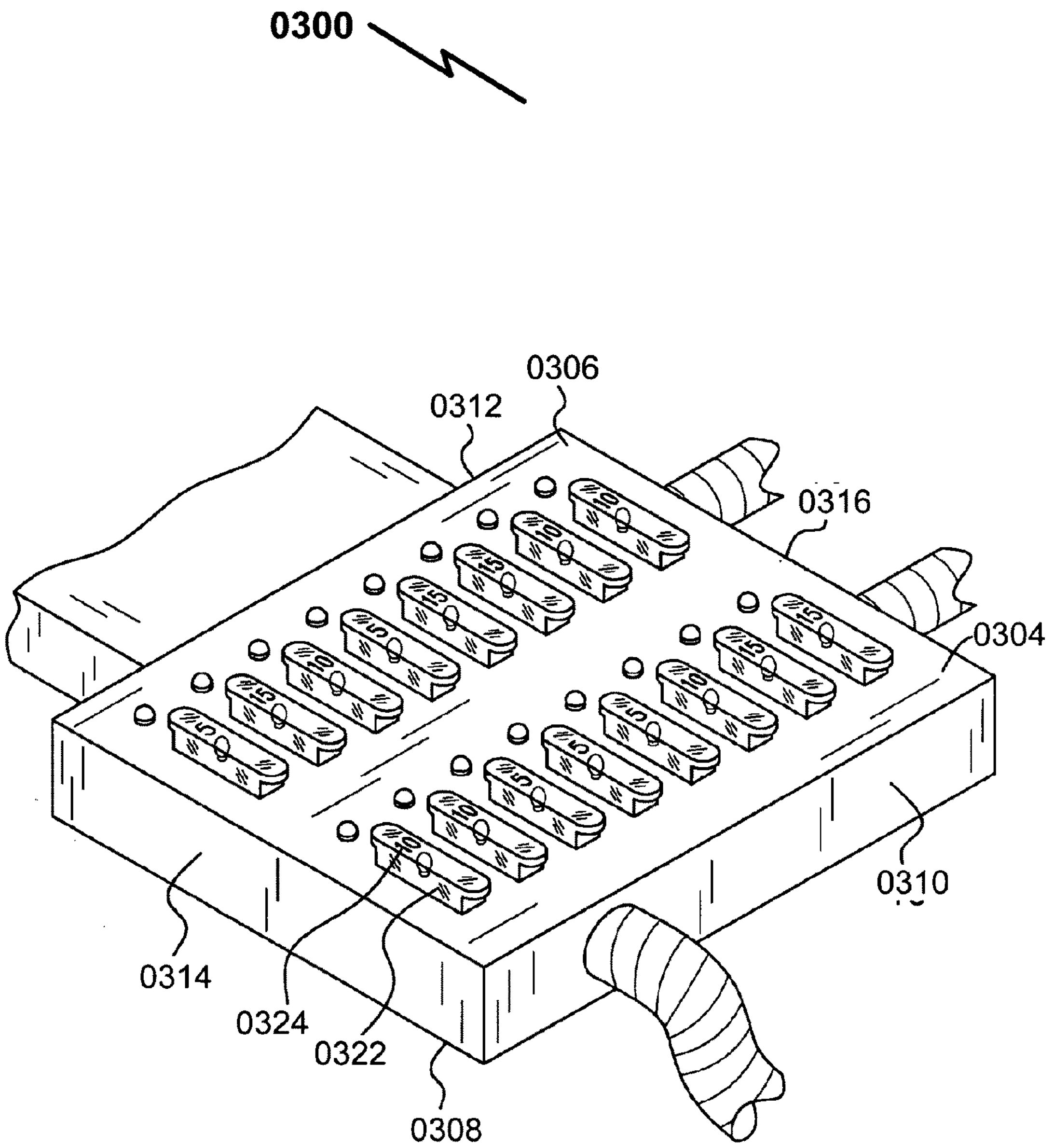
FIG. 3 illustrates a perspective view of a preferred exemplary embodiment of the present invention.

While the present invention is susceptible of embodiment in many different forms, there is shown in the drawings and will herein be described in detailed preferred embodiment of the present invention with the understanding that the present disclosure is to be considered as an exemplification of the principles of the present invention and is not intended to limit the broad aspect of the present invention to the embodiment illustrated.

The numerous innovative teachings of the present application will be described with particular reference to the presently preferred embodiment, wherein these innovative teachings are advantageously applied to the particular problems of a FUSE BOX SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Fuse Not Limitive

The present invention anticipates that the term "fuse" as used within the context of the invention should be broadly construed to include any current and/or voltage controlled switch used for the purposes of protecting electrical circuits and/or for the purposes of providing safety for individuals and/or property. As such, this term includes the use of conventional circuit breakers as well as other non-mechanical circuit protection devices as described herein.

Thus, terminologies used within to describe "blown" fuses may also be applied to "tripped" circuit breakers or deactivated current and/or voltage controlled switches used for the purpose of protecting electrical circuits and/or for the purposes of providing safety for individuals and/or property.

Fuse Identification Not Limitive

The systems described herein anticipate the use of ROM and/or FLASH memory or other memory storage technologies to store identifying information regarding each fuse that is the subject of status reporting. This permits, for example, in the case of the breaker panel retrofit described herin, for the tripped breaker to have associated with it a text string indicating the load that has tripped the breaker or the load for which current sensing is being performed.

Rather than just indicating "breaker 24 in panel 12 in building 5 of the Dallas, Tex. facility located at 1022 Mockingbird Lane" the system with individual fuse/breaker identification would be able to additionally indicate "Air Compressor located in Room 23, Shop Area" with this information being stored in the individual fuse sensor status reporting module and/or integrated breaker system as described above.

One skilled in the art will recognize that the generic wireless transmitters and wireless receivers discussed herein can be modified to incorporate wireless transceiver operation, permitting fuse identifying information to be entered via a keyboard and stored in the individual fuse sensor elements using a wide variety of memory storage technologies. Thus, the fusing systems described herein are amenable to a wide variety of identification systems, some of which are specifically anticipated to be programmable, and some of these may be optimally programmable in-circuit while the fusing system is in operation.

Voltage Source Not Limitive

The present invention anticipates that the term "voltage source" as used within the context of the invention should be broadly construed to include any type of element or system capable of sourcing voltage/current to a fuse element. Thus, this definition is not limited to DC or AC systems, and may incorporate polyphase AC systems in some embodiments.

Visual Indicator Not Limitive

The present invention anticipates that the term "visual indicator" and/or "status indicator" as used within the context of the invention should be broadly construed to include any type of element or system capable of displaying an indicia capable of being interpreted by a human. While in many preferred embodiments, this term preferably refers to a Light Emitting Diode (LED), it could also encompass more complex systems such as flat panel displays, Personal Computers, and the like. The present invention also anticipates that the use of the term "indicator" or "visual indicator" may include an audio indicator/indicia with or without the use of a visual indicia of fuse status.

LED Indicia Not Limitive

One skilled in the art will recognize that the use of a LED fuse status indicia within the context of the present invention presents the possibility that LEDs of different colors (and multi-color LEDs) may be utilized in some circumstances to provide additional visual indicators as to the system status and status of a given fused circuit. Thus, the present invention specifically anticipates the use of colored LEDs and multi-colored LEDs to covey information visually to the system operator, either singly or in multi-LED combinations.

OTA/OPAMP Not Limitive

The present invention anticipates that the terms "OTA" and "OPAMP" may be used interchangeably in many contexts in which the functionality of a comparator is required within a given system embodiment. The main difference in these topologies is the use of current mode versus voltage mode outputs which are interchangeable in many system contexts. One skilled in the art will recognize that these distinctions are one of circuit design selection and do not limit the teaching scope of the present invention.

Controlled Current Source Not Limitive

The present invention anticipates that the term "current source" should be given its widest possible definition and that a wide variety of voltage and/or current controlled current sources are known in the art and a wide variety of these may be applicable to a given embodiment of the present invention.

CMOS Not Limitive

The present invention anticipates that the descriptions herein utilizing CMOS integrated circuit topologies may be equally embodied in other circuit paradigms (Bipolar, BiCMOS, etc.) without loss of breadth in the teachings of the present invention.

Circuit Polarity Not Limitive

The present invention anticipates that the descriptions herein utilizing a particular circuit polarity/topology may be readily replaced with their equivalent dual polarity with no loss of generality in the teachings of the present invention. Thus, NPN transistors may be substituted for PNP devices and visa versa, as well as MOSFET NCH/PCH transistor substitutions along with NPN/NCH and PNP/PCH substitutions, etc., as well known to those skilled in the art.

Fuse ID Not Limitive

The present invention anticipates that in many preferred embodiments the fuse elements may have their own unique identifying ID code that may be unique to the fuse, the circuit being serviced by the fuse, and/or generically associated with the circuit/module/product associated with the electrical circuit. In this fashion circuits and/or modules may be serialize to track changes and modifications/revisions as well as provide generic information on the circuit that has failed and/or the module being tested for fuse continuity.

One skilled in the art will recognize that a wide variety of memory technologies are suitable for this ID function, including ROM, NVRAM, FLASH, etc. Some preferred exemplary embodiments may make use of the MAXIM Electronics models DS2401 and DS2411 Silicon Serial Number or the like, however, one skilled in the art will recognize that the teachings of the present invention are not limited to these types of serial number methodologies. One skilled in the art will recognize that ROM based serial number technologies may be matched to other information within computer database structures to match unique serial numbers to generic model numbers, product information, and circuit identifiers in some circumstances with no loss of generality in the teachings of the present invention.

Computer Not Limitive

The present invention anticipates that in many preferred embodiments a human interactive device may be optimally integrated into the invention. This device may generally take the form of a computer system that should be widely interpreted to include but not be limited to desktop computers, laptops, computer tablets, smartphones, cellphones, and handheld portable computing devices.

General System Overview (0300)

With reference now to the drawings, and in particular to FIG. 1 through FIG. 12, a fuse box system embodying the principles and concepts of the present invention and generally designated by the reference numeral (0300) will be described.

As best illustrated in FIG. 1 through FIG. 11, the fuse box system (0300) comprises an outer casing (0304) that has two surfaces comprising an upper surface (0306) and a lower surface (0308). The outer casing (0304) also includes a front side surface (0310), a rear side surface (0312), a left side surface (0314), and a right side surface (0316).

The fuse box system (0300) includes at least one incoming power line (0318) and at least one outgoing power line (0320). Preferably, the fuse box system (0300) has three separate outgoing power lines (0320).

A plurality of fuses (0322) are inserted through the upper surface (0306) of the outer casing (0304) and partially stick out of the upper surface (0306) of the outer casing (0304). Each fuse has a numerical designation (0324) on it to designate the particular maximum amps that it can tolerate before it will short out (blow) and need to be replaced.

Figure 4:
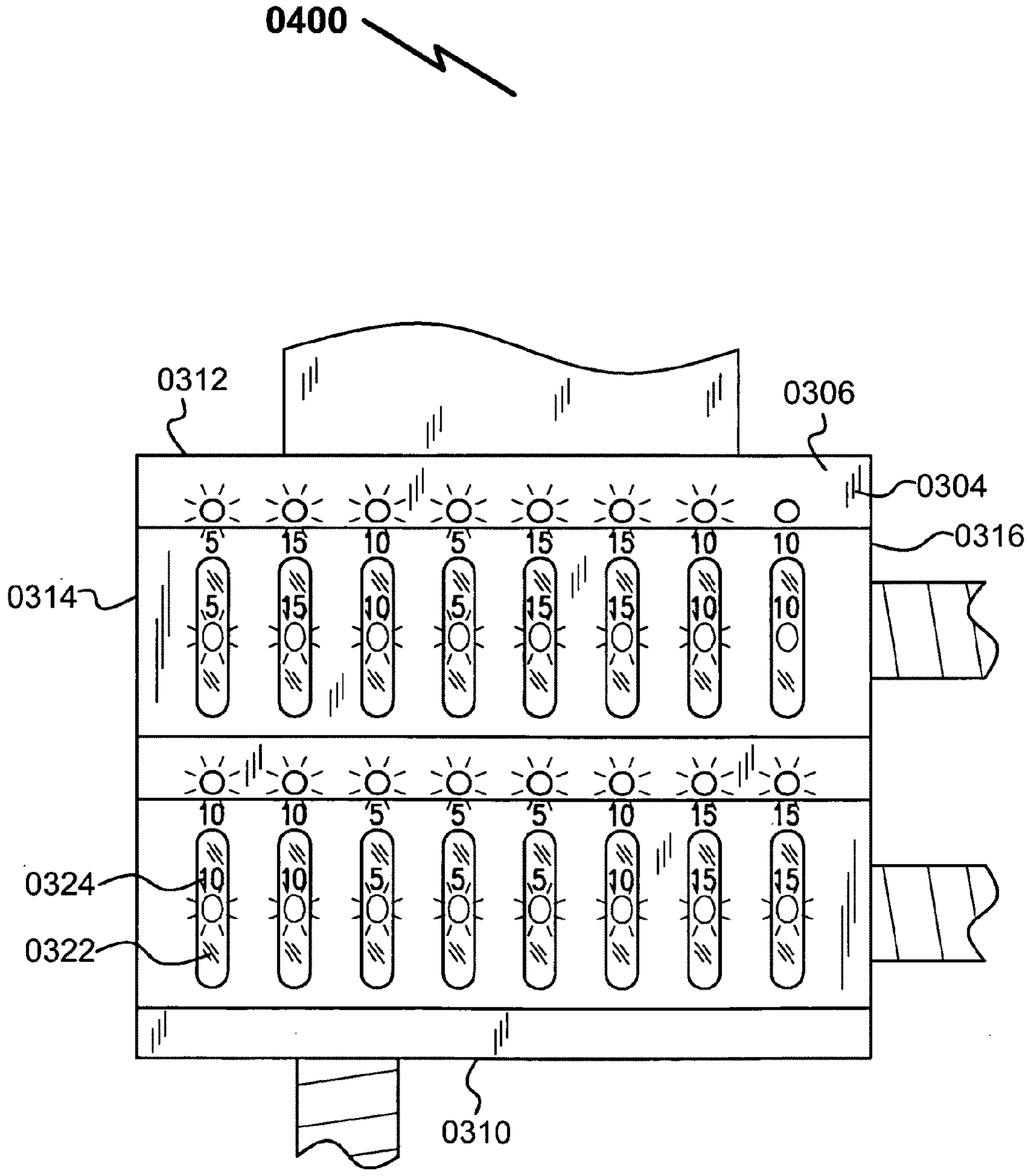
FIG. 4 illustrates a top view of a preferred exemplary embodiment of the present invention.

In a polarized system fuse (0426), as represented in FIG. 4, the incoming power line (0418) inputs electricity into the fuse box system (0300), while each of the outgoing power lines (0420) sends power outward away from the fuse box system. In a non-polarized system, the power line designated as number (0418) in FIG. 4 and FIG. 5 can be either the incoming power line or the outgoing power line, while the power line designated as item number (0420) would be the opposite that of item number (0418).

Figure 5:
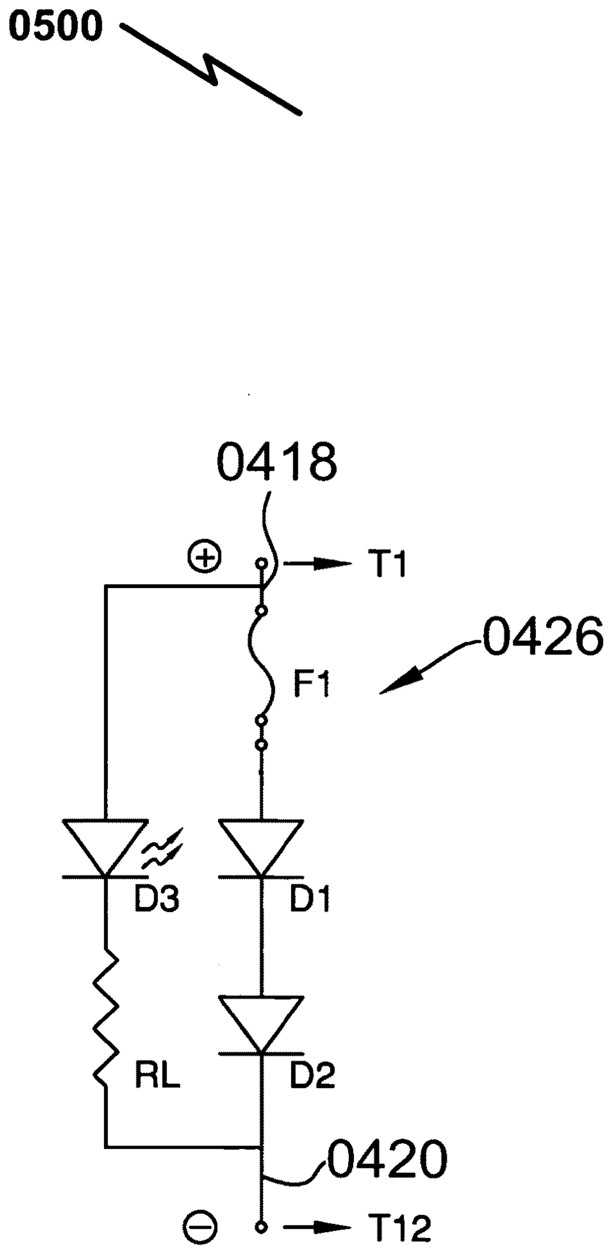
FIG. 5 illustrates the electronic layout located within a fuse that is used with a polarized electrical system utilized in some preferred exemplary embodiments of the present invention.

Referencing FIG. 5 (0500), the electronic schematic for the polarized system is shown. Current passes through the system from T1 to T12. Three diodes are present, designated as diodes D1, D2, and D3. D1 and D2 are shown to be in series with one another, while D3 is in parallel to D1 and D2. In series with D3 is a resistor designated as RL that acts as a current limiting resistor. D3 is a light emitting diode (LED).

Normally, current passes through D1 and D2 to the presence of less resistance. However, once D1 and/or D2 is broken or does not function, the current's only path is through "the path of greater resistance"—through D3. Once the current passes through D3 in a large enough degree, the D3 will light up, allowing an individual to see that the polarized system fuse (0526) is broken and needs to be replaced.

Figure 6:
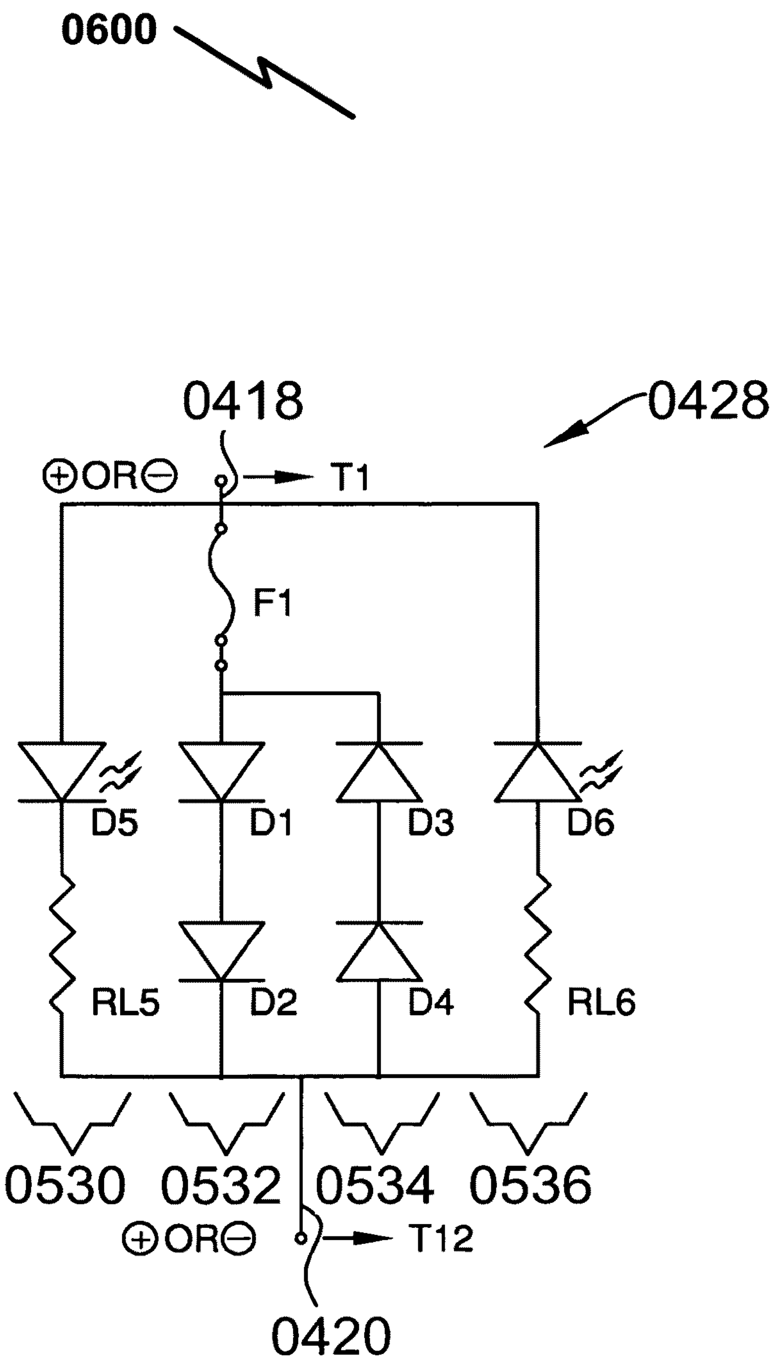
FIG. 6 illustrates the electronic layout located within a fuse that is used with a non-polarized electrical system utilized in some preferred exemplary embodiments of the present invention.

In a non-polarized system, fuse (0528), as represented in FIG. 6 (0600), either the incoming power line (0518) or the outgoing power line (0520) inputs electricity into the fuse box system (0300), while the power then exits out of the other one of the pair.

In FIG. 6 (0600), the electronic schematic for the polarized system is shown. Current passes through the system between T1 to T12 and can pass from one to the other in no particular order. Four groupings of objects are present on non-polarized system fuse (0528), with each of these groupings being in parallel to one another. Grouping (0630) includes diode D5 and current limiting resistor RL5, which are in series to one another. Grouping (0632) includes diodes D1 and D2, which are in series to one another. Grouping (0634) includes diodes D3 and D4, which are in series to one another. Finally, grouping (0636) includes D6 and RL6, which are in series to one another. In the non-polarized system fuse (0628), diodes D5 and D6 are both LED's and serve as alternative current pathways for D1 and D2 (for diode D5) and D3 and D4 (for diode D6).

Diodes D5, D1, and D2 allows current to flow from T1 to T12, while diodes D3, D4, and D6 allow current to flow from T12 to T1. Essentially, diodes D3, D4, and D6 are placed within non-polarized system fuse (0528) facing the opposite way of that of diodes D5, D1, and D2.

Figure 7:
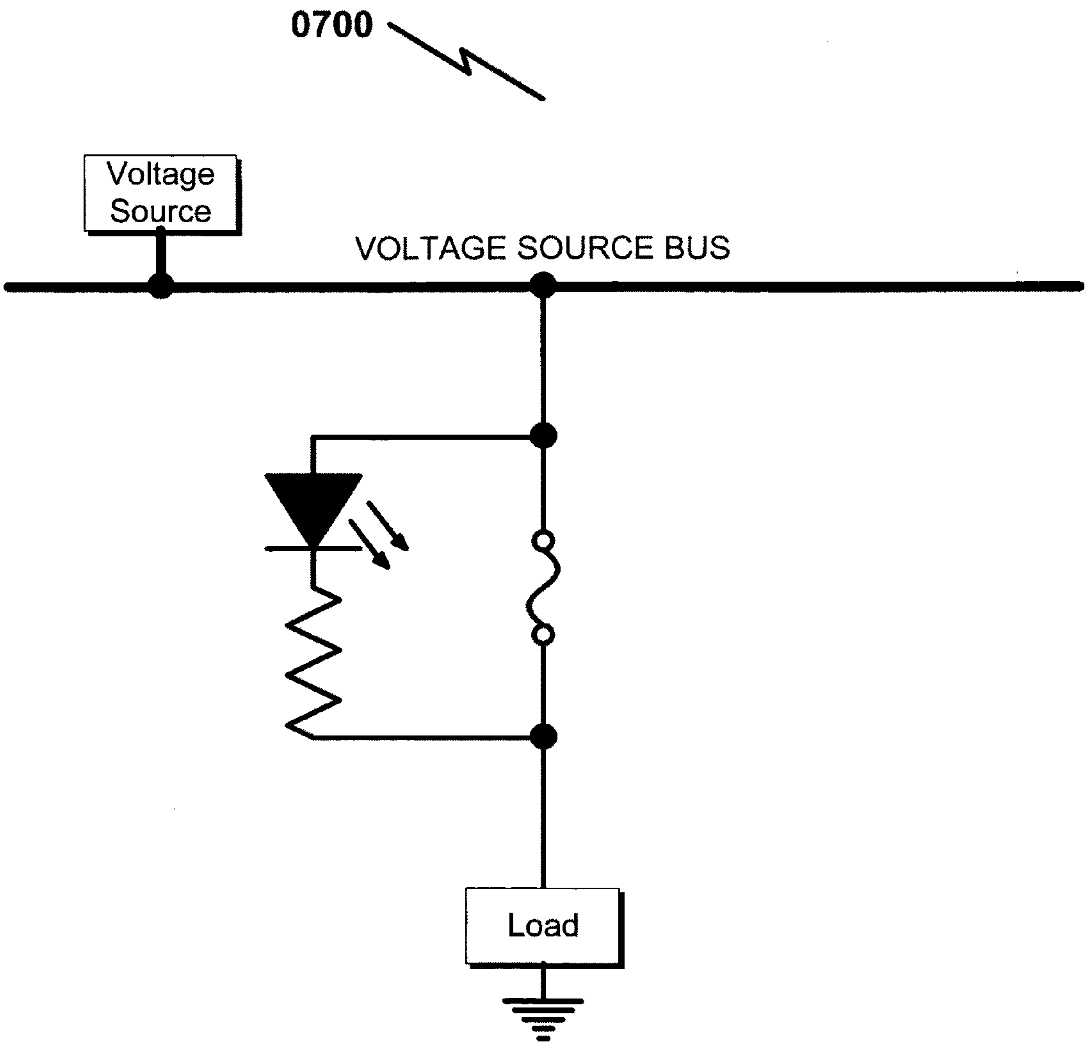
FIG. 7 illustrates a schematic diagram for another preferred exemplary embodiment utilizing only LEDs and illustrating that the LED is not illuminated when the fuse is good and the LED is illuminated when the fuse is broken.

With reference to FIG. 7 through FIG. 12, an embodiment which utilizes only LED diodes, represented as LED 1 and LED are shown. This embodiment reduces heat generated and voltage from the preferred embodiment. FIG. 7 (0700) represents the proper schematic for the fuse and/or the fuse box. The fuse will turn on/light the LED diode when the fuse is broken and the LED light to the circuit in the box to which the broken fuse is connected also turns on/lights. All other fuses and fuse box LEDs remain not lighted. This is visually represented in FIG. 9 (0900) and FIG. 11 (1100).

Figure 8:
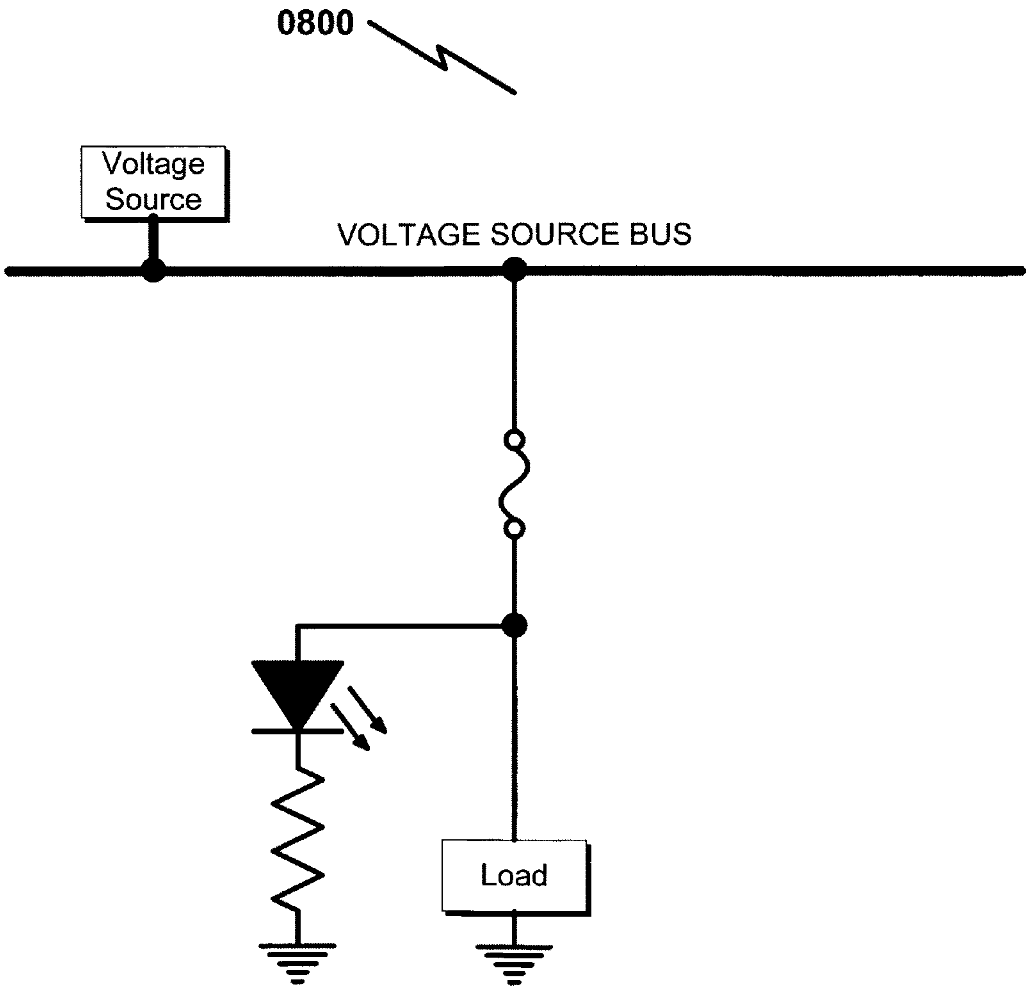
FIG. 8 illustrates a schematic diagram for another preferred exemplary embodiment utilizing only LEDs and illustrating that the LED is illuminated when the fuse is good and the LED is not illuminated when the fuse is broken.
Figure 9:
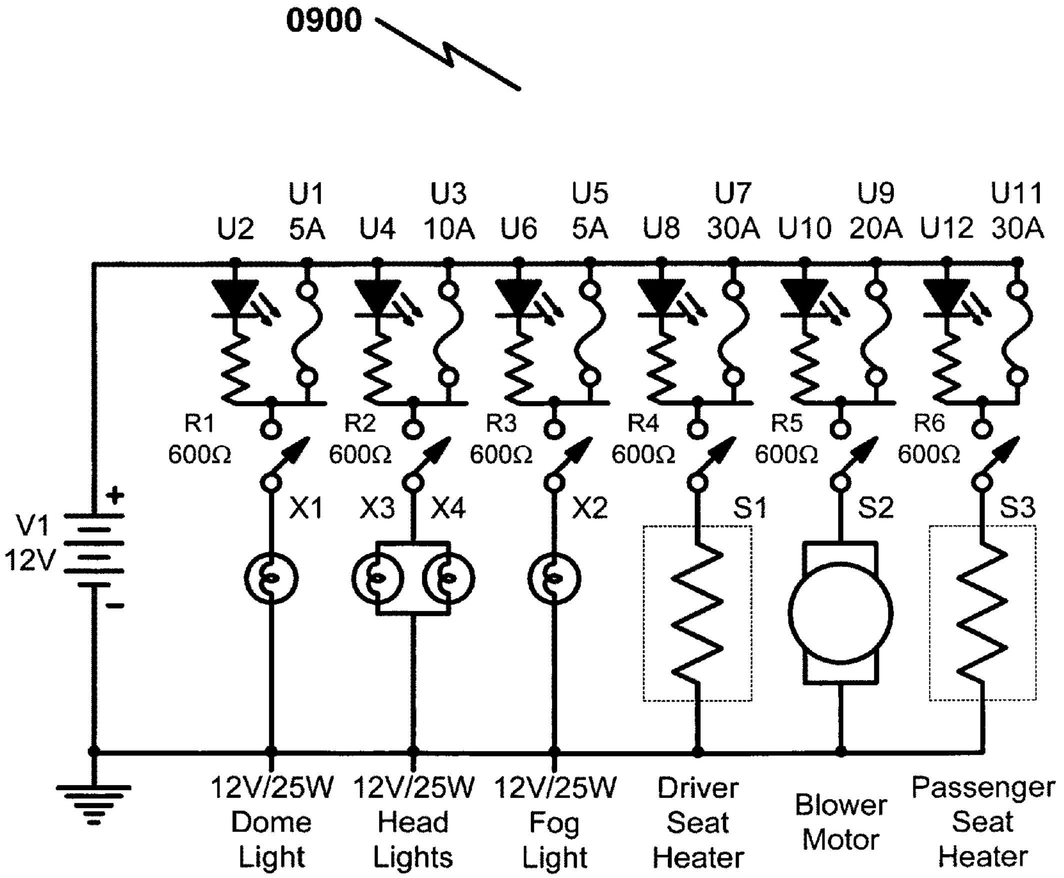
FIG. 9 illustrates an electronic layout of the preferred exemplary embodiment shown in FIG. 7.
Figure 10:
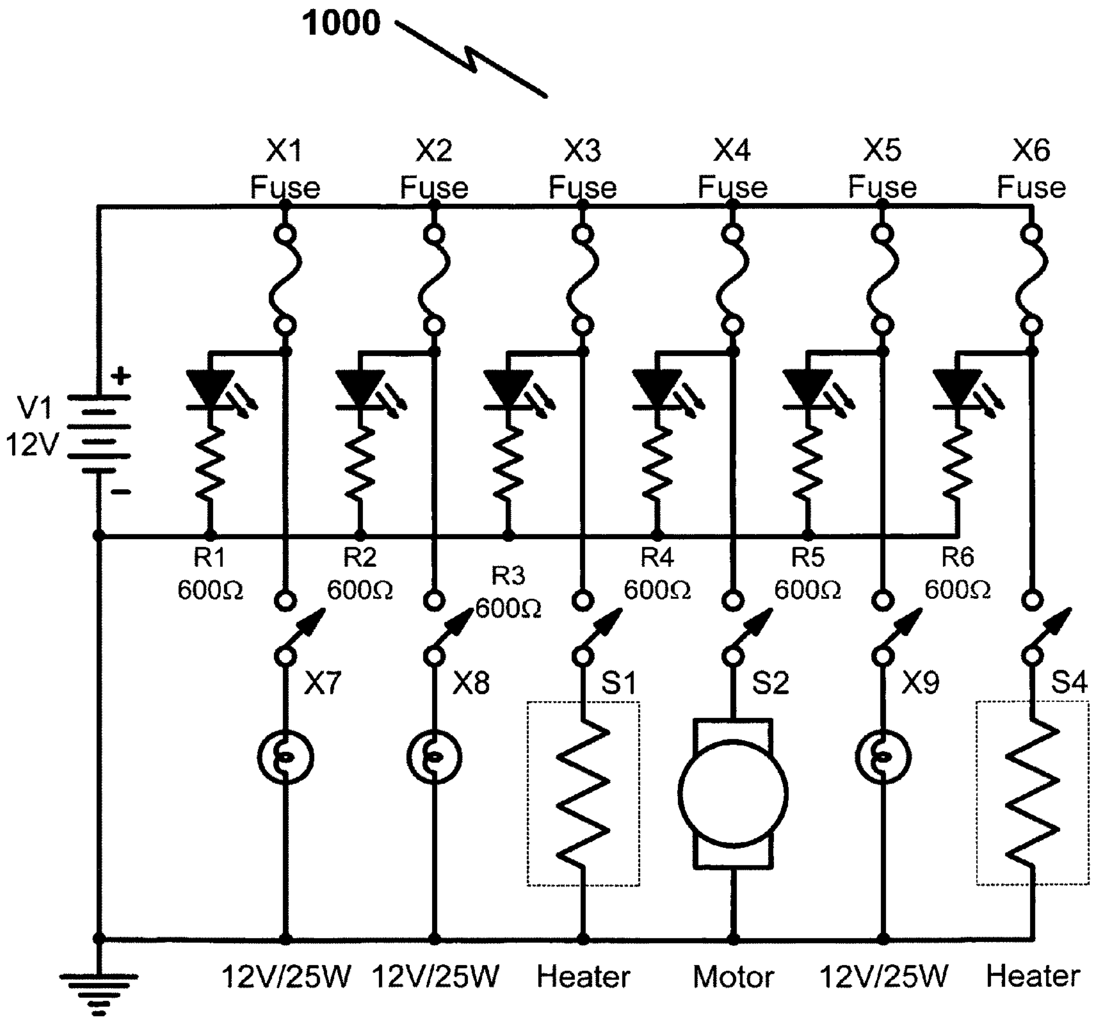
FIG. 10 illustrates another electronic layout of the preferred exemplary embodiment shown in FIG. 8.
Figure 11:
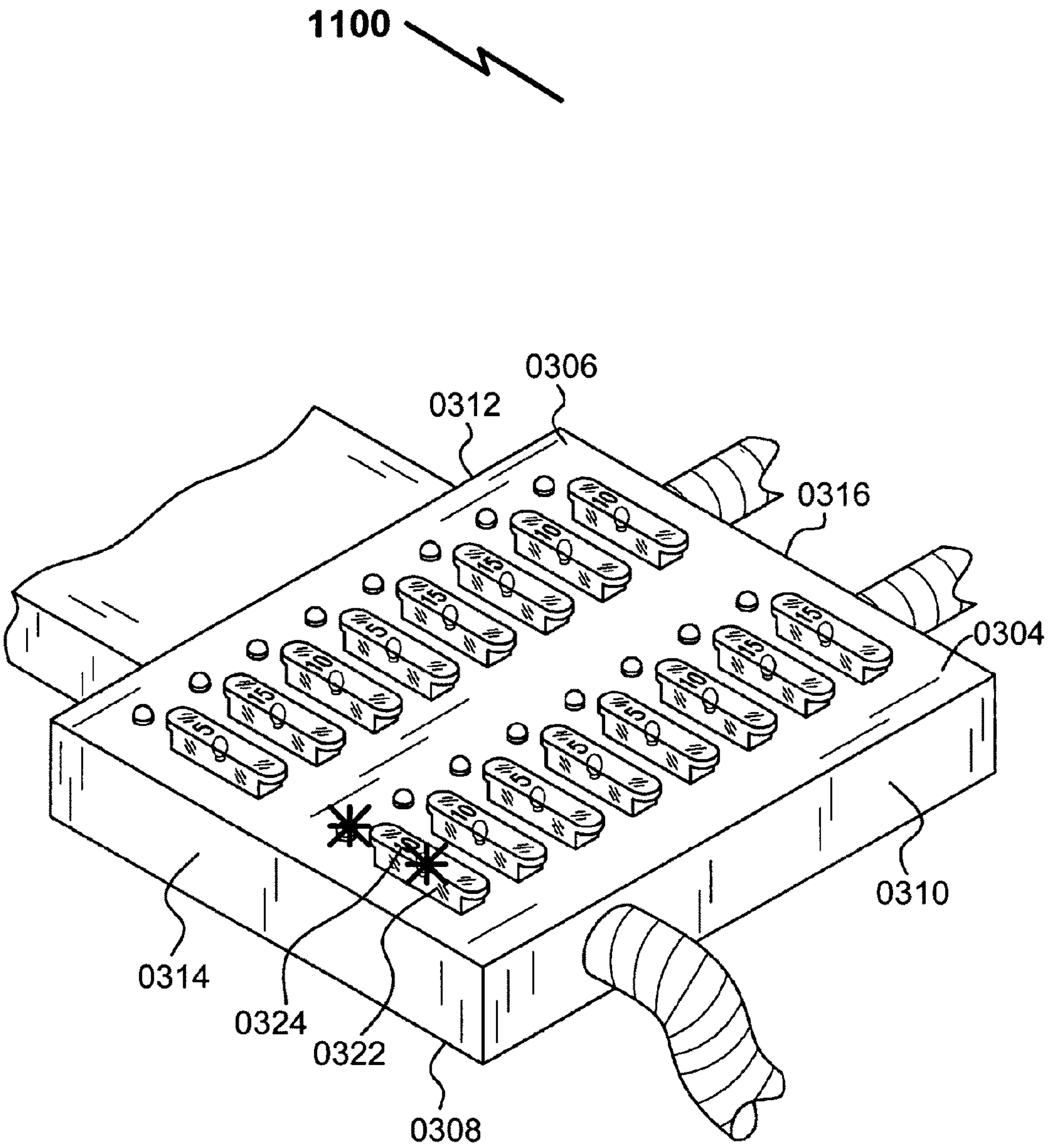
FIG. 11 illustrates an isometric view of the preferred exemplary embodiment shown in FIG. 7.
Figure 12:
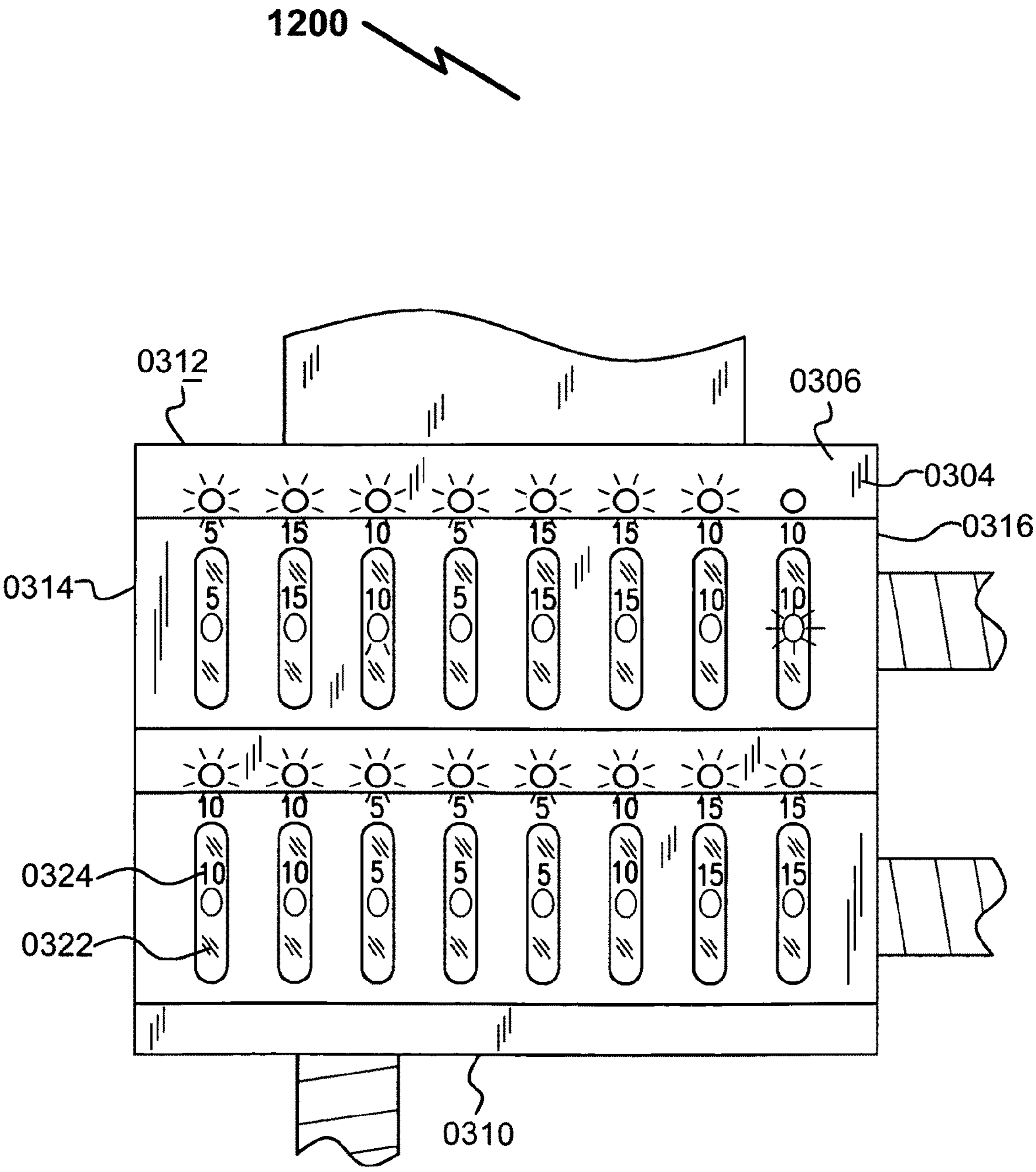
FIG. 12 illustrates an isometric view of the preferred exemplary embodiment shown in FIG. 8.

FIG. 8 (0800) represents the proper schematic for a faulty lit (LED) fuse and a non-lit (LED) circuit to which the fuse was connected. All other box LEDs are ON/lighted all the time and the fuse LEDS are OFF/unlighted thus signifying a broken circuit. FIG. 10 (1000) and FIG. 12 (1200) visually represent this schematic.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

LED Current Source Driver (1300, 1400, 1500)

One of the deficiencies in the prior art is the issue of controlling LED illumination current over a broad range of system bus voltages. Within a general fuse protection system it is generally accepted that the system bus voltage experiences a wide range of values, and can have associated with it a spikes and substantial noise associated with a wide variety of electrical devices, such as contactors, relays, motors, capacitors, etc. As such, it is not possible to accurately predict the current driving a LED/resistor series combination as generally illustrated in FIG. 7 (0700) and FIG. 8 (0800).

Figure 13:
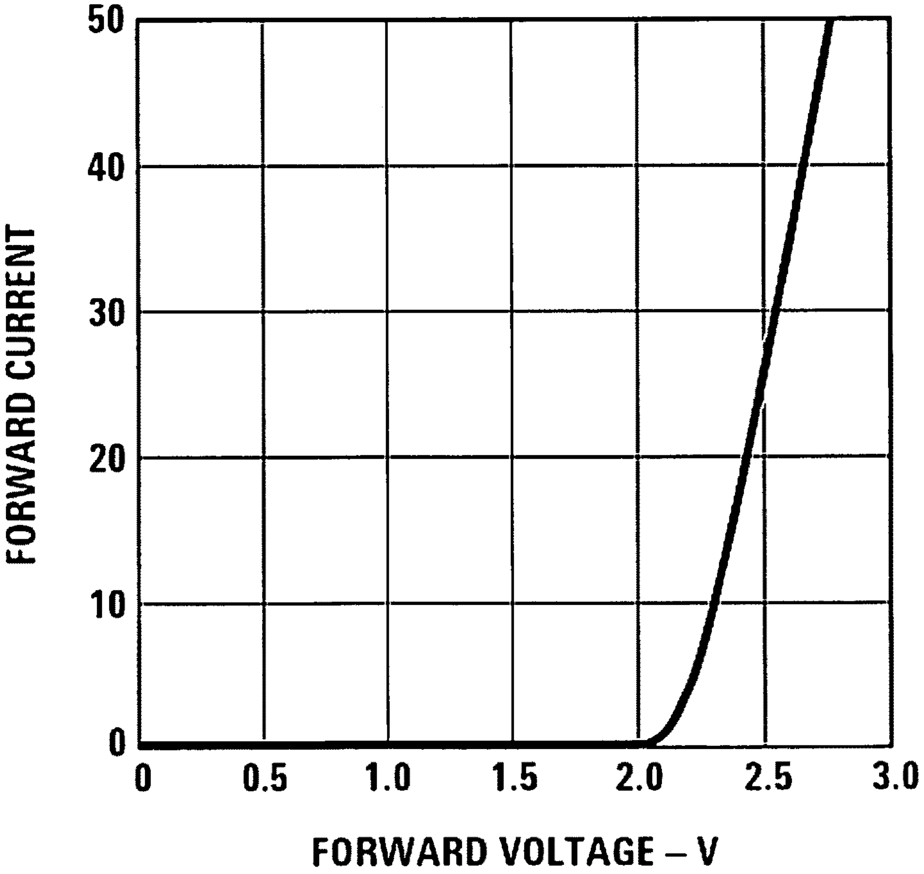
FIG. 13 illustrates the I-V characteristic associated with conventional LED displays that are utilized in a number of preferred exemplary embodiments of the present invention.

The reason for this difficulty may be seen in a conventional LED current-voltage (IV) characteristic that is illustrated in FIG. 13 (1300). As generally illustrated in this graph, the IV characteristic of most LED devices follows a traditional exponential characteristic once the forward voltage (Vf) is exceeded. The rapid increase in device current after the forward voltage is exceeded requires that some current limiting element be provided to ensure that the overall maximum power dissipation of the device is not exceeded. For the LED device illustrated in this graph, the specified maximum forward current is 50 mA with an average forward current of 30 mA. Note that this maximum current is stated at 25 degrees Celsius, and that the forward voltage DROPS as temperature is increased. Thus, an attempt to fix the forward voltage applied to the device will fail to meet the maximum forward current limitation as temperature increases above 25 degrees Celsius.

Prior art approaches to limiting this current is to estimate the maximum system voltage, subtract the LED forward voltage, subtract the desired forward voltage offset, and then divide this remaining subtrahend by the desired forward operating current of the LED, the result being the value of a required series resistor as generally illustrated in FIG. 7 (0700) and FIG. 8 (0800). The problem with this approach is that it fails to account for temperature as well as variations in system bus voltages. The result of this is that the LED may easily have its maximum forward current specification violated, resulting in drastically decreased device lifetime and reliability.

Figure 14:
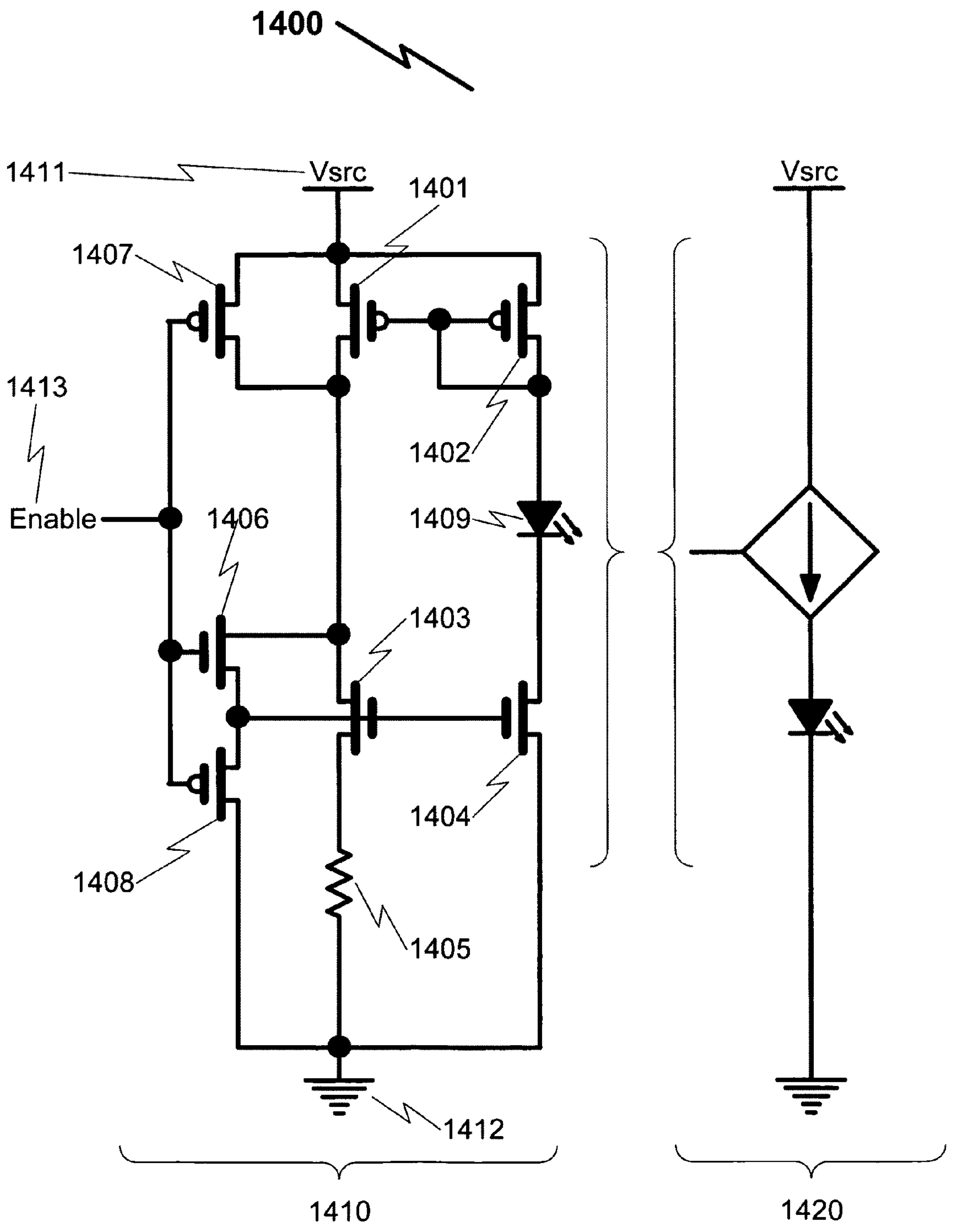
FIG. 14 illustrates a voltage controlled current source used to regulate LED current in some preferred embodiments of the present invention.

The present invention teaches a solution to this problem in the form of a voltage-controlled current source that switches a fixed current into the LED irrespective of operating temperature or system bus voltage. This approach permits the fuse and fuse box system to operate over a wide range of system bus voltages without the need for modification of resistor values or other system components. A general overview of this approach is illustrated in FIG. 14 (1400) wherein the generalized switched current source (1410) has three terminals: a power supply input (1411), a system ground (1412), and an ENABLE input (1413). These three terminals may be generally represented as a voltage controlled current source driving a LED display as represented in the drawing (1420).

In this example, the transistors (1401, 1402, 1403, 1404) comprise a conventional current source reference utilizing a resistor (1405) as the current regulating device. Transistor (1406) permits the current loop to be closed and activated and the LED (1409) to be illuminated when the ENABLE input (1413) is active HIGH. Transistors (1407, 1408) serve both to disable the current source reference when the ENABLE input (1413) is inactive LOW and also serve as a startup circuit for the current mirror reference on the LOW-to-HIGH transition of the ENABLE input (1413). Note that all traditional current references of this type require a startup circuit and many methodologies are available to achieve this functionality.

One skilled in the art will recognize that the current reference illustrated in FIG. 14 (1400) may be implemented in a wide variety of technologies (not limited to CMOS) and that other types of current references may be utilized to achieve even better current regulation over power supply variations. The topology shown here is only exemplary of a wide variety of current references anticipated as complementary to the teachings of the present invention.

Bandgap LED Current Stabilization (1500)

In conjunction with the use of current stabilization in the LED illumination the present invention specifically anticipates the use of bandgap references to provide temperature stabilized or temperature compensated currents for use with the LED displays. The ability to regulate the LED current over wide ranges of power supply voltage and/or temperature cannot be overemphasized in view of the fact that many fuse protection systems reside in temperature hostile environments such as automobiles, boats, and recreational vehicles wherein both temperature and system bus voltages are poorly regulated.

Figure 15:
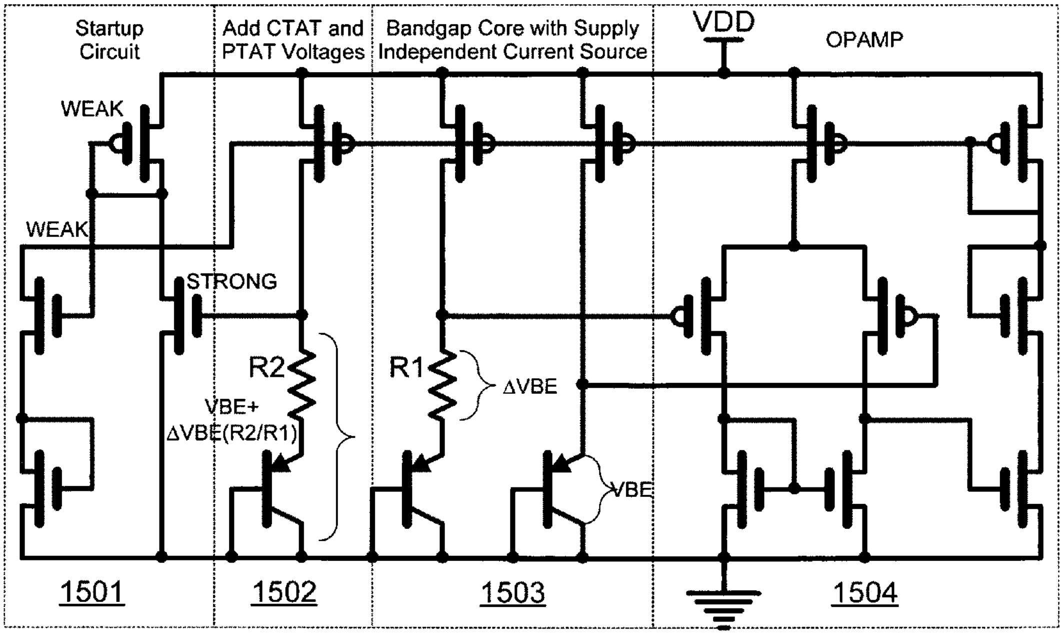
FIG. 15 illustrates an exemplary bandgap reference useful in regulating LED current in some preferred embodiments of the present invention.

While the prior art is replete with documentation on the construction of a wide variety of bandgap references, the present invention may advantageously utilize a bandgap of the form as illustrated in FIG. 15 (1500), an example of such a circuit as described by Tao Li, Bhaskar Mitra, and Kabir Udeshi in their paper A LOW VOLTAGE BANDGAP REFERENCE CIRCUIT WITH CURRENT FEEDBACK. This bandgap incorporates a startup circuit to guarantee operation at the non-zero operating point and has simple construction that is suitable for a wide variety of CMOS processes with low supply voltage headroom requirements. The circuit as illustrated can generally be sectioned into a STARTUP CIRCUIT (1501), SUMMATION OF CTAT AND PTAT VOLTAGES (1502), BANDGAP CORE WITH. SUPPLY INDEPENDENT CURRENT SOURCE (1503), and OPAMP (1504). As indicated in the schematic, the STARTUP circuit (1501) contains MOSFET devices that are sized as WEAK and STRONG devices to ensure a stable operating point and minimal startup circuit current consumption when the circuit stabilizes at the desired operating point. One skilled in the art will recognize that this style of bandgap reference can be used to generate CTAT (complementary to absolute temperature) as well as PTAT (proportional to absolute temperature) reference currents that may be utilized to INCREASE or DECREASE LED current consumption based on temperature, thus permitting safe LED operating points to be maintained irrespective of the LED temperature/current characteristics.

Bandgap LED Stabilization with Zero Startup Current (1600)

Figure 16:
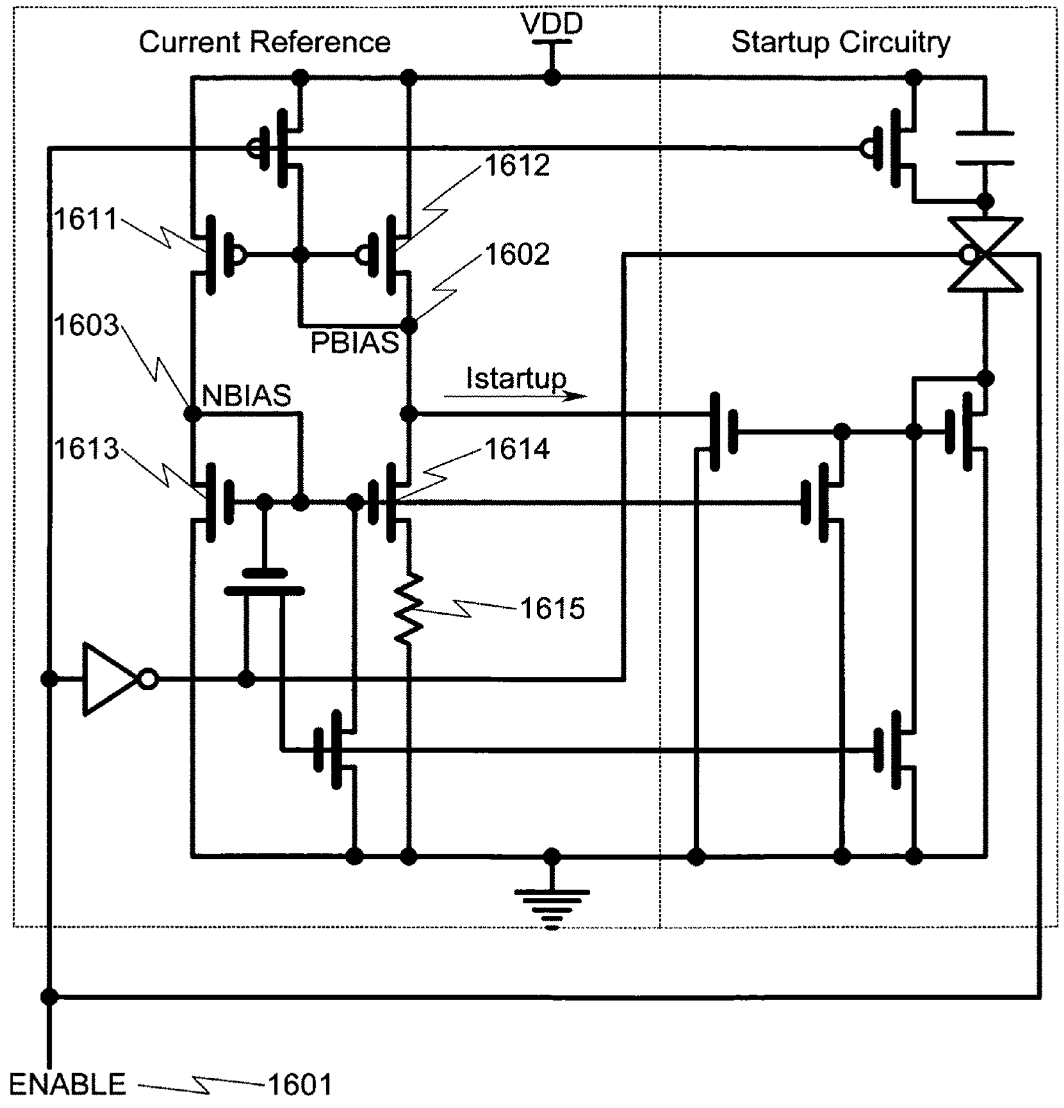
FIG. 16 illustrates an exemplary bandgap reference incorporating zero quiescent startup current that may be useful in regulating LED current in some preferred embodiments of the present invention.

The concept of bandgap stabilization of the LED operating current can be augmented in many facets, one of which specifically anticipated by the present invention incorporates circuitry to minimize or eliminate the operating current associated with the current reference startup circuitry. Such a technique is generally illustrated in FIG. 16 (1600) wherein a circuit described by Sanjay Kumar Wadhwa and Harayna Gurgaon in their paper entitled A STARTUP CIRCUIT FOR VOLTAGE & CURRENT REFERENCES WITH ZERO STEADY STATE CURRENT.

This topology incorporates an ENABLE control signal (1601) to force startup of the current source which is generally determined by the current mirror configuration (1611, 1612, 1613, 1614) and the associated reference resistor (1615). One skilled in the art will recognize that this topology is advantageous in battery operated equipment that is sensitive to background current consumption once the LED has been stabilized to its operating point. The bias points associated with PBIAS (1602) and NBIAS (1603) may be utilized to operate current sources utilized to drive the target LED, or in some circumstances the LED may be incorporated within the reference resistor (1615) portion of the circuit. The gist of this topology as it relates to the present invention is that a wide variety of startup circuits may be utilized in conjunction with current references to guarantee operation of the LED indicator in a safe operating region for the device. Herein the use of a startup circuit having zero operational current requirements is deemed optimal in many preferred embodiments of the present invention. One skilled in the art will recognize that there are a wide variety of methodologies to achieve this low current embodiment topology.

Simplified LED Current Stabilizer (1700)

In some circumstances the complexity of the LED current stabilizer must be minimized for cost and circuit area/volume considerations. In these circumstances the circuits generally illustrated in FIG. 17 (1700) may be utilized in some preferred exemplary embodiments to implement this functionality.

Figure 17:
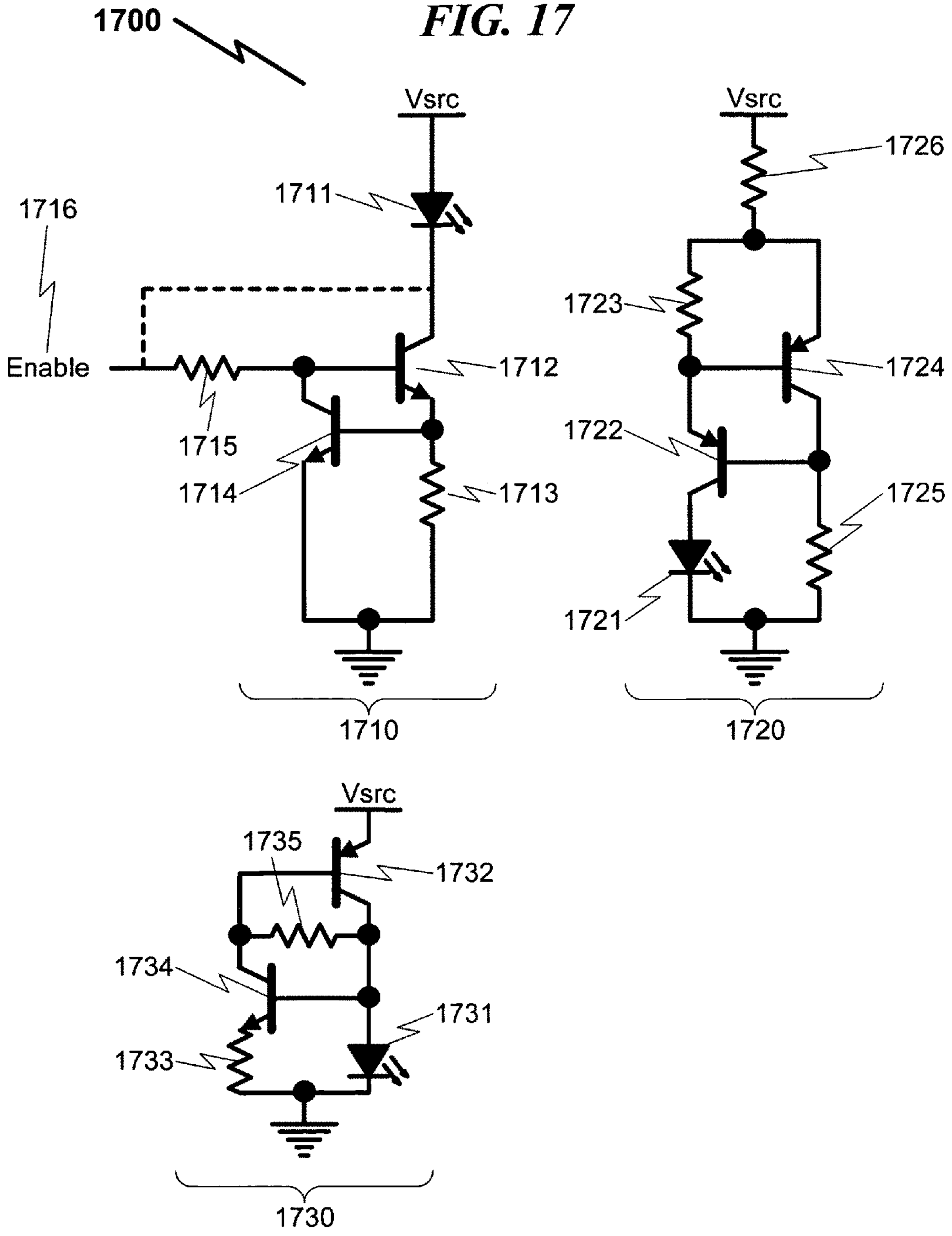
FIG. 17 illustrates several preferred exemplary regulated current references useful in some preferred embodiments of the present invention.

As seen in FIG. 17 (1700), in one preferred exemplary embodiment (1710), the LED (1711) is connected to a current regulating series transistor (1712) and a current setting resistor (1713) that maintains a relatively constant voltage based on the VBE of the feedback base current limiting transistor (1714). Resistor (1715) limits base drive current to the drive transistor (1712) based on the ENABLE signal (1716) that controls operation of the current source. The present invention anticipates that the ENABLE signal (1716) may be gated with an oscillator in some embodiments to regulate the LED current and/or provide a visual indication of system operation, fuse failure, and/or relative loading of the fused circuit.

In an alternative preferred exemplary embodiment (1720), the LED (1721) is driven by a current source (1722) that is derived from a VBE reference current formed by a resistor (1723) and associated transistor (1724). Base startup current is provided by a resistor (1725), with a series current limiting resistor (current source) provided by an additional resistor (1726) in this embodiment.

In another alternative preferred exemplary embodiment (1730), the LED (1731) is driven by a current source (1732) that is derived from a VBE reference current formed by a resistor (1733) and associated transistor (1724). This topology attempts to offset the exponential diode characteristic of the LED (1731) with that of the base-emitter junction characteristic of the shunt transistor (1734). This offset permits the emitter resistor (1733) to determine the overall LED current by resistive means only. One skilled in the art will recognize that the base-emitter junction of the shunt transistor (1734) may be augmented with additional diode junctions in an attempt to match the diode characteristics of the LED (1731) when used in conjunction with the emitter resistor (1733). The advantage of this approach is that the LED (1731) current is derived solely from a driving current source (1732) and does not flow through a series resistive device as in other configurations illustrated. The base drive current for the current source (1732) is derived from the shunt transistor (1734) and is very small, and thus the power consumed by the shunt transistor (1734) and current setting resistor (1733) is minimized compared to other configurations presented. Base startup current is provided by a large resistor (1735) that provides a minimal startup circuit for the current source (1732). One skilled in the art will recognize that more sophisticated (and efficient) startup circuits are possible, including but not limited to those presented in this document.

Dynamic LED Current Stabilizer (1800)

Figure 18:
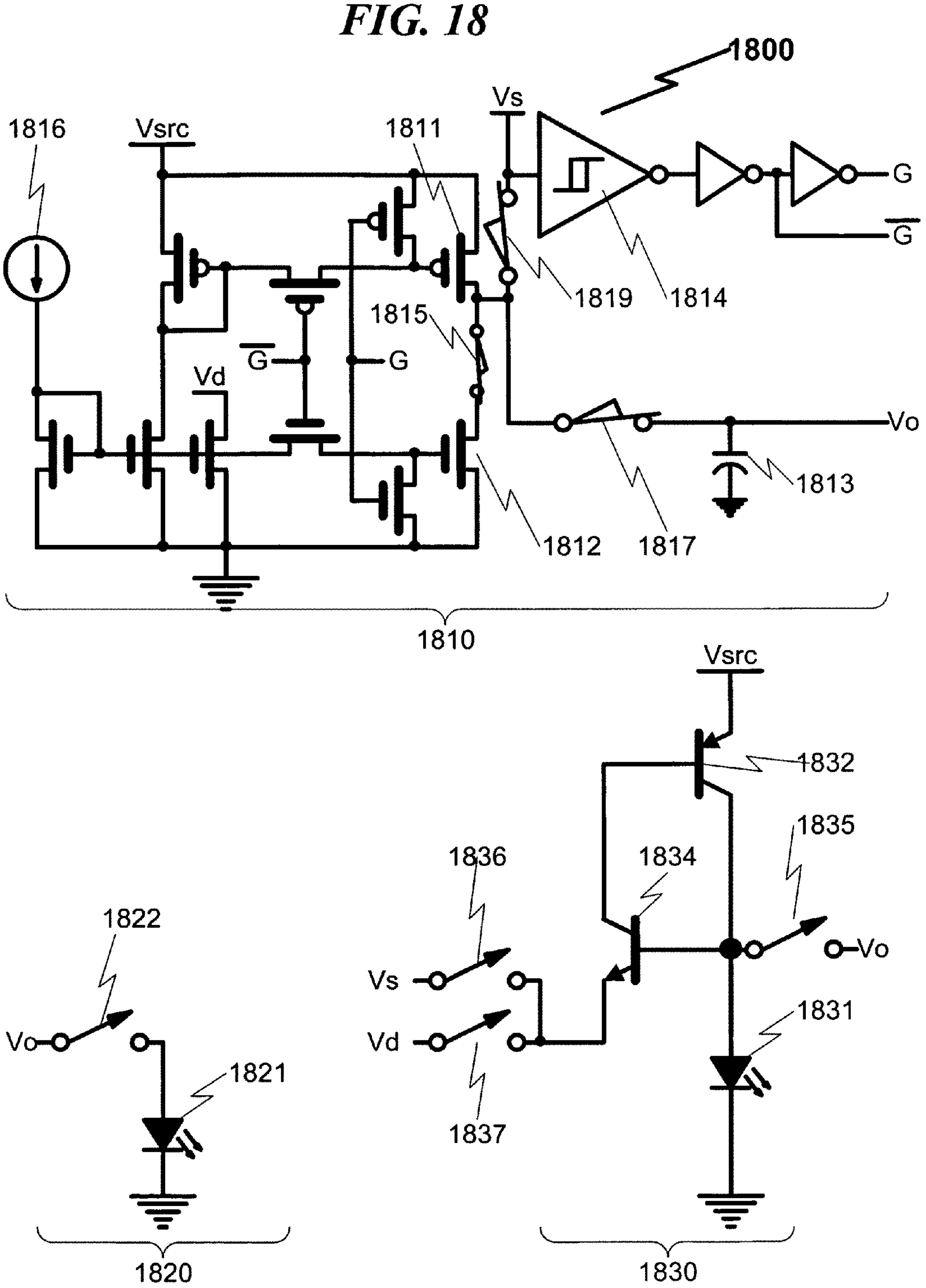
FIG. 18 illustrates several preferred exemplary dynamically regulated current references useful in some preferred embodiments of the present invention.

In some circumstances a LED current stabilizer must be implemented that dynamically stabilizes the LED current over a wide range of operating system voltages with minimal overhead power consumption. FIG. 18 (1800) provides some insight into how this may be accomplished. Referencing FIG. 18 (1800), a conventional Schmitt trigger relaxation oscillator is depicted in which a capacitor (1813) is alternately charged by transistor (1811) and discharged by transistor (1812) under control of a Schmitt trigger inverter (1814). The duty cycle of this configuration can be adjusted by changing the relative sizes of the charging (1811) and discharging (1812) transistors. One skilled in the art will recognize that these relative sizes can be controlled via use of additional parallel transistors that are switched in/out of the circuit as needed. The system as presented provides a generally triangular voltage waveform across the capacitor (1813), but one skilled in the art will recognize that other waveforms are possible with this configuration.

This relaxation oscillator can be modified and adapted in a variety of ways to promote dynamic LED current stabilization. In one preferred exemplary embodiment (1820), switch (1822) is closed and the LED (1821) is connected to the Vo output and switch (1815) is opened. This permits the LED (1821) to act as the resistive load for the filter capacitor (1813) during the discharge cycle of the relaxation oscillator. The charging cycle characteristics will be determined by the sizing of transistor (1811) and the current source (1816).

Another preferred exemplary embodiment of this configuration is illustrated in FIG. 18 (1800) as circuit variant (1830). In this preferred exemplary embodiment (1830), switches (1835, 1836, 1837) are closed, switch and the LED (1831) is connected to the Vo output and switches (1815, 1817, 1819) are opened. This permits the LED (1831) to act as the resistive load for the filter capacitor (1813) during the discharge cycle of the relaxation oscillator, while the Schmitt trigger (1814) is controlled by the shunt emitter voltage of the shunt transistor (1834).

Static Fuse Status Sensing Indicator (1900)

As mentioned previously, one deficiency in the prior art is the inability to detect "blown" fuses in circuits having switched loads or in situations where the load goes OPEN and draws no current. In these situations, the use of conventional LED/resistor combinations as indicated in FIG. 7 (0700) and FIG. 8 (0800) will not detect a blown fuse condition. This deficiency in the prior art may be addressed by the embodiment of the present invention generally illustrated in FIG. 19 (1900) which incorporates static sensing of a blown fuse condition.

Figure 19:
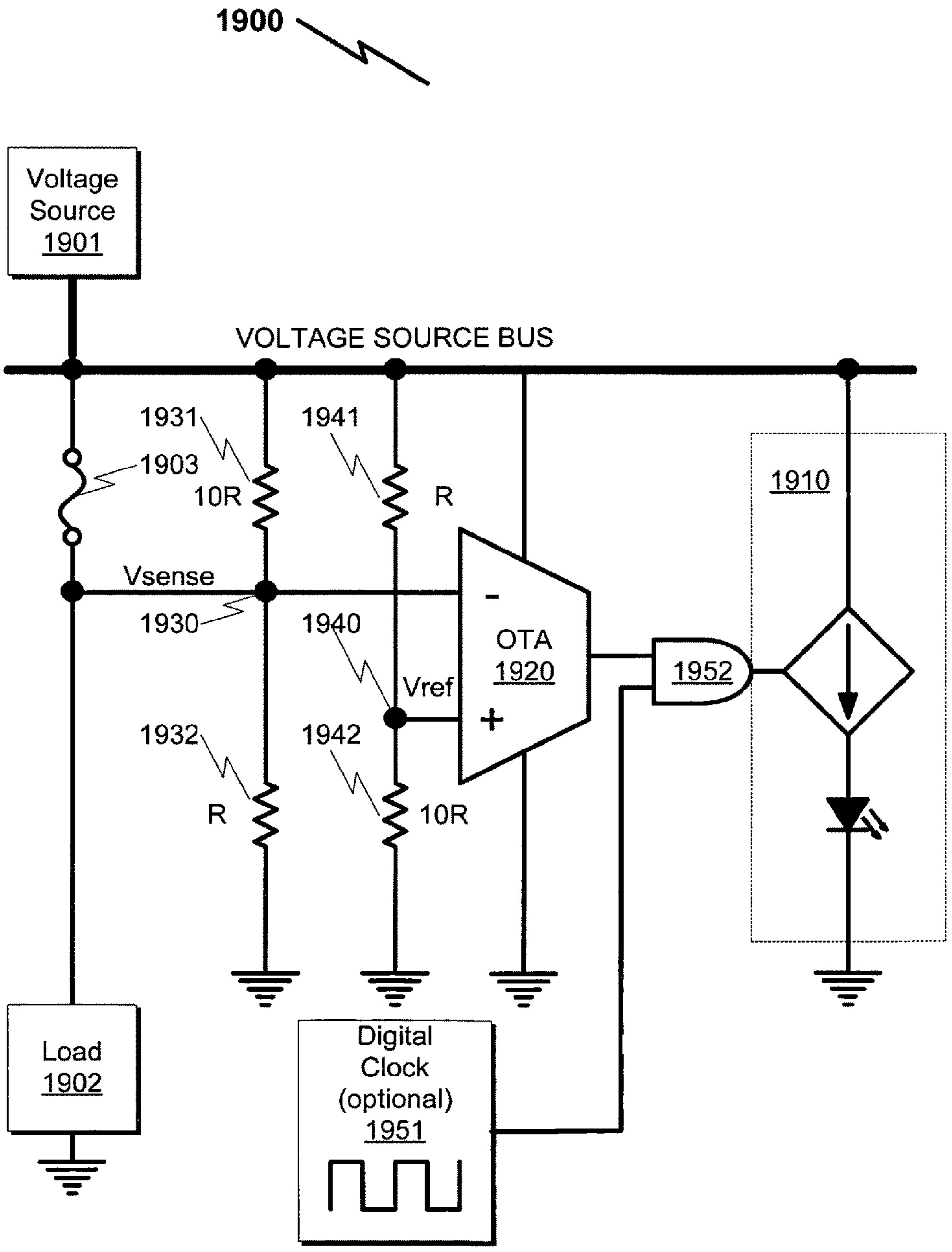
FIG. 19 illustrates a preferred exemplary embodiment of the present invention incorporating static fuse status sensing.

Referencing FIG. 19 (1900), the general system architecture utilizes a power supply (1901) servicing a load (1902) that may be switched or unswitched and which is protected by a fuse (1903) or other circuit protection device. The status of the fuse is sensed at node Vsense (1930) by means of the resistor divider comprising resistors (1931) and (1932). While there are many acceptable values for these resistors, a preferred embodiment uses high value resistors in which the divider ratio is approximately 10:1. In this configuration, node Vsense is normally at the voltage source (1901) potential. Node Vref (1940) is set by the resistor divider comprising resistors (1941) and (1942) and with a nominal 1:10 divider ratio is normally at approximately 90% of the power supply (1901) potential. OTA/OPAMP (1920) under these conditions has a LOW output and thus the current controlled LED display driver (1910) is OFF.

If the fuse (1903) blows, node Vsense will assume one of two states. If the load is switched ON and still active, the node will quickly fall below the 90% threshold set by the Vref (1940) reference. If the load is switched OFF, then the node Vsense (1930) will fall to approximately 10% of the voltage source (1901) value. In either case, the output of OTA/OPAMP (1920) will be HIGH and enable the current controlled LED display driver (1910) to illuminate the LED.

Note that the embodiment illustrated in FIG. 19 (1900) incorporates an optional digital clock (1951) and logic gate (1952) to enable blinking of the LED when the fuse (1903) blows. The use of this additional digital clock (1951) and logic gate (1952) provides additional enhanced visibility of the blown fuse condition as well as reducing the overall power consumption of the LED display circuit, a benefit that may be of significant value in battery powered systems.

One skilled in the art will recognize that there are a wide variety of methodologies available to implement the current controlled LED display (1910) illustrated in FIG. 19 (1900), including but not limited to the discussions herein with respect preferred exemplary embodiments illustrated in FIG. 13 (1300)-FIG. 18 (1800).

Dynamic Fuse Status Sensing Indicator (2000)

The static sensing of the blown fuse condition as detailed in FIG. 19 (1900) may be improved upon in some circumstances and scenarios by utilizing a dynamic sensing methodology. This approach may in some circumstances reduce the overall power consumption of the sensing system and promote longer battery life. An exemplary embodiment of this teaching is generally illustrated in FIG. 20 (2000).

Figure 20:
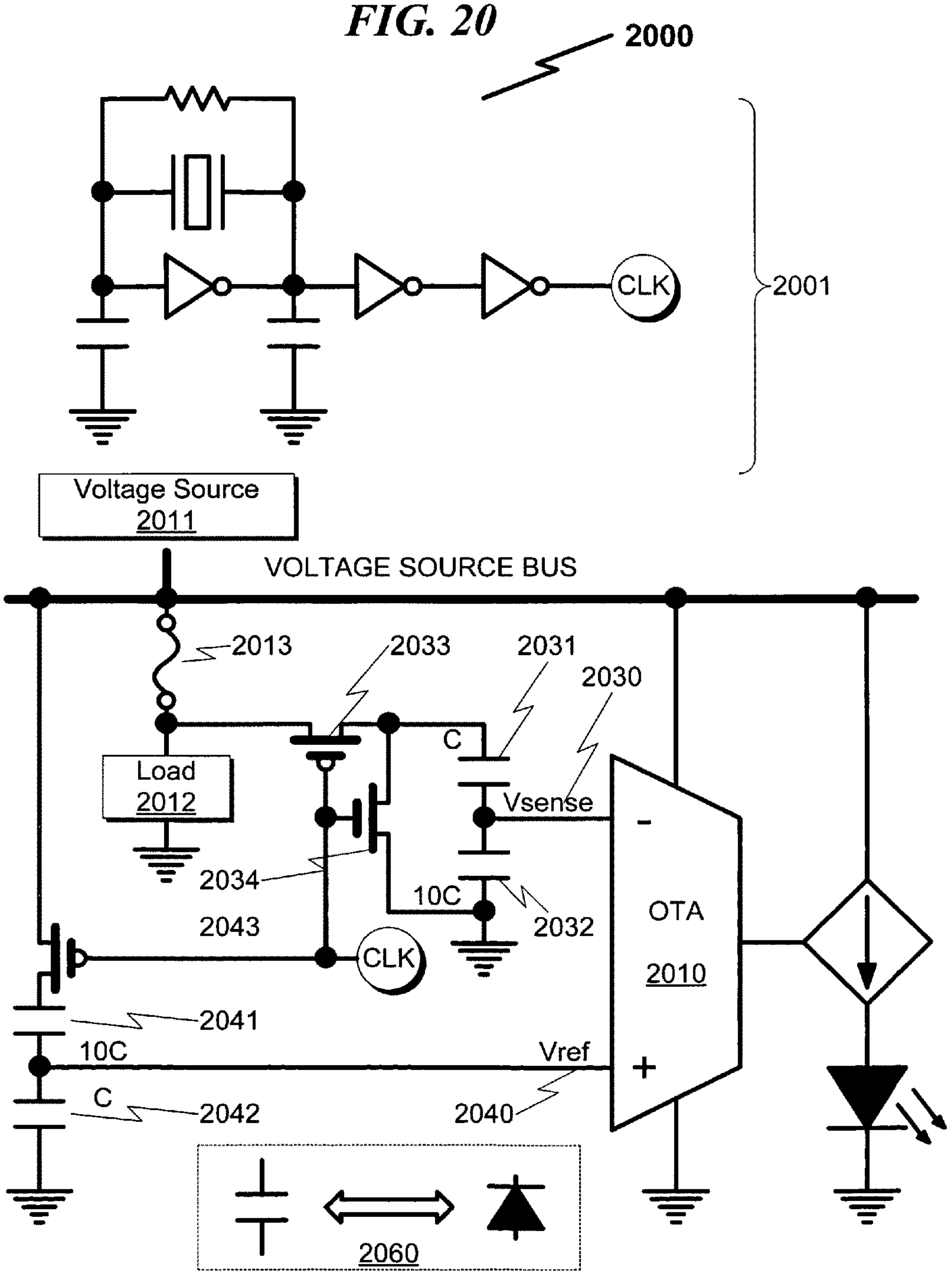
FIG. 20 illustrates a preferred exemplary embodiment of the present invention incorporating dynamic fuse status sensing.

Referring to FIG. 20 (2000), the dynamic fuse sensing system utilizes a clock generation circuit (an exemplary embodiment of which is shown) (2001). One skilled in the art will recognize that there are many digital oscillators that can fulfill this functionality within the context of the present invention.

This clock generator is utilized to capacitively sample the fuse (2013) as supplied by the voltage source (2011) as it services the load (2012). This Vsense voltage (2030) is generated by a capacitor voltage divider comprising capacitors (2031, 2032) that are charged by the clock via transistor (2033) during one clock phase and discharged (2034) on the alternate clock phase. Similarly, the Vref voltage (2040) is generated via a capacitive voltage divider comprising capacitors (2041, 2042) which are charged via a transistor (2043) during one clock phase. The OTA/OPAMP (2020) compares the Vsense (2030) and Vref (2040) voltages and activates the LED display if the Vsense voltage is below a predetermined voltage threshold determined by the voltage divider capacitors.

One skilled in the art will recognize that this dynamic sensing topology mimics that of the static sensing topology illustrated in FIG. 19 (1900) but in utilizing a clocked system approach may consume a considerably lower static current than the approach illustrated in FIG. 19 (1900).

It should be noted that the blinking LED optional display enhancement illustrated in FIG. 19 (1951, 1952) while not shown in FIG. 20 (2000), may also be incorporated within this embodiment. Additionally, please note that a wide variety of capacitor configurations may be utilized in this circuit, including the use of back-biased diodes as generally illustrated in the schematic of FIG. 20 (2060).

Remote Fuse Status Sensing (2100)

Figure 21:
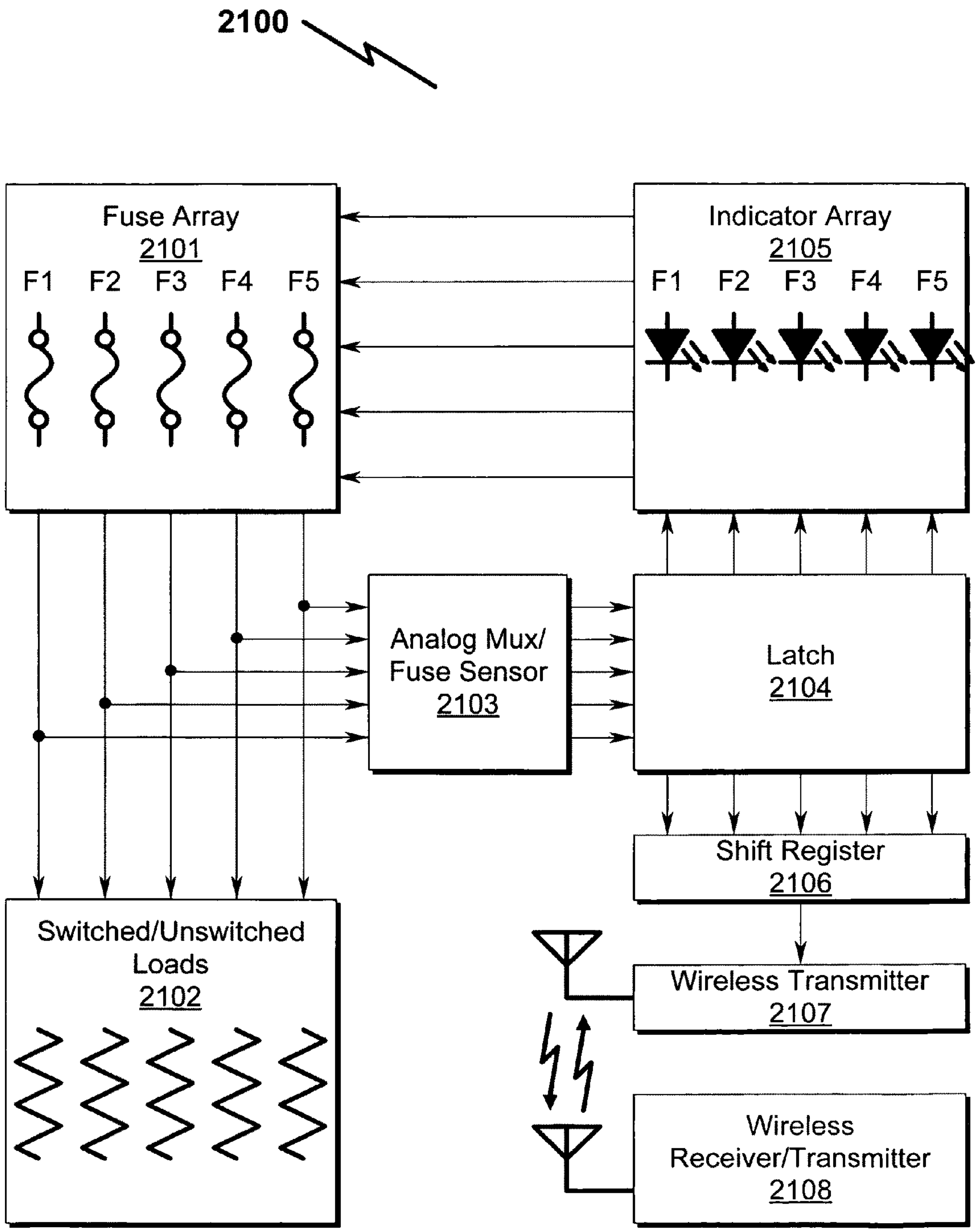
FIG. 21 illustrates a preferred exemplary embodiment of the present invention incorporating wireless interrogation of fuse status.

While the present invention anticipates the use of localized blown fuse indicators in a wide variety of contexts, the disclosed system also specifically anticipates that the status of fuses and/or circuits can be remotely sensed via the use of wired and/or wireless technologies as generally described in FIG. 21 (2100). In this configuration, a multitude of system bus fuses can be inspected remotely without actual need for physical access to the fuse box system.

Referencing FIG. 21 (2100), the system can generally be described as having a fuse array (2101) servicing a variety of switched/unswitched loads (2102). As previously described herein, techniques taught by the present invention (as generally illustrated in FIG. 19 (1900) and FIG. 20 (2000)) can be used to interrogate the status of a particular fuse within the fuse array (2101). An analog multiplexer (2103) is utilized to select a particular fuse within the fuse array (2101) for inspection using one of these previously described techniques and the result of this inspection are saved in a latch/register (2104).

The latch/register can then be used to output the fuse status to an indicator array (2105) using techniques previously described herein (see generally FIG. 13-FIG. 19). Additionally, this fuse status may be serialized by a shift register (2106) and conveyed to a wireless transmitter (2107) for transmission to a handheld or other wireless receiver (2108) for display to a service technician or other individual.

Implementation of the wireless transmitter/receiver combination can take many forms, but some preferred embodiment utilize QWIKRADIO® BRAND wireless RF transmitter/receiver integrated circuits from MICREL Corporation (www.micrel.com). One skilled in the art will recognize that there are a wide variety of suitable methodologies (cellular, wireless Internet, etc.) to achieve the wireless transmitter/receiver combinations within the scope of the teachings of the present invention.

Additionally, although wireless polling of the fuse array status is preferred in many embodiments, some preferred embodiments may utilize a wired interface such as the Universal Serial Bus (USB) or other industry standard serial interface to interrogate the fuse box status. This wired interface option specifically anticipates the use of communications over conventional AC residential/commercial electrical wiring, commonly referred to as X-10 communications. One skilled in the art will recognize that there are a wide variety of AC power line communication systems that can be utilized in this context. Furthermore, the handheld display (2108) may take the form of a Personal Computer (PC) or other computer configured with appropriate diagnostic and/or display software to properly interpret the status information from the fuse box system. One skilled in the art will recognize that the wired and wireless communication options detailed herein are not mutually exclusive and that a given system implementation may incorporate one or more variants of either type with no loss of generality in the teachings of the present invention.

One skilled in the art will recognize that many of the components illustrated in FIG. 21 (2100) could be integrated into a single integrated circuit or implemented using a wide variety of integrated microcontroller units.

Breaker Panel Retrofit (2200)

The wired/wireless interrogation of fuse status described in FIG. 21 (2100) may be utilized in some preferred system embodiments to permit retrofit of existing AC breaker and/or fuse panels with a communications system capable of reporting blown fuses and/or tripped circuit breakers to a central reporting station that may be located locally or remotely to the AC power distribution system being modified. This capability is highly desirable in large distributed commercial enterprises, especially those that contain numerous buildings in an extended campus environment and situations where the maintenance for a more geographically diverse enterprise requires constant monitoring of the status of the electrical systems of the spatially diverse buildings.

Figure 22:
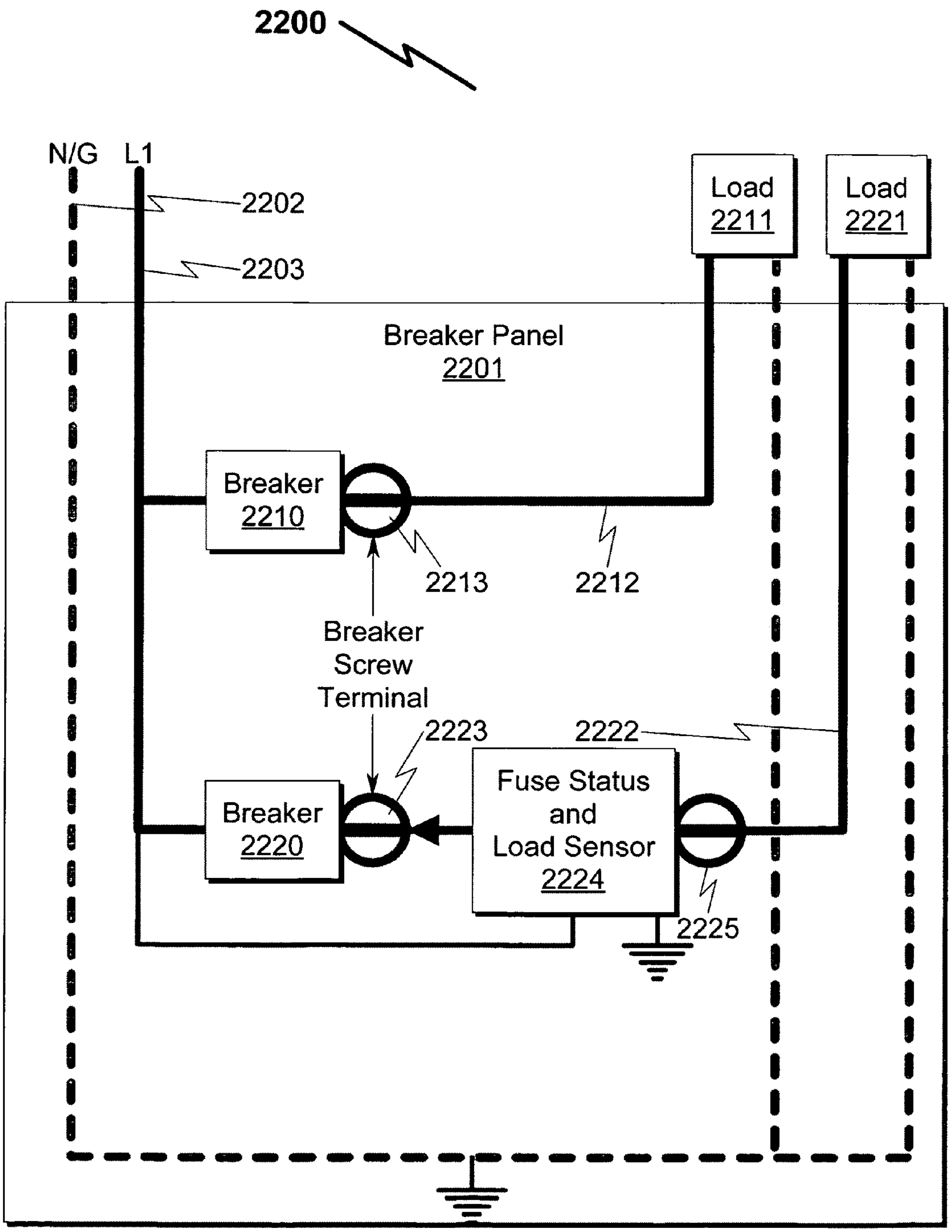
FIG. 22 illustrates a preferred exemplary embodiment of the present invention as applied to a retrofit of existing circuit breaker panels.

A generalized approach to meeting the needs of such a diverse infrastructure with an eye to retrofitting existing building infrastructures is generally illustrated in FIG. 22 (2200). For simplicity of illustration, this example only includes half of a single-phase breaker panel and details only the neutral/ground (N/G) (2202) and hot (L1) (2203) breaker panel inputs. However, application to polyphase circuits is also anticipated.

In a conventional breaker panel configuration, the breaker (2210) ties to the hot (L1) (2203) input and switches this to the load (2211). The electrical connection between the load (2211) and the breaker (2210) is by means of a wire (2212) that is generally connected via a screw terminal (2213) on the breaker (2210).

The present invention teaches that the screw terminal (2223) on the breaker (2220) can be used as a connection point for a fuse status and load sensor module (2224) that passes the electrical circuit from the breaker (2220) to the wire (2222) servicing the load (2221). This fuse status and load sensor module (2224) generally contains another screw terminal (2225) similar in functionality to the breaker (2220) screw terminal (2223).

The functionality of the fuse status and load sensor module (2224) includes the fuse status sensing and reporting functionality discussed previously, but may also include load sensing functionality as described in the section below.

The advantage of the system embodiment described in FIG. 22 (2200) is the ability to retrofit existing breaker panel systems within residential and commercial environments with a system capable of reporting the status of fuses/breakers over widely disparate spatial and geographic locations. This functionality can be utilized to aggregate and transmit information on infrastructure electrical status over the Internet to centralized maintenance locations whose responsibility is the deployment of maintenance personnel to repair and maintain equipment in a wide variety of physical locations.

Fuse Status Sensing And Reporting Module (2300)

Figure 23:
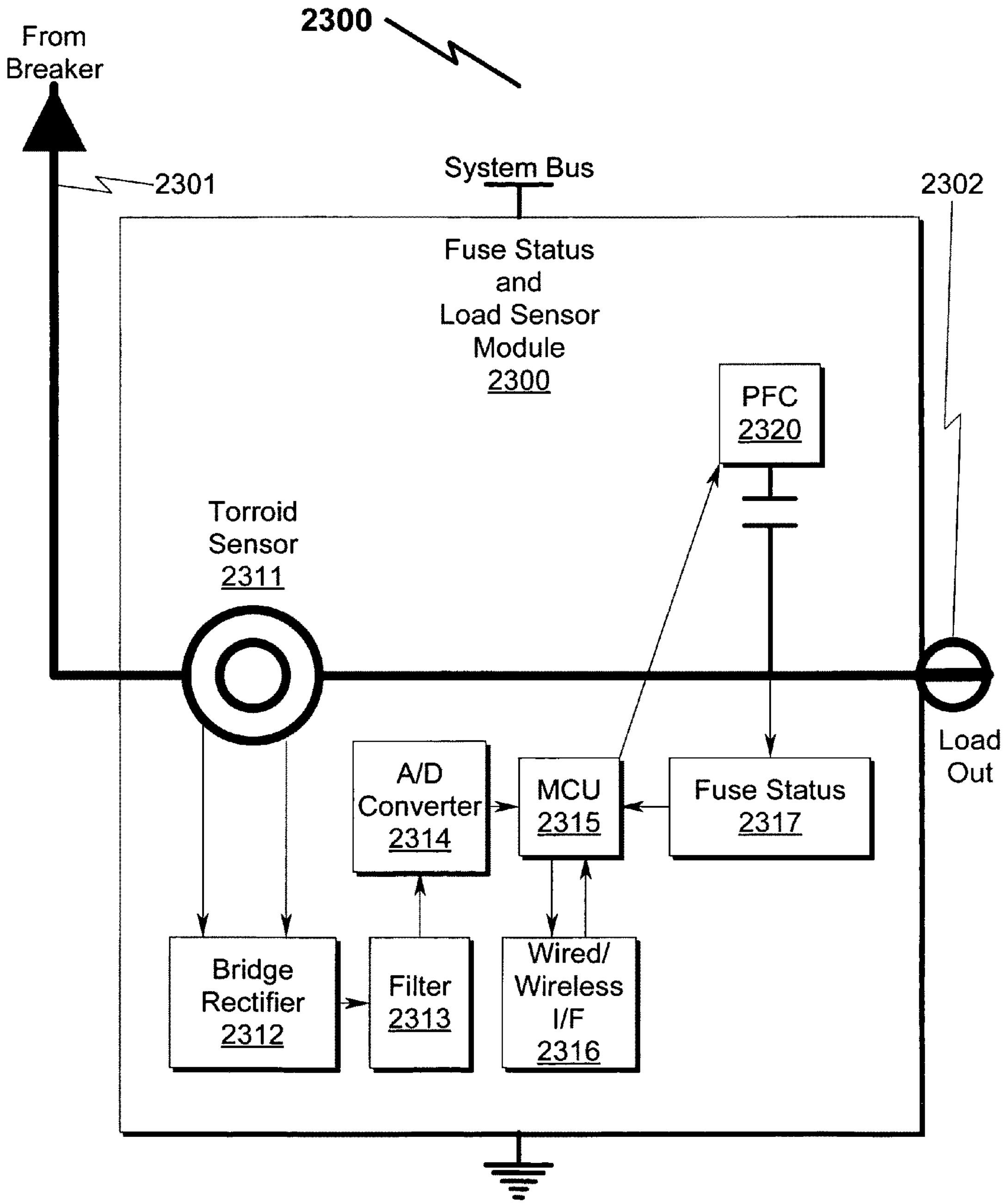
FIG. 23 illustrates a preferred exemplary embodiment of the present invention as applied to a modular retrofit of existing circuit breaker panels.

The fuse status sensing and reporting module (2224) generally described in FIG. 22 (2200) may be further detailed and described as generally illustrated in FIG. 23 (2300). In this preferred embodiment, the system (2300) is interjected between the breaker via a connection (2301) that passes current from the breaker to the load (2302). A torroidal current sensor (2311) detects current flow to the load. The output of this sensor (2311) is then rectified by a bridge (2312) and filtered (2313) for sampling by an analog-to-digital converter (2314). The digitized load current value is then inspected by a microcontroller unit (2315) and then can be used to augment fuse status sensing for reporting via a wireless/wired communication interface (2316) or used to report the power consumption characteristics of the load. A fuse status sensor (2317) may also provide the MCU with information on the status of the fuse in the event that no load current is detected by the sensor (2301).

One skilled in the art will recognize that the system components described in this preferred embodiment may be in many circumstances integrated into a single integrated circuit (IC) providing space savings and overall system integration flexibility. Furthermore, one skilled in the art will recognize that the system as describe could easily be integrated within the breaker itself, permitting the system to operate as a “smart breaker” and thus requiring minimal retrofit installation overhead in existing breaker panels.

In this configuration the fuse/breaker will be considered operational if load current is detected via the sensor (2301). Otherwise, techniques detailed previously with respect to fuse status sensing may be employed to determine the status of the fuse. In some circumstance it may be advantageous to provide a visual indication that the load is inactive and in need of attention. Such might be the case in situations where motor windings burn out, etc. and the loss of load functionality represents a safety concern for the facility.

The integration of load current sensing in addition to fuse status sensing presents a wide variety of operational advantages heretofore not available in the prior art. Specifically, since load monitoring can occur on a continual basis, the monitoring of historical power consumption for a wide variety of loads may be characterized and compared to current operational characteristics to diagnose and prevent system failure to a wide variety of component failures. Such failures might include but art not limited to motor bearing failures, startup capacitor failures, compressor cycling failures due to loss of refrigerant, ballast failures in lighting systems, and other unexpected machine cycling failures caused by a variety of mechanical system failures or maintenance needs.

Fuse Status Sensing and Reporting Module with GFCI (2400)

Figure 24:
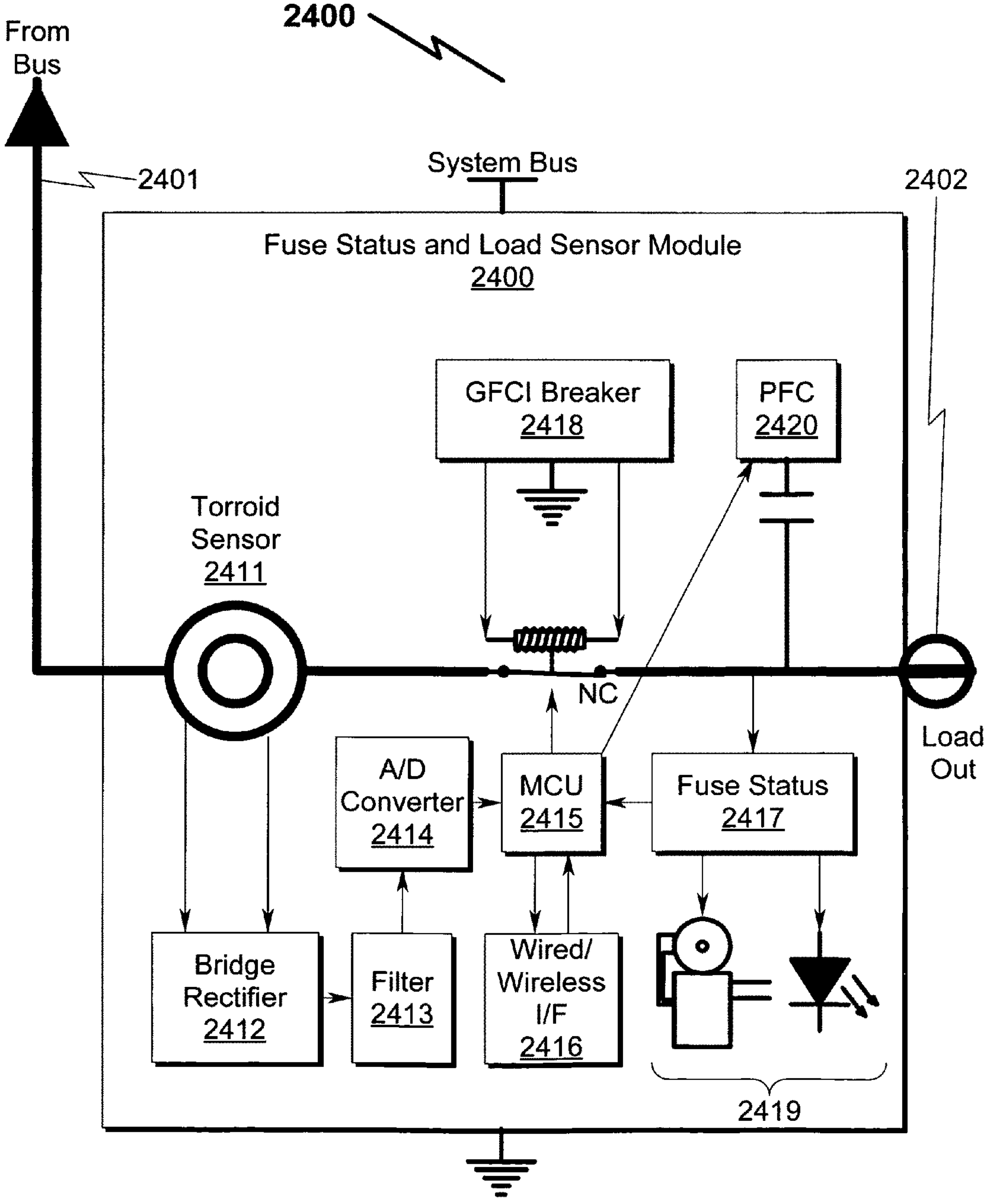
FIG. 24 illustrates a preferred exemplary embodiment of the present invention as applied to a modular retrofit of existing circuit breaker panels incorporating ground fault circuit interruption (GFCI) functionality.

The fuse status sensing and reporting module generally described in FIG. 23 (2300) may be further augmented as generally described in FIG. 24 (2400) to incorporate ground fault circuit interruption (GFCI) capabilities. Referencing FIG. 24 (2400), this supplement to the basic invention incorporates conventional GFCI breaker support (2418) and may be configured for containment within conventional circuit breaker housings, with direct ties to the power bus (2401) and the load output (2402). This preferred exemplary embodiment also illustrates the use of both audible and/or visual indicia to indicate fuse/breaker failure (2419).

One skilled in the art will recognize that this breaker configuration can be implemented as a standalone breaker with or without GFCI support, or it can be implemented as an add-on to an existing breaker with no loss of generality in the teachings of the invention. The only significant difference in these implementations is the configuration of the input (2401) to the system and whether it is tied to the power bus or the output of an existing breaker. Note that in this configuration the GFCI breaker support (2418) may be controlled by the MCU (2415) in order to set the breaker trip current to some arbitrary value determined by the MCU (2415), possibly via the wireless interface (2416). This configuration permits status retrieval and remote control of the breaker status and trip value via wired/wireless means if desired.

Neutral Current Sensing and Power Factor Correction (PFC)

The present invention specifically anticipates embodiments wherein the fuse status sensing and reporting module described above may be further augmented to incorporate neutral current sensing and power factor correction capabilities. Within this context, it is anticipated that additional current sensing elements such as that illustrated in FIG. 23 (2311) and FIG. 24 (2411) may be used to monitor the NEUTRAL current flowing through the common power line that services the load. While these neutral current sensing elements are not present in FIG. 23 (2300) or FIG. 24 (2400), they operate as do the illustrated sensors (2311, 2411) but using the NEUTRAL line as the monitoring source. This monitoring can be used to report system loads that compromise the overall power factor of the breaker panel system. Additionally, this information can be used to add capacitance to the service load in an attempt to properly manage the power factor of the overall system. It is anticipated that the systems illustrated in FIG. 23 (2300) and FIG. 24 (2400) could be augmented with capacitors and appropriate PFC switching circuitry (2320, 2420) to provide automatic PFC correction within the context of the modified breaker system.

General Programmable Fuse System Architecture (2500)

The present invention anticipates that in some preferred embodiments there will be facilities to enable "programmable" fusing elements within the fuse and fuse box structure. While these embodiments may have a wide variety of implementations, it will be useful in some circumstances to have the fusing elements be identically constructed based on maximum amperage capacities, with the fuse rating ("blow current") to be determined by circuitry and/or information within the fuse box. This is in contrast to prior art fuse box architectures in which the fuses are individually constructed with different current ratings. The major problems with the prior art approach are that in many circumstances a replacement fuse of the desired rating are not available and/or the replacement fuse is of the wrong amperage, potentially causing serious system damage should the electrical circuit in question experience a fault condition.

Figure 25:
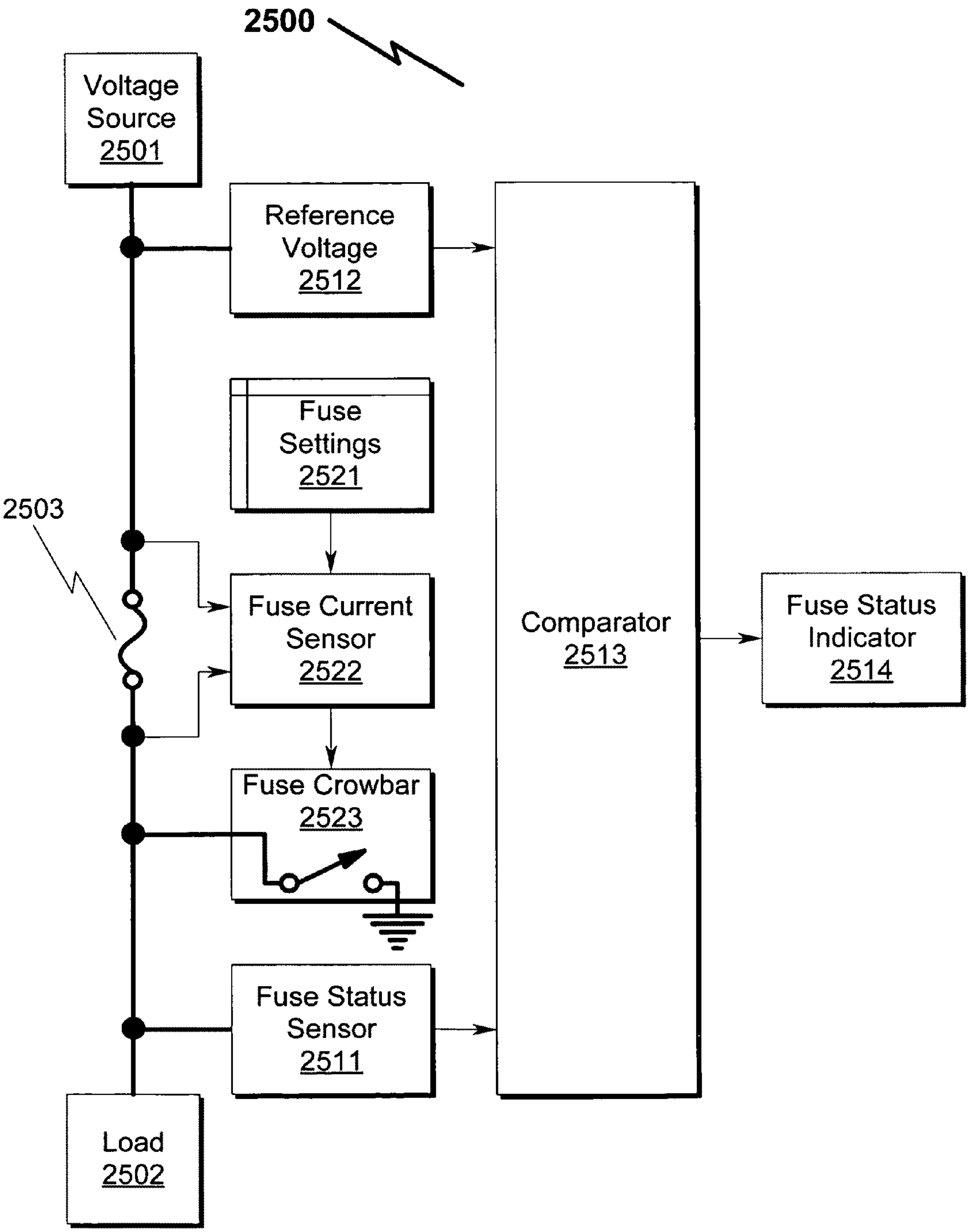
FIG. 25 illustrates a generalized system block diagram of the core components of a preferred exemplary embodiment of the present invention incorporating programmable fuses.

One preferred invention system architecture that addresses these concerns is generally illustrated in FIG. 25 (2500). In this context, the fuse box programmable fuse system comprises the following elements:

(a) A fuse status sensor (2511) that senses the output voltage status of a fuse and generates an output voltage proportional to the fuse output voltage;

(b) A reference voltage (2512) generator that generates a reference voltage proportional to the fuse input voltage;

(c) A comparator (2513) that compares the fuse status sensor output voltage to the reference voltage and generates an output based on this comparison;

(d) A fuse status indicator (2514) that accepts the output of the comparator and provides a status indication of the fuse based on the comparator output;

(e) a fuse settings memory (2521) element that contains information on the proper fuse rating for the circuit (including any additional characteristics such as "slow blow", "fast blow", etc.);

(f) a fuse current sensor (2522) that senses the current passing through the fuse (2503);

(g) a fuse crowbar circuit (2523) that shorts the fuse (2503) output to ground to force a fuse fault if the fuse current sensor (2522) senses a fuse current in excess of the fuse rating specified by the fuse settings memory (2521);

wherein the fuse input voltage is derived from a voltage source; and the fuse output voltage sources a load.

One skilled in the art will recognize that these embodiment components may be applied to invention methods discussed herein as well.

Fuse Resistance Determination

Several embodiments of the present invention utilize knowledge of the resistance of a fusible link in order to determine the current flowing through the fuse. The present invention anticipates that a fully integrated and programmable fuse system as generally described in FIG. 25 (2500) and following may utilize tightly controlled fusible links fabricated using photolithography or similar integrated circuit (IC) fabrication techniques. Another approach to obtaining knowledge of the fusible link resistance is to measure it during the manufacturing process and provide calibration constants to set trip points within the scope of anticipated fuse "blow" currents.

Programmable Fuse Preferred Exemplary Embodiment (2600)

Figure 26:
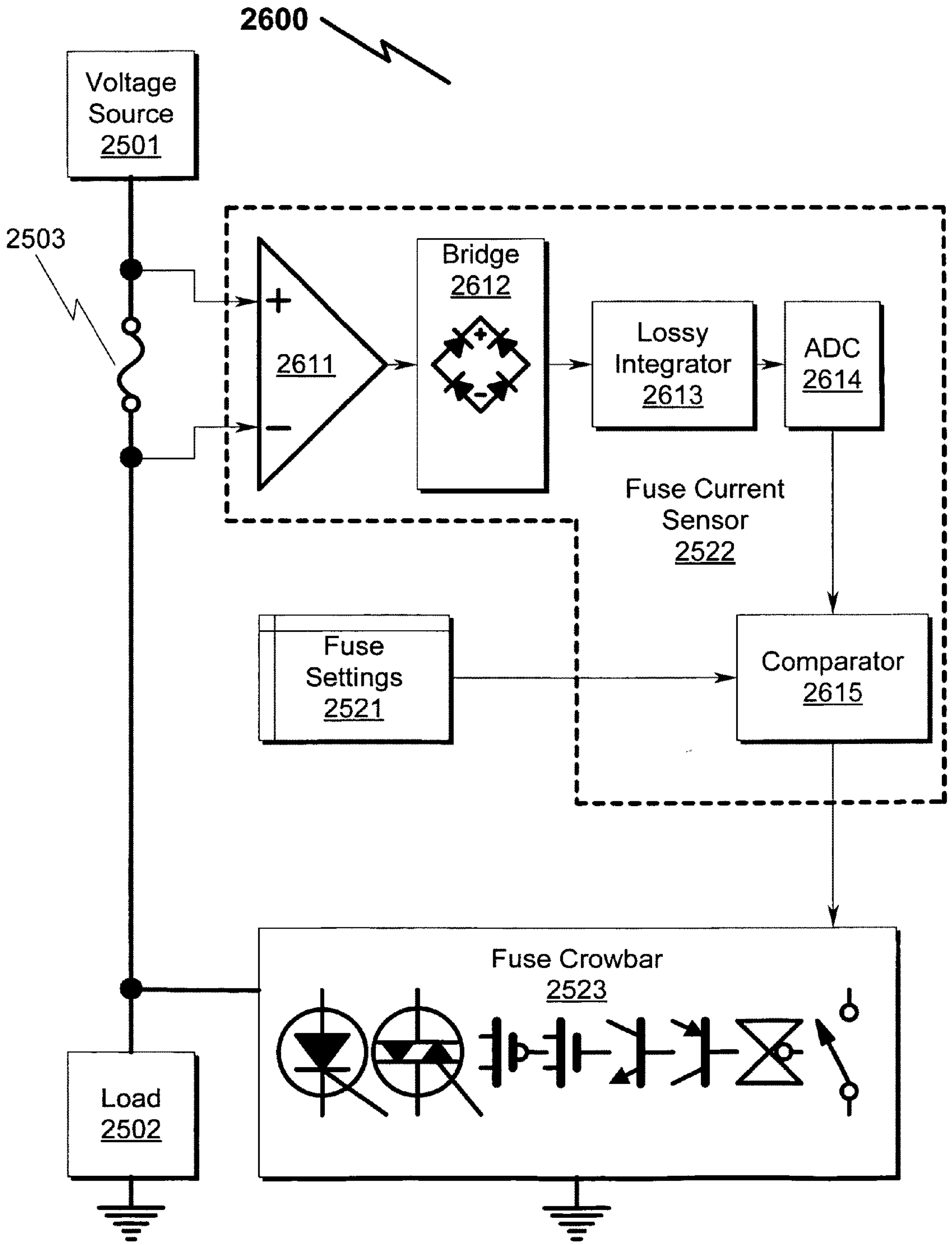
FIG. 26 illustrates a preferred exemplary embodiment of the present invention incorporating programmable fusing architecture.

The general programmable fusing architecture illustrated in FIG. 25 (2500) may be implemented in a wide variety of fashions. One preferred exemplary embodiment is generally illustrated in FIG. 26 (2600). In this embodiment the fuse settings memory (2521) may comprise a series of jumpers/switches that are used by the fuse current sensor (2522) to determine the "trip current" for the programmable fuse. Once the "trip current" has been reached, the fuse crowbar circuit (2523) "blows" the fuse (2503) by shorting out the load (2502) and forcing enough current through the fuse (2503) to disable the fuse (2503) from passing further current to the load (2502). In this fashion, the fuse (2503) need not be matched to the current limit of the load circuit (2502), it need only be able to supply the maximum load current anticipated for the load circuit (2502). By using this approach, only one type of replaceable fusing element (2503) need be utilized in ALL similarly configured fused circuits. This approach also has the advantage of eliminating the possibility of replacing a blown fuse with a fuse having a higher rating, thus preventing circuit damage in the event of a load fault or other system failure.

The present invention anticipates that in some preferred embodiments there will be facilities to enable "programmable" fusing elements within the fuse and fuse box structure. While these embodiments may have a wide variety of implementations, it will be useful in some circumstances to have the fusing elements be identically constructed based on maximum amperage capacities, with the fuse rating ("blow current") to be determined by circuitry and/or information within the fuse box. This is in contrast to prior art fuse box architectures in which the fuses are individually constructed with different current ratings. The major problems with the prior art approach are that in many circumstances a replacement fuse of the desired rating are not available and/or the replacement fuse is of the wrong amperage, potentially causing serious system damage should the electrical circuit in question experience a fault condition.

The fuse current sensor (2522) may be embodied in a variety of configurations, but one preferred embodiment as generally illustrated in FIG. 26 (2600) incorporates an amplifier (2611) that amplifies the voltage seen across the fuse (2503). Since in this general architecture all the fusing elements (2503) are identical, the resistance of these elements is known, so a given current through the fuse will result in a predictable voltage drop. This voltage drop is measured by the amplifier (2611) and optimally rectified by a bridge or other rectifier (2612) and integrated by an integration circuit (2613) to remove current spikes and other noise. This filtered voltage represents the average current through the fuse (2503) and is sampled by an analog-to-digital converter (2614) that generates a digital output that is fed into a comparator (2615) that has as its second input the values contained within the fuse settings memory (2521). If the output of the ADC (2614) exceeds the current limits set by the fuse settings memory (2521), a control signal to the fuse crowbar (2523) is activated that shorts the load to ground with sufficient current draw to trip/blow the fuse (2503) into an inactive state, removing power from the load (2502).

One skilled in the art will recognize that the bridge rectifier (2612) and/or integrator (2613) may not be required in some configurations, but are advantageous in many AC power applications. Furthermore, the fuse settings memory (2521) and/or fuse current sensor (2522) and/or the fuse crowbar (2523) may be integrated into a monolithic integrated circuit (IC) of a wide variety of fabrications. In some preferred exemplary embodiments, the fuse settings memory may incorporate jumpers/straps or other switches to determine the current trip points for the system. In some configurations this information may be downloaded into the fuse box using wired/wireless technologies well known in the art. Finally, one skilled in the art will recognize that the fuse settings memory (2521) and/or fuse current sensor (2522) may be simplified by using simple comparators set to trip at one of a number of selected voltage levels sensed across the fuse (2503), with the output of this comparison fed directly to the fuse crowbar circuitry (2523).

The fuse crowbar circuitry (2523) may take many forms of physical embodiment as generally illustrated in FIG. 26 (2600), including but not limited to the use of SCRs, triacs, MOSFETs, BJTs, transmission gates, IGBTs, or mechanical switches/relays. One skilled in the art will recognize that the only constraint on this circuit is that it be able to sink sufficient current to exceed the fusing current of the fuse (2503) used in the circuit. This crowbar sinking current is generally the fuse current rating of the fuse (2503) minus the desired trip current for the fused circuit. For example, an automotive application in which 30 A is the maximum potential circuit current within the vehicle could be serviced by using 35 A fuses in all fuse locations. In this scenario, a fused circuit with a 5 A trip point would require a momentary 30 A sink current from the fuse crowbar circuitry (2523) to blow the 35 A fuse (2503). Similarly, a fused circuit with a 27 A trip point would require a momentary 8 A sink current from the fuse crowbar circuitry (2523) to blow the 35 A fuse (2503). This example illustrates the fact that this programmable fuse system permits gradations in circuit fuse protection not traditionally available with prior art fusing systems that are traditionally limited to discrete (and coarse) gradations in fuse protection currents.

Integrated Programmable Fuse (2700)

Figure 27:
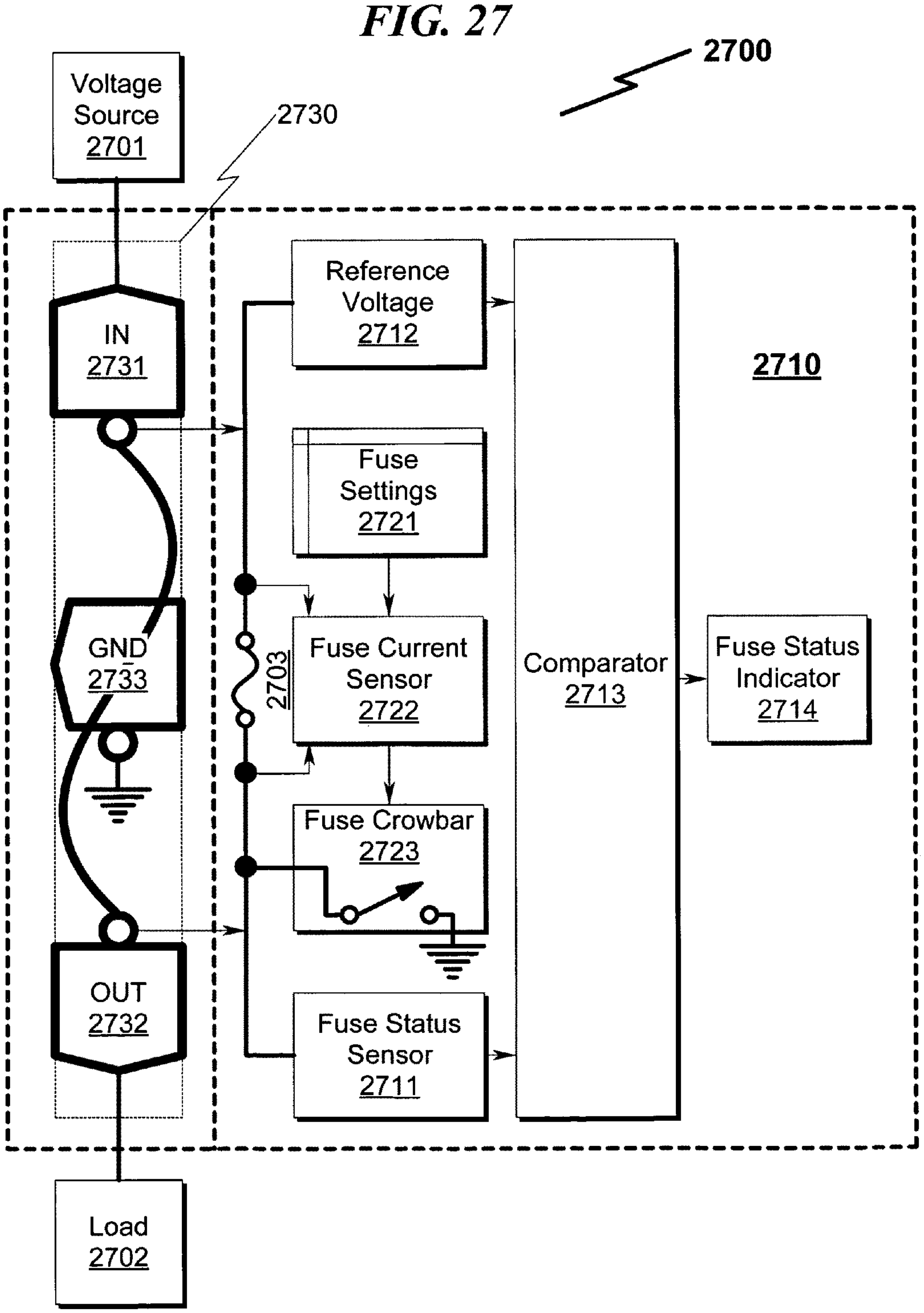
FIG. 27 illustrates a preferred exemplary embodiment of the present invention incorporating integrated programmable fusing architecture.

The general programmable fusing architecture illustrated in FIG. 25 (2500) and FIG. 26 (2600) may be fully integrated into a unified programmable fusing element as generally illustrated in FIG. 27 (2700). As can be seen by referencing FIG. 27 (2700), the preferred integrated embodiment (2710) comprises the fuse status sensor (2711), voltage reference generator (2712), comparator (2713), and fuse status indicator (2714), along with the fuse settings memory (2721), fuse current sensor (2722), and fuse crowbar circuitry (2723) into a unified circuit element, preferably an integrated circuit (IC). The fusing element (2703) may be separate from the circuit integration or in some embodiments may be fully integrated with the other circuit components.

As generally illustrated in FIG. 27 (2700), this higher level of integration permits replacement of traditional two-terminal fuses with "smart" integrated programmable fuses (2730) that incorporate three terminals: power input (2731), power/load output (2732), and ground (2733). It is anticipated that many preferred embodiments of this exemplary embodiment will incorporate spade lugs for fuse contacts as are traditionally used with spade lug fuses, with the incorporation of an offset between two of the spade lugs to ensure that the fuse can only be inserted into the fuse box in one orientation. One skilled in the art will recognize a wide variety of mechanical methods to ensure proper insertion of the three-terminal integrated fuse (2730) into the fuse box receptacle.

The present invention anticipates that the level of integration associated with FIG. 27 (2700) could include integration of the entire system in a single integrated circuit having only three electrical terminals, with the resulting package being compatible with spade lug terminal receptacles residing on a fuse box motherboard. This configuration may or may not fully integrate fuse (2703).

One skilled in the art will recognize that the particular pin designations/orientation (2730) for the integrated fuse generally illustrated in FIG. 27 (2700) are arbitrary and may be rearranged without loss of generality in the teachings of the present invention. Thus, in some configurations the power input (2731), power/load output (2732), and ground (2733) may be reorganized in a wide variety of fashions to suit the mechanical and electrical constraints of the particular system embodiment.

Fuse Settings Memory

As generally illustrated in FIG. 25 (2500), FIG. 26 (2600), and FIG. 27 (2700), the fuse settings memory (2521, 2721) contains information on the current value at which the fuse is to be "blown" by the fuse crowbar circuitry (2523, 2723). As mentioned previously, this current information may be augmented with other information to modify the activation of the fuse crowbar circuitry (2523, 2723). For example, in some circumstances it is desirable for the fuse to have a "slow-blow" characteristic, in which the fusing current must be present for a predetermined time before the fuse is blown. This characteristic may vary based on the anticipated load supported by the fuse and the operating environment in which the system is currently functioning. For example, the fuse characteristics may vary based on time of day, duty cycle of the machinery, ambient temperature, total running time of the load, etc.

While traditional "blade fuses" have been standardized as to their current carrying characteristics and are color coded accordingly (purple=3 A; pink=4 A; beige=5 A; brown=7.5 A; red=10 A; blue=15 A; yellow=20 A; neutral=25 A; green=30 A; orange=40 A; red=50 A; blue=60 A; beige=70 A; neutral=80 A), the present invention permits a finer granularity as to the "blow current" of the fusing system on an individual circuit protection basis. As previously mentioned by example, the fusing current for the fuse can be programmed to an arbitrary degree of accuracy, a feature not possible with conventional fusible link fusing technologies. This feature of the present invention permits, for example, fuses of non-granular amperage ratings, such as 13 A, rather than 10 A or 15 A fuses.

Integrated Programmable Fuse Packaging (2800)

Figure 28:
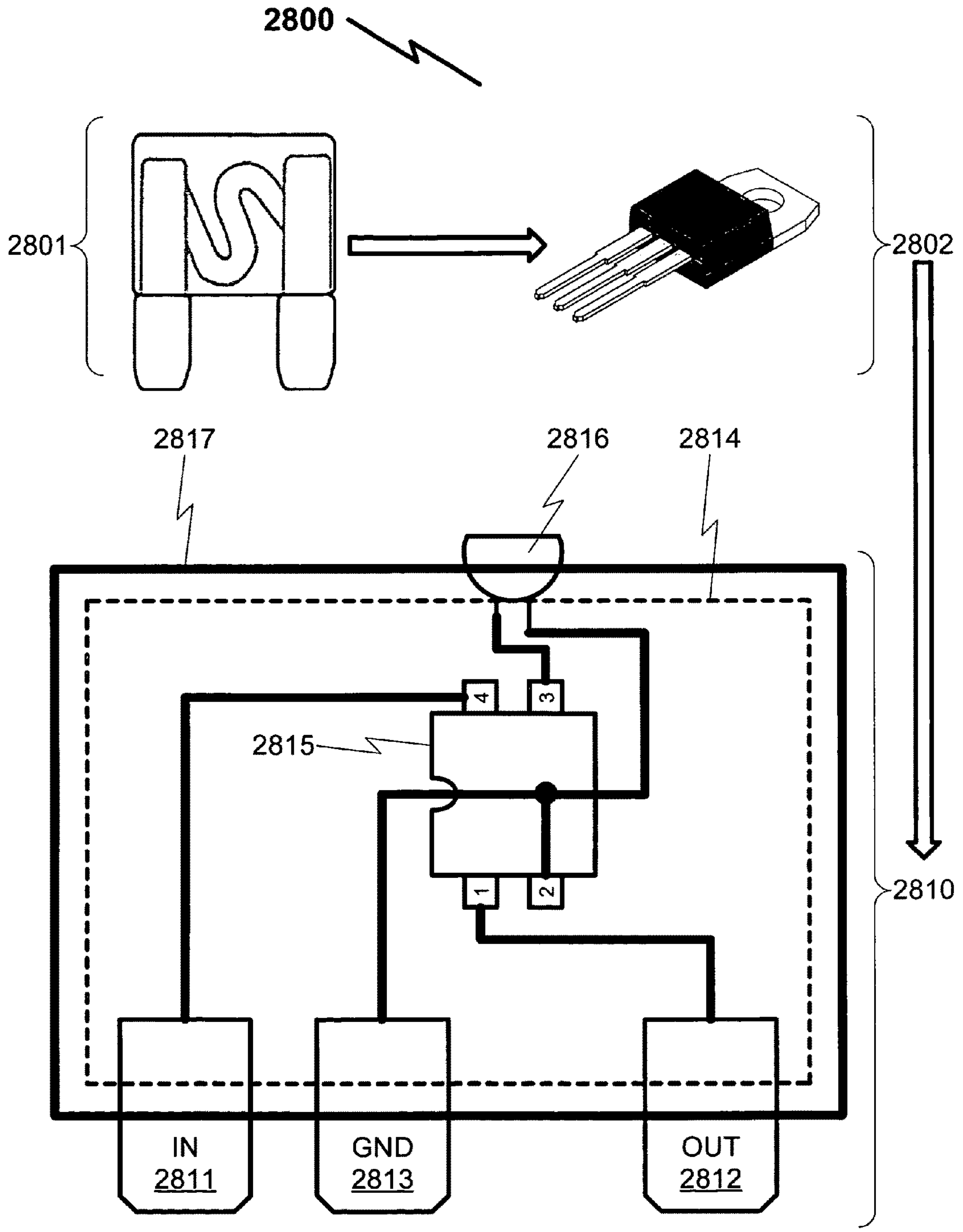
FIG. 28 illustrates a preferred exemplary packaging embodiment of the present invention incorporating integrated programmable fusing architecture.

The integrated programmable fuse architecture generally illustrated in FIG. 27 (2700) may be packaged in a wide variety of configurations. However, one anticipated and preferred exemplary embodiment is generally illustrated in FIG. 28 (2800). In this preferred exemplary embodiment, a conventional "blade fuse" package (2801) is transformed via a conventional transistor integrated packaging model (2802) and modified slightly to incorporate three (rather than two) blades: power input (2811), power/load output (2812), and ground (2813). These "blades" are attached (optimally soldered) to a printed circuit board (2814) on which is attached an integrated circuit (2815) comprising the programmable fuse element system components generally illustrated in FIG. 25 (2500), FIG. 26 (2600), and FIG. 27 (2700). An optional indicator (LED) (2816) may also be provided to provide visual indicia of fuse status. The system as generally illustrated may be encapsulated (2817) in epoxy or some other non-conductive material for protection of the system elements.

One skilled in the art will recognize that conventional integrated circuit epoxy/plastic injection molding techniques in conjunction with application specific leadframe designs may be incorporated to eliminate one or more of the mechanical components illustrated in FIG. 28 (2800) to provide a more complete level of integration. For example, it is possible to fabricate a custom leadframe incorporating the blade lugs (2811, 2812, 2813), the interconnecting PCB traces, and mounting support for the integrated circuit die (2815) and/or indicator LED (2816). This packaging approach permits the entire unit to be epoxy/plastic encapsulated and sold as a standalone universal programmable fuse.

Integrated Programmable Fuse Programming (2900)

The present invention anticipates a wide variety of programming methodologies may be appropriate to set the values stored in the fuse settings memory (2521, 2721) generally illustrated in FIG. 25 (2500), FIG. 26 (2600), and FIG. 27 (2700). The programming means may take a wide variety of forms, from fixed jumpers/straps to fused links within the IC circuitry providing these functions, and/or a programming interface in which the individual fuse is programmed by the fuse box as it is initially inserted into the fuse box.

Figure 29:
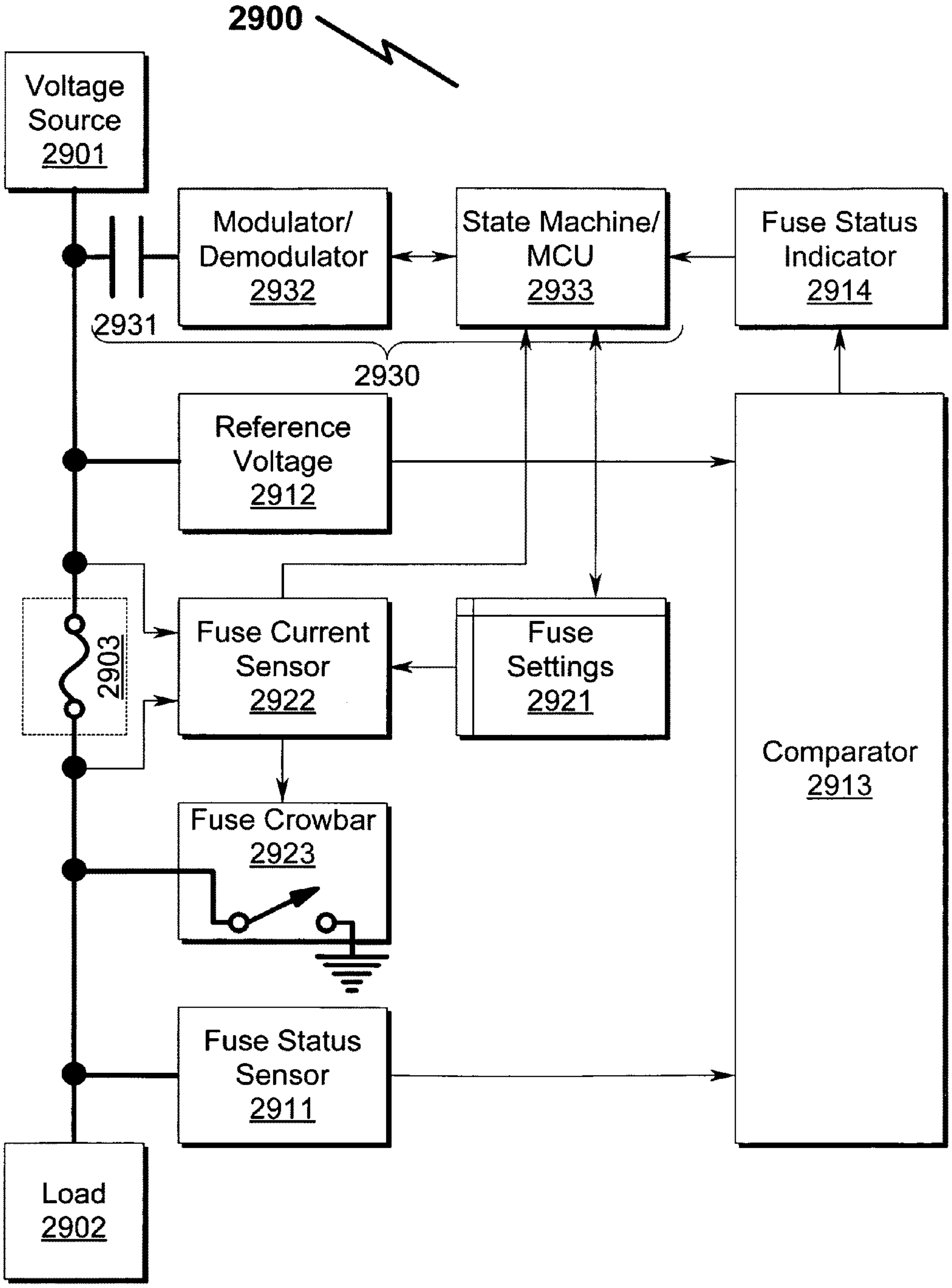
FIG. 29 illustrates a preferred exemplary embodiment of the present invention incorporating fuse programming within the fuse box system context.

One preferred exemplary embodiment of a programmable fuse programming architecture is generally illustrated in FIG. 29 (2900). Upon inspection it can be seen that this architecture closely mimics that of FIG. 25 (2500), with the exception of additional communication system components (2930) incorporating a bus interface (2931), modulator/demodulator (2932), and state machine/MCU controller (2933). This communication system (2930) permits communication with a central processor located internal to or external to the fuse box proper and having an electrical and/or wireless connection with the voltage source (2901).

These additional components permit data communication to occur between the remote computer system (not shown) and the fuse settings memory (2921) for the purpose of both setting the values of the fuse settings memory (2921) as well as optionally inspecting their values. This configuration also permits inspection of the fuse status indicator (2914) as well as the fuse current sensor (2922).

Thus, the configuration illustrated in FIG. 29 (2900) permits complete fuse and load status reporting and programmable fuse configuration within the context of the fuse element itself, a departure from the current state of the art in which neither reporting of fuse/load status nor fuse programmability is possible. As mentioned previously and indicated in FIG. 28 (2800), this preferred embodiment may be fully integrated into a singular fuse body in some preferred exemplary embodiments.

Integrated Programmable Fuse Programming Protocol (3000)

Figure 30:
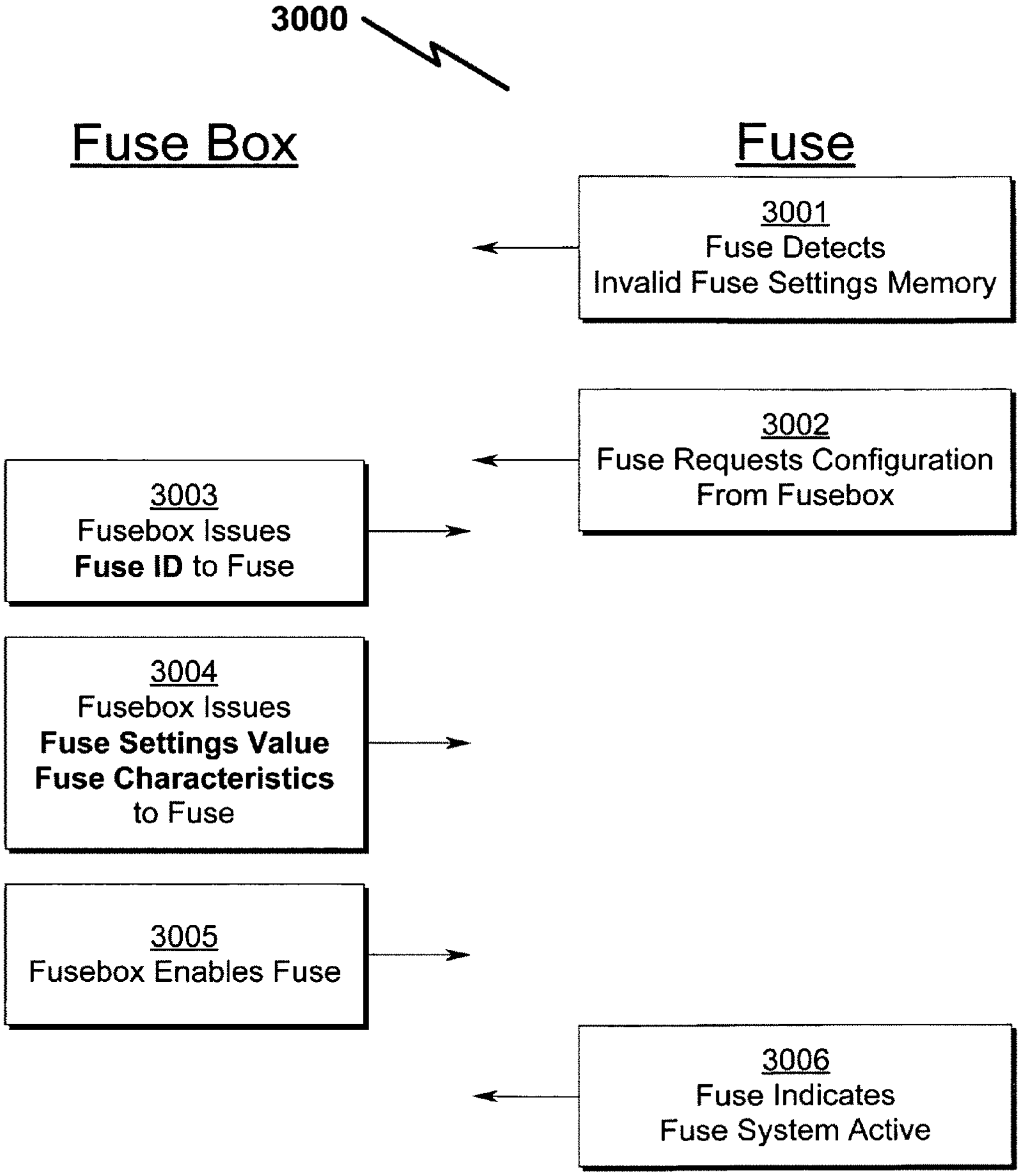
FIG. 30 illustrates a preferred exemplary embodiment of a fuse programming protocol useful in some preferred exemplary embodiments of the present invention.

The programming system methodology utilized to program the programmable fuses as generally illustrated in FIG. 29 (2900) may utilize a wide variety of fuse programming protocols to accomplish this goal. One preferred exemplary embodiment of the present invention utilizes a protocol procedure stack as generally illustrated in FIG. 30 (3000).

In this preferred exemplary embodiment, once the fuse is inserted into the fuse box the following sequence occurs:

- The fuse detects an invalid fuse settings memory (one that has not been properly configured (3001). This condition may be detected by having the fuse settings memory default to a value that is not a valid fuse setting on power up.
- The fuse requests configuration from the fuse box (3002).
- The fuse box issues a fuse identification (ID) to the fuse (3003).
- The fuse box issues fuse settings value(s) and fuse characteristic(s) to the fuse (3004).
- The fuse box enables the fuse by issuing a fuse enable command to the fuse (3005).
- The fuse activates the fuse settings memory with the received value and fuse characteristics and indicates that the fuse is active (3006).

One skilled in the art will recognize that this protocol may vary widely based on the specific application for the programmable fuse. Furthermore, the system as described may automatically "blow" the fuse after a predetermined time should no configuration information be received from the fuse box to prevent a fuse from being used in a circuit that has not been properly configured. Additionally, the system may be augmented to request fuse configuration on each power up of the system power supply. In this manner, a programmed fuse moved to another fuse socket within the fuse box will automatically be programmed with the appropriate fuse rating.

Cascaded Programmable Fuse Programming Architecture (3100)

While the preferred exemplary embodiments generally illustrated in FIG. 28 (2800), FIG. 29 (2900), and FIG. 30 (3000) are useful in many environments, some preferred system contexts may require the capability to uniquely identify a particular fuse within a fuse box system, as well as to interrogate the fuse or determine its relative position in the fuse box with relation to other fuses. The architecture generally illustrated in FIG. 31 (3100) can provide such capability in these contexts.

Figure 31:
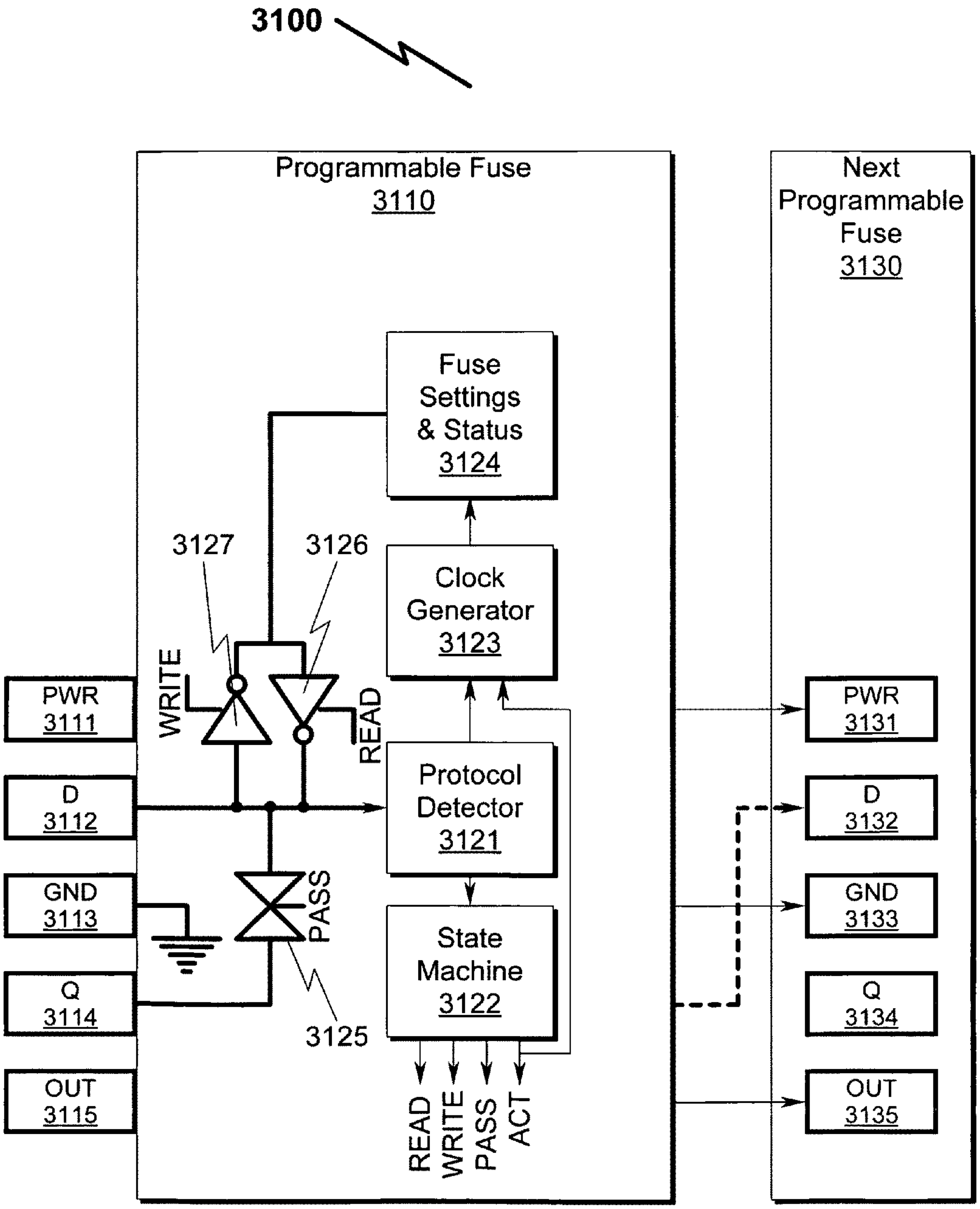
FIG. 31 illustrates an alternate preferred exemplary embodiment of the present invention incorporating cascaded fuse programming within the fuse box system context.

Referencing FIG. 31 (3100), the programmable fuse system (3110) as generally illustrated comprises a five terminal fuse having power input (3111), ground (3113), and power output (3115) terminals as were generally illustrated in FIG. 28 (2800) (2811, 2812, 2813) but adds data input (D) (3112) and data output (Q) (3114) terminals to permit daisy chaining of a given Q output (3114) of a particular fuse (3110) to the corresponding D input (3132) of the next fuse (3130) within a particular chain of fuses. While many preferred embodiments of this five terminal device are possible, a preferred system context utilizes the spade lug architecture generally illustrated in FIG. 28 (2800) with an expansion of spade lug count to incorporate a five terminal fuse system.

This configuration, in conjunction with the integrated protocol detector (3121), state machine (3122), clock generator (3123), and fuse status and settings memory (3124) permits each fuse to be individually addressed, interrogated, and/or controlled independent of all other fuses within the system. The state machine (3122) generates logic outputs (READ, WRITE, ACTIVE, PASS-THRU) that are used to control a pass-thru device (3125) and corresponding read (3126) and write (3127) logic that interface to the fuse status and settings memory (3125) that is read/written under control of a clock generator (3123) derived from the protocol detector (3121).

The general approach of this preferred embodiment is to permit a host control computing device (CPU, MCU, etc.) to communicate with a string of fuses having cascaded D-inputs and Q-outputs that are connected in series to permit only one fuse at a given time to communicate with the host control computing device. While the architecture illustrated in FIG. 31 (3100) represents a preferred exemplary embodiment, the present invention can also be implemented utilizing 1-WIRE® brand communication interface devices from Dallas Semiconductor/Maxim Integrated Products, Inc. (www-.maxim-ic.com) and their associated protocols. Specifically, the technology disclosed in U.S. Pat. No. 5,210,846 for ONE-WIRE BUS ARCHITECTURE is anticipated by the present invention to capable of being utilized within this context to achieve the desired fuse selectivity while minimizing the overall complexity of the physical communication interface.

Programmable Fuse Programming State Machine (3200)

Figure 32:
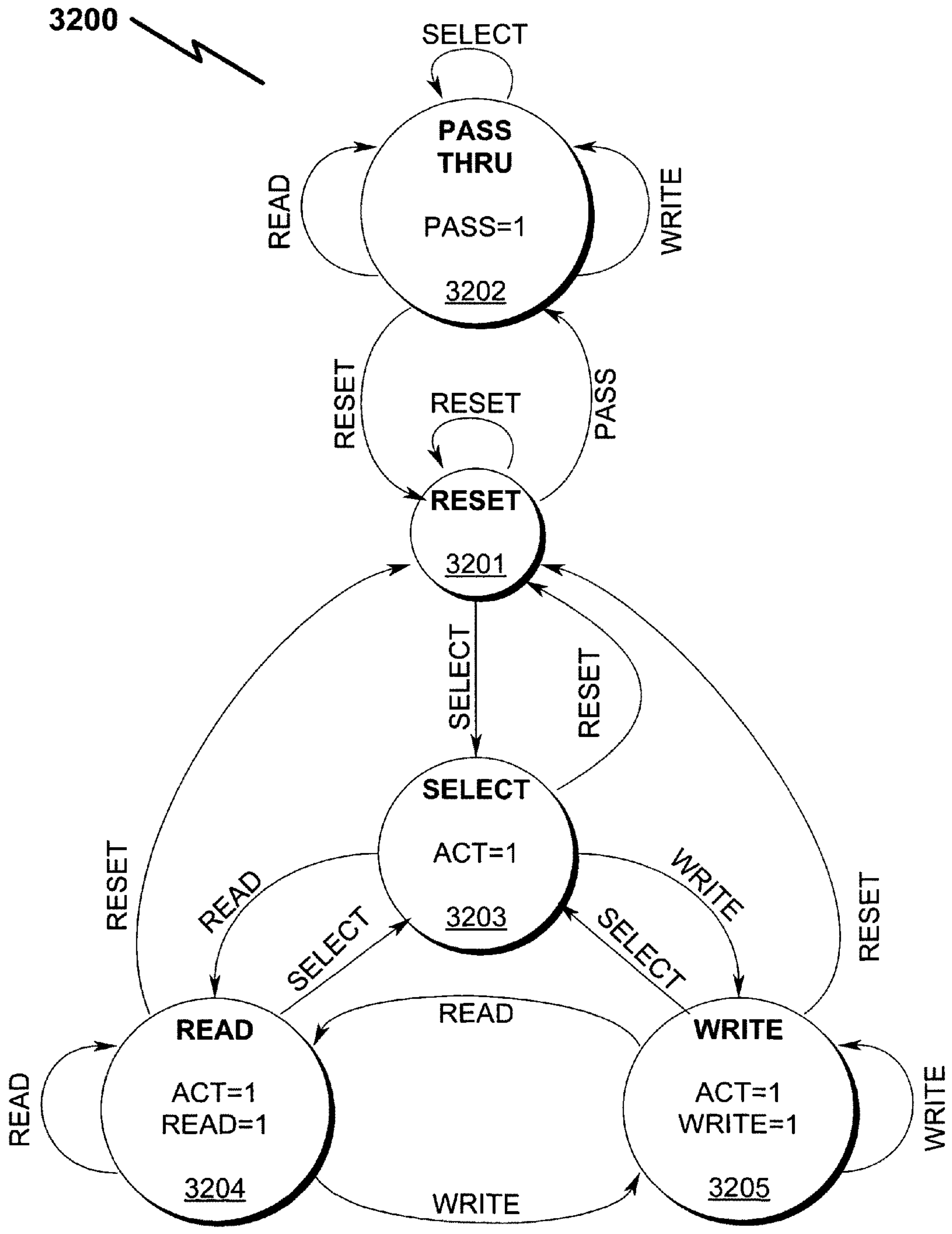
FIG. 32 illustrates a preferred exemplary embodiment of a state machine useful in implementing some preferred exemplary embodiments of the present invention incorporating the programmable fuse concept.

While the preferred exemplary system embodiment generally illustrated in FIG. 31 (3100) may utilize a wide variety of state machine protocols within the state machine (3122), a preferred exemplary state machine embodiment is generally illustrated in FIG. 32 (3200). In this exemplary state machine the signals ACT, PASS, READ, WRITE correspond to output signals indicating the current fuse is ACTIVE, in PASS-THRU mode, READING local status/memory information, or WRITING local status/memory information.

The RESET state (3201) indicates that the current fuse is ready to accept state changing commands. The PASS THRU state (3202) is entered to permit the current fuse to pass thru protocol information to the subsequent fuse in the chain. Once a fuse is in pass-thru mode, it will remain so until RESET. A PASS-THRU counter may be used to indicate the current pass thru level. If a given fuse in the chain detects a SELECT state transition (3203), the ACT signal is activated and the fuse then permits transitions into the READ (3204) or WRITE (3205) states to permit reading or writing data from/to the fuse settings and status memory (3124). Note that this protocol permits interleaved read/write operations depending on the particular state transitions detected by the protocol detector (3121). One skilled in the art will recognize that this particular state machine implementation (3200) is only exemplary and that a wide variety of state machine implementations are possible within the scope of the teachings of the present invention.

Generalized Diagnostic System Architecture (3300)

The present invention has taught that an individually fused electrical circuit can be uniquely identified with an electronic serial number. The invention also teaches that this unique circuit serial number can be the basis of a diagnostic system and method incorporating an architecture generally illustrated in FIG. 33 (3300).

Figure 33:
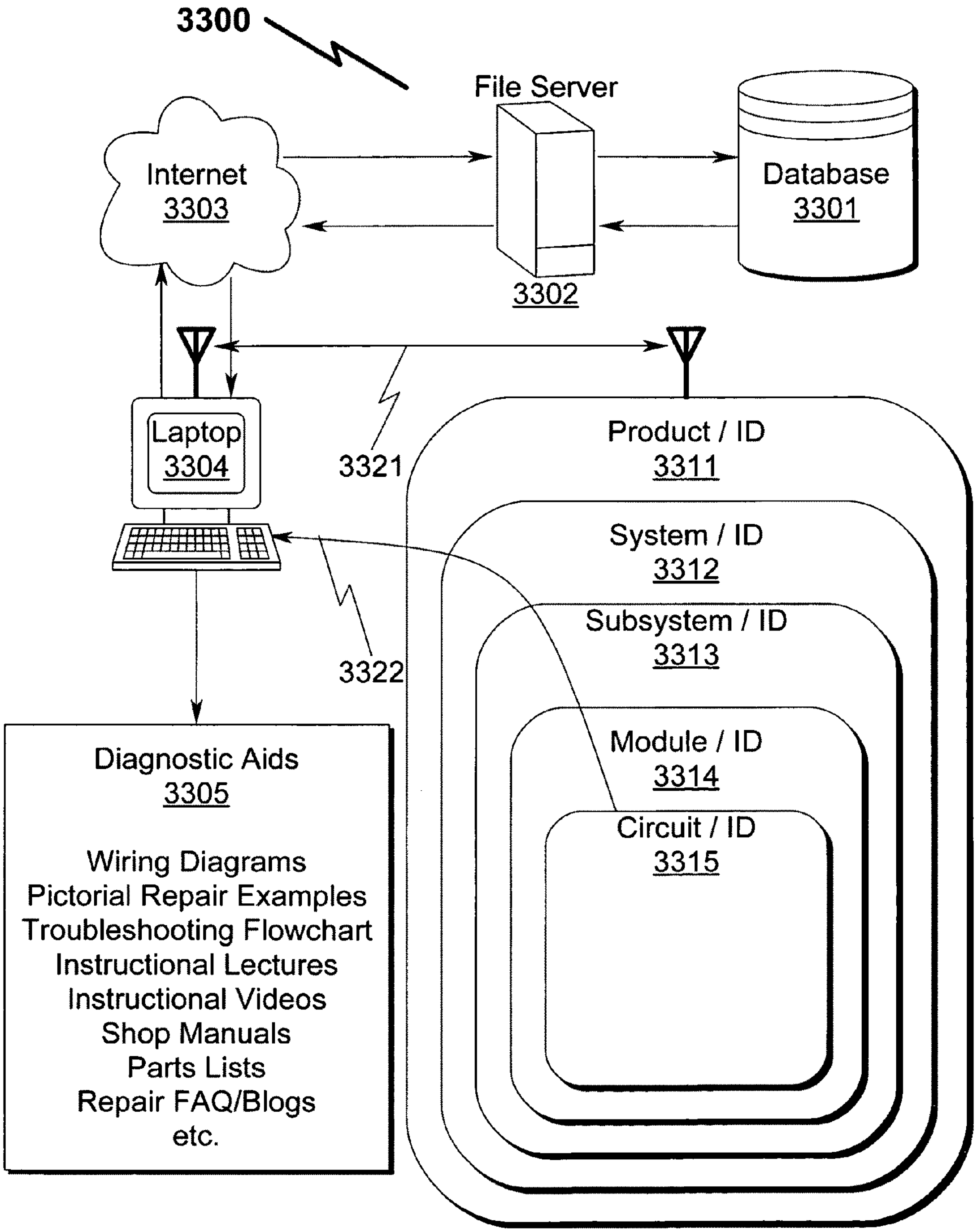
FIG. 33 illustrates a preferred exemplary embodiment of the present invention as applied to remote interrogation and inspection of existing circuit breaker panels and their respective fuse and load status indicators.

Referencing FIG. 33 (3300), the system architecture permits a database (3301) comprising a plethora of knowledge data about individual fuse elements that are contained within the context of a given product (3311). In this example, the product (3311) in question can be subdivided into systems (3312), subsystems (3313), modules (3314), and individual fused circuits (3315), although one skilled in the art will recognize that this hierarchical mapping may be to any number of levels including a wide variety of categorizations. Collectively, these component combinations will be referred to as a "product tree." The gist of the teaching here is that a given product can be uniquely identified as well as all of its constituent parts, such that an individual fused circuit can be given both a generic identifier and one associated with the particular production lot of the part. For example, a given product or subsystem might have different revisions or modifications, different build dates, and different circuit topologies based on a wide variety of circumstances. This information is contained both in a unique product identifier for the part produced as well as a generic identifier of the product/model being identified. Thus, this database (3301) can include information on interoperability of different components as well as information on modules that should be repaired or replaced as the result of recalls, product improvements, etc.

The database (3301) is maintained by a file server (3302) that communicates over the Internet (3303) with a human interface/display device (3304) (a desktop computer, laptop, smartphone, computer tablets, etc. in many preferred embodiments). This human interface (3304) can communicate (3321) with the product (3311), system (3312), subsystem (3313), module (3314), and/or circuit (3315) to interrogate the status of system components and fuses using the teachings of the present invention described previously. This interrogation produces a data flow (3322) from these components and/or circuits that is used to query the database (3301) for diagnostic aids associated with the component being interrogated.

The present invention anticipates a marriage of the ID and status information retrieved from the product tree (product (3311), system (3312), subsystem (3313), module (3314), and/or circuit (3315), etc.) as matched against the database (3301) to provide a wide variety of diagnostic aids to troubleshoot and maintain the component (product (3311), system (3312), subsystem (3313), module (3314), and/or circuit (3315)) in question. This methodology provides a great benefit for technicians in the field because they need not maintain shop manuals or other data on all the systems and modules associated with a given product. Rather this information is centrally located in the database (3301) and can be updated once for global distribution to the field.

The present invention specifically anticipates (but is not limited to) the following types of diagnostic aids (3305):

- Wiring Diagrams—Wiring diagrams associated with the fused circuit that is experiencing problems. Note that these diagrams might highlight the fused circuit that has failed, and may include additional diagnostic information available by selecting the wired circuit on the display.
- Pictorial Repair Examples—Pictures of repair examples associated with the failed electrical circuit. This may include information on circuit identification, wire routing, cable management, and other aids to diagnosing and repairing the circuit fault.
- Troubleshooting Flowchart—flowcharts associated with a given circuit fault, permitting the repair technician the opportunity to logically troubleshoot the failed circuit.

Note that some of the test points performed in this troubleshooting sequence may be performed automatically by the system by interrogating portions of the product/system via the wired/wireless communications mechanism (3321).

Instructional Lectures—Sound/audio based lectures guiding the repair technician based on status values detected are anticipated to be implemented in some preferred embodiments of the present invention.

Instructional Videos—Video based instructional videos guiding the repair technician based on status values detected are anticipated to be implemented in some preferred embodiments of the present invention.

Shop Manuals—Shop manuals automatically indexed to the section associated with the detected circuit fault are anticipated to be implemented in some preferred embodiments of the present invention.

Parts Lists—Repair parts lists and possible parts sourcing/availability are anticipated to be implemented in some preferred embodiments of the present invention. This information includes the potential for non-OEM aftermarket parts identification and sourcing.

Repair FAQ/Blogs—Online FAQ sections keyed to the faulted circuit and their associated online blogs sorted by relevance to the current circuit fault are anticipated to be implemented in some preferred embodiments of the present invention.

A key advantage to the structure of the present invention as detailed in FIG. 33 (3300) is the ability to accommodate and manage a wide variety of modifications to a given product tree within the context of engineering change orders, recalls, product updates, maintenance schedules, and the like. By uniquely identifying each fused circuit along with providing generic identification of the type of circuit being monitored in addition to the generic module identification, the database (3301) can be configured to prevent incompatible modules from being mixed, can ensure that out-of-date modules are replaced, and can flag modules for maintenance or replacement based on their performance. This capability integrates a degree of safety and uptime performance not currently provided by or possible with the prior art.

Preferred Exemplary Diagnostic System Embodiment (3400)

Figure 34:
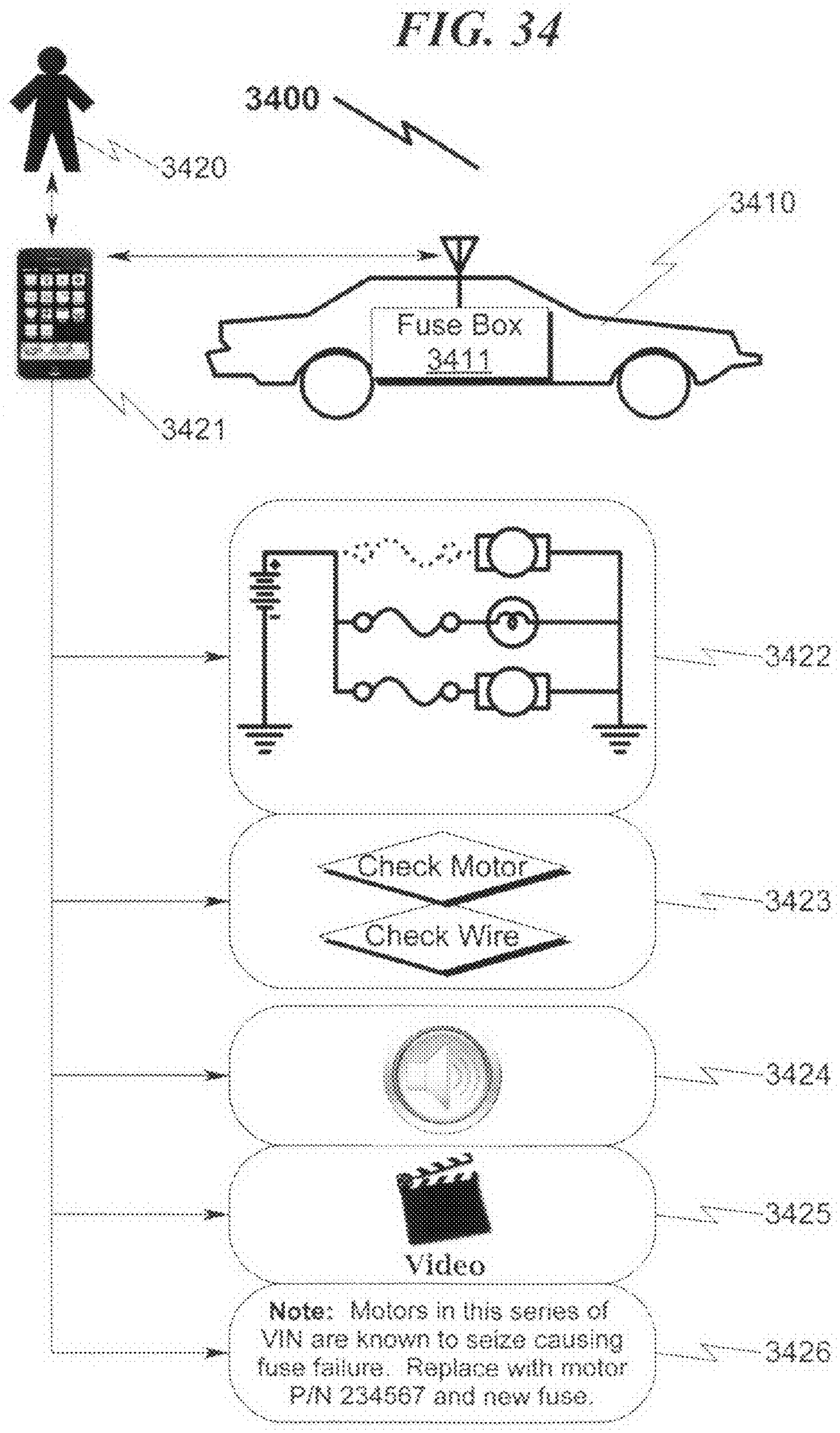
FIG. 34 illustrates a preferred exemplary embodiment of the present invention as applied to diagnosis and maintenance of automobile electrical systems.

One preferred exemplary embodiment of the general system architecture illustrated in FIG. 33 (3300) is illustrated in the overview presented in FIG. 34 (3400) as it applies to diagnosis and repair of automobiles, and preferably all-electric and/or hybrid electric models. In this preferred exemplary embodiment, the automobile (3410) incorporates a fuse box system (3411) as detailed herein that communicates to a technician (3420) via wireless link to an interface device (3421), in this case a smartphone. Elements of communication between the interface device (3421) and a remote network/server/database have been omitted for clarity and may be referenced as previously described in FIG. 33 (3300).

The interface device (3421) permits a variety of diagnostic tools to be presented to the operator (3420) for the purposes of diagnosing and maintaining the automobile (3410). One such aid would be a schematic (3422) of the automobile electrical system indicating the position of the blown fuse and systems that the fused circuit operates. A second such exemplary aid might be a flowchart (3423) indicating a series of steps to perform in diagnosing the electrical system failure. Other such exemplary aids might include audio instruction (3424), video instruction (3425), or blogs/ECOs (3426) targeting the specific model of the automobile and the specific circuit being diagnosed.

Exemplary Satellite Diagnostic System Embodiment (3500)

Figure 35:
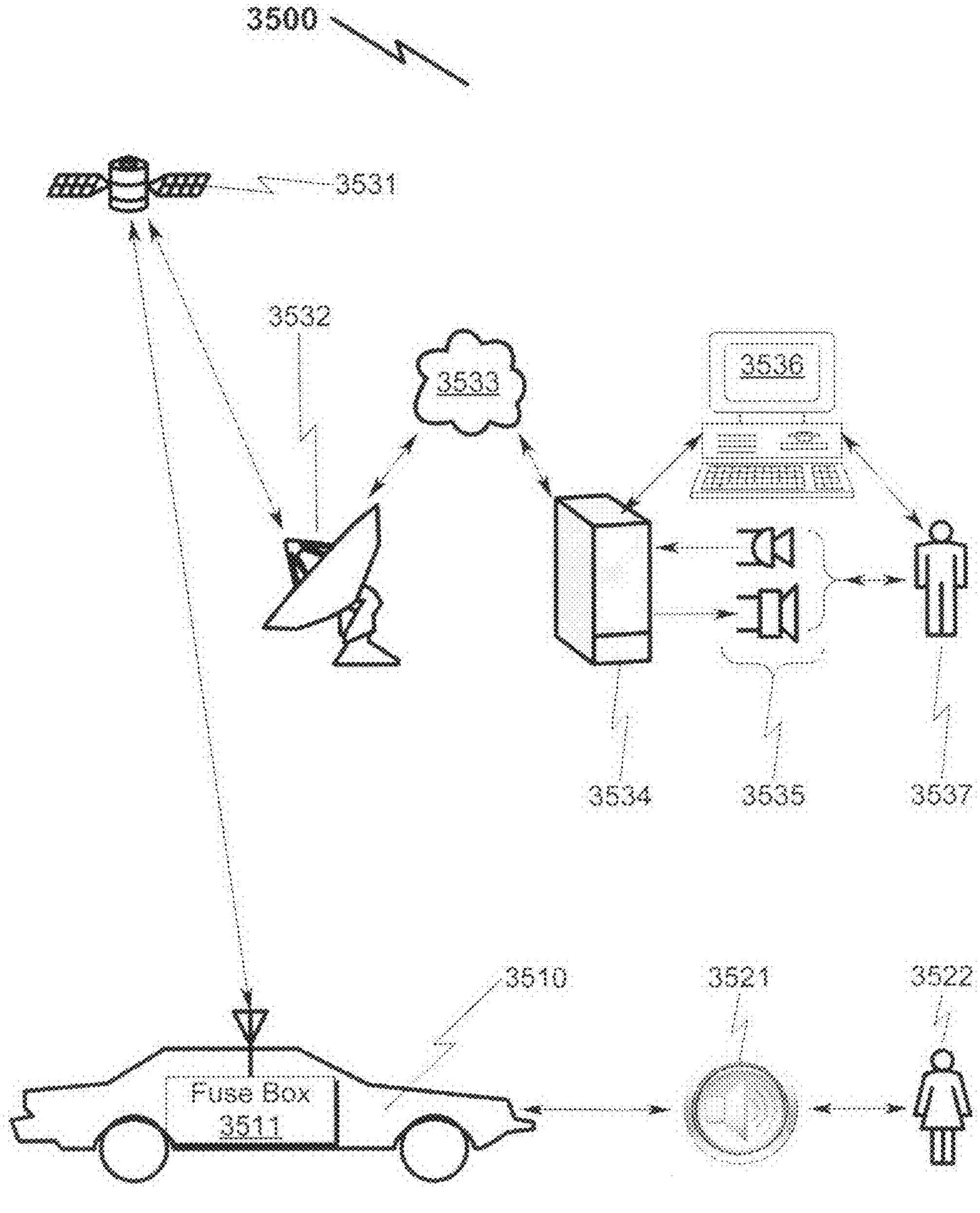
FIG. 35 illustrates a preferred exemplary embodiment of the present invention as applied to remote satellite diagnosis and maintenance of automobile electrical systems with a bi-directional customer audio interface.

One preferred exemplary embodiment of the general automotive system architecture illustrated in FIG. 34 (3400) incorporates satellite communications monitoring of the vehicle condition and is illustrated in the overview presented in FIG. 35 (3500). In this preferred embodiment, the automobile (3510) incorporates a fuse box system (3511) as previously described. This fuse box system (3511) communicates via wireless communications to a satellite (3531) to a satellite uplink (3532) connected to a network (3533) having one or more servers (3534) that host diagnostic software as previously described herein. These servers (3534) permit bi-directional audio communication (3535) from service personnel (3537) to speaker/microphones (3521) contained within the automobile (3510) to relate information to/from the automobile user (3522).

Upon detection of a fuse failure or some other notable event within the context of the fuse box system (3511) in the automobile (3510), information is relayed via the satellite (3531) to the server (3534) and via computer terminal (3536) to the service personnel (3537) who diagnoses the problem and communicates to the automobile user (3522) the need for automobile service and/or other information of a safety related nature.

While satellite systems such as the General Motors Corporation ONSTAR® brand automobile communications system already exist, the present invention permits a tighter integration of system and electrical diagnostic procedures to be tied to these existing communication platforms without the need for a large degree of additional electrical infrastructure (and cost) to support these functions.

For example, the current monitoring capabilities of the fuse box system (3511) as described herein permit long term load characterizations to occur that would tend to indicate potential failure of automobile system components without the need for additional costly sensor installations. One such example would be monitoring the power consumption of the fuel pump to determine if the pump was drawing excessive current, a sign that the automobile fuel filter might be clogged and in need of replacement. Other such indicators such as a change in taillight current consumption might indicate a possible taillight failure. Other examples include things such as failure of headlights and other accessories necessary to the safe operation of the vehicle, including such conditions as excessive battery charging currents that might indicate a high probability of future battery failure.

Exemplary Integrated Diagnostic System Embodiment (3600)

Figure 36:
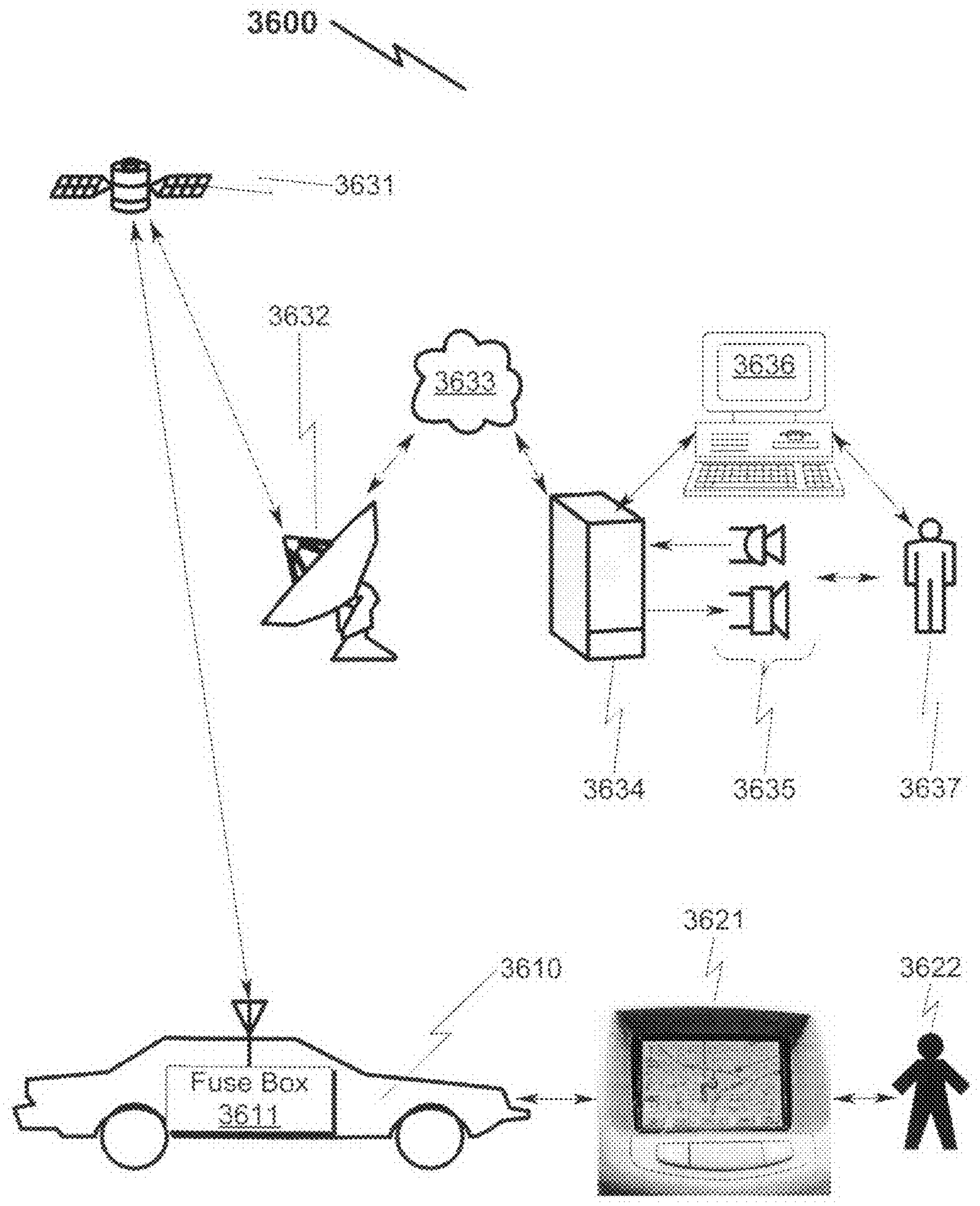
FIG. 36 illustrates a preferred exemplary embodiment of the present invention as applied to integrated remote satellite diagnosis and maintenance of automobile electrical systems.

While the system as generally illustrated in FIG. 35 (3500) is primarily focused in supporting the users (3522) of automobiles (3510), the present invention anticipates that the system as described could be modified as generally illustrated in FIG. 36 (3600) to provide an audio/video interface (for example, via an existing backup camera system and/or video navigational console (3621)) to permit the automobile (3610) to communicate with the remote server (3634) to permit a wide variety of automobile diagnostic functions to be performed with a system that was totally integrated within the context of the automobile (3610). In this situation, all the features and functionality described in FIG. 33 (3300), FIG. 34 (3400), and FIG. 35 (3500) could be integrated within this framework to eliminate the need for additional hardware/software external to the automobile to perform maintenance and diagnostic functions by trained technicians (3622).

The present invention also anticipates that if the automobile (3510, 3610) is equipped with a cellular phone connection or a wireless connection that the wireless satellite functionality may be replaced by this capability with no loss of generality in the teachings of the invention.

Generalized Diagnostic System Architecture

The fuse box diagnostic systems previously described can be generalized by the following description:

A fuse box diagnostic system comprising:

(a) A product diagnostic database, wherein the product comprises a product tree of hierarchical product components and subsystem mappings;

(b) A file server that maintains the product diagnostic database;

(c) A human interface/display device; and (d) A communication media connecting the file server and the human interface/display device;

wherein the human interface communicates with the product to interrogate the identification of the product tree components and subsystem mappings via a fuse box system interface;

the human interface communicates with the product to interrogate the status of the product tree via a fuse box system interface;

the human interface communicates with the file server the identification of the product tree components and subsystem mappings and retrieves from the file server diagnostic aids from the product diagnostic database; and the human interface presents the diagnostic aids to a user for the purpose of diagnosing and correcting errors detected in the product tree status retrieved from the fuse box system interface.

One skilled in the art will recognize that while this general description may be varied as to the numerous embodiments it encompasses, it generally describes the integration of the fuse box system described herein into an integrated diagnostic system.

System Variations

The present invention anticipates a wide variety of system variations in the basic theme of construction. The examples presented previously do not represent the entire scope of possible usages. They are meant to cite a few of the almost limitless possibilities. Some preferred system embodiments include the following:

An embodiment wherein the comparator comprises an operational amplifier (OPAMP).

An embodiment wherein the comparator comprises an operational transconductance amplifier (OTA).

An embodiment wherein the fuse status indicator comprises an audible alarm.

An embodiment wherein the fuse status indicator activates an audible alarm if the fuse is determined by the comparator to be blown (failed).

An embodiment wherein the fuse status indicator comprises a light emitting diode (LED).

An embodiment wherein the fuse status indicator illuminates a light emitting diode (LED) if the fuse is determined by the comparator to be blown (failed).

An embodiment wherein the fuse status indicator illuminates a light emitting diode (LED) if the fuse is determined by the comparator to be not blown (operational).

An embodiment wherein the status of the fuse is statically sampled.

An embodiment wherein the status of the fuse is dynamically sampled.

An embodiment wherein the fuse status indicator comprises a controlled current source that incorporates a gated enable to oscillate the illumination of a visual indicator.

An embodiment wherein the fuse status indicator comprises a controlled current source that incorporates a bandgap reference to stabilize the current through a visual indicator.

An embodiment wherein the fuse status indicator comprises a controlled current source that incorporates a bandgap reference with startup circuitry to stabilize the current through a visual indicator.

An embodiment wherein the fuse status indicator comprises a controlled current source that incorporates a bandgap reference with startup circuitry having zero quiescent current consumption to stabilize the current through a visual indicator.

An embodiment wherein the fuse status sensor further comprises an analog multiplexer to permit sampling more than one fuse within an array of fuses.

An embodiment wherein the fuse status indicator further comprises latch to store the resulting output of the fuse status sensor and a shift register to transmit the fuse status sensor resulting output via a wireless communication system to a wireless receiver.

An embodiment wherein the fuse status sensor further comprises a retrofit connection for attachment to a circuit breaker screw terminal.

An embodiment wherein the fuse status sensor further comprises a modular form factor compatible with a circuit breaker and further comprising a screw terminal output lug.

An embodiment wherein the fuse status indicator further comprises a power line communications interface for communication of the comparator output over power line wiring to a control computer.

An embodiment wherein the fuse status indicator further comprises X-10 communications capability for communication over power line wiring to a control computer.

An embodiment wherein the fuse status sensor further comprises a load sensor to monitor the load current drawn by the load from the voltage source through the fuse.

An embodiment wherein the fuse status sensor further comprises a load sensor to monitor the load current drawn by the load from the voltage source through the fuse and wherein the load current may be communicated via the fuse status indicator.

An embodiment wherein the system further comprises:

(a) fuse settings memory;

(b) fuse current sensor; and (c) fuse crowbar circuitry;

wherein the fuse settings memory specifies a fusing current trip point value;

the fuse current sensor determines the current flowing through the fuse by subtracting the output fuse voltage from the input fuse voltage and dividing the subtraction difference by the resistance of the fuse; and the fuse crowbar circuitry activates a current switch at the load when the current flowing through the fuse exceeds the fusing current trip point value from the fuse settings memory.

One skilled in the art will recognize that other embodiments are possible based on combinations of elements taught within the above invention description.

Generalized Method Architecture (3700)

Figure 37:
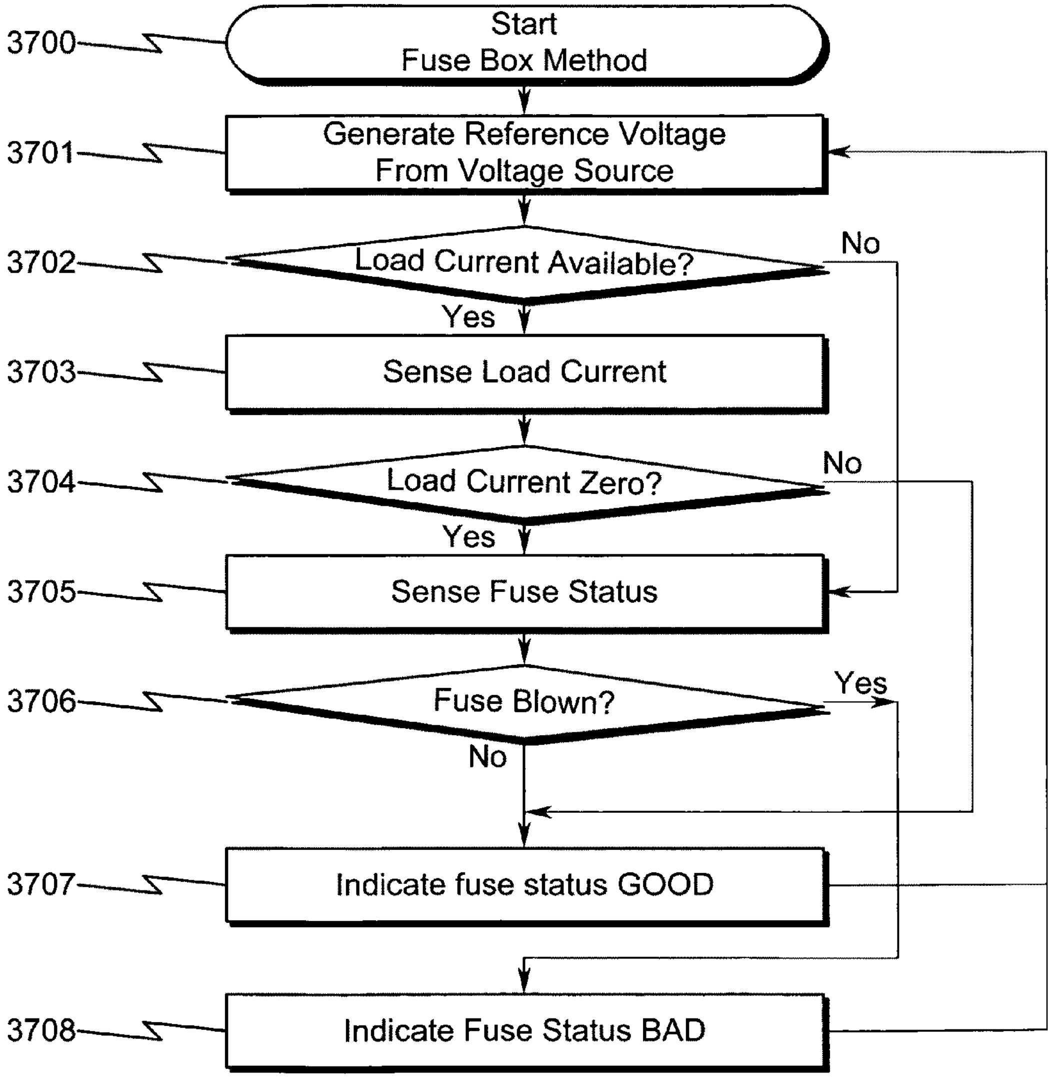
FIG. 37 illustrates an exemplary method embodiment taught by some preferred embodiments of the present invention as applied to fuse sensing status and reporting.

Given the foregoing teachings of the present invention system components, the generalized method architecture for the present invention can be viewed as described in FIG. 37 (3700). In this context, the fuse box method incorporates a system comprising the following elements:

(a) A fuse status sensor (0211) that senses the output voltage status of a fuse and generates an output voltage proportional to the fuse output voltage;

(b) A reference voltage (0212) generator that generates a reference voltage proportional to the fuse input voltage;

(c) A comparator (0213) that compares the fuse status sensor output voltage to the reference voltage and generates an output based on this comparison; and (d) A fuse status indicator (0214) that accepts the output of the comparator and provides a status indication of the fuse based on the comparator output;

wherein the fuse input voltage is derived from a voltage source;

the fuse output voltage sources a load; with said method comprising the steps of:

(1) Generating a reference voltage from a voltage source (3701) sourcing a fuse;

(2) Determining if a load current for the fuse is available, and if not proceeding to step (5) (3702);

(3) Sensing the fuse load current (3703);

(4) Determining if the fuse load current is zero, and if not proceeding to step (7) (3704);

(5) Sensing the status of the fuse (3705);

(6) Determining if the fuse is blown, and if so, proceeding to step (8) (3706);

(7) Indicating the status of the fuse as GOOD and proceeding to the step (1) (3707); and (8) Indicating the status of the fuse as BAD and proceeding to the step (1) (3708).

One skilled in the art will recognize that these method steps may be augmented or rearranged without limiting the teachings of the present invention.

Programmable Fuse Method Architecture (3800)

Figure 38:
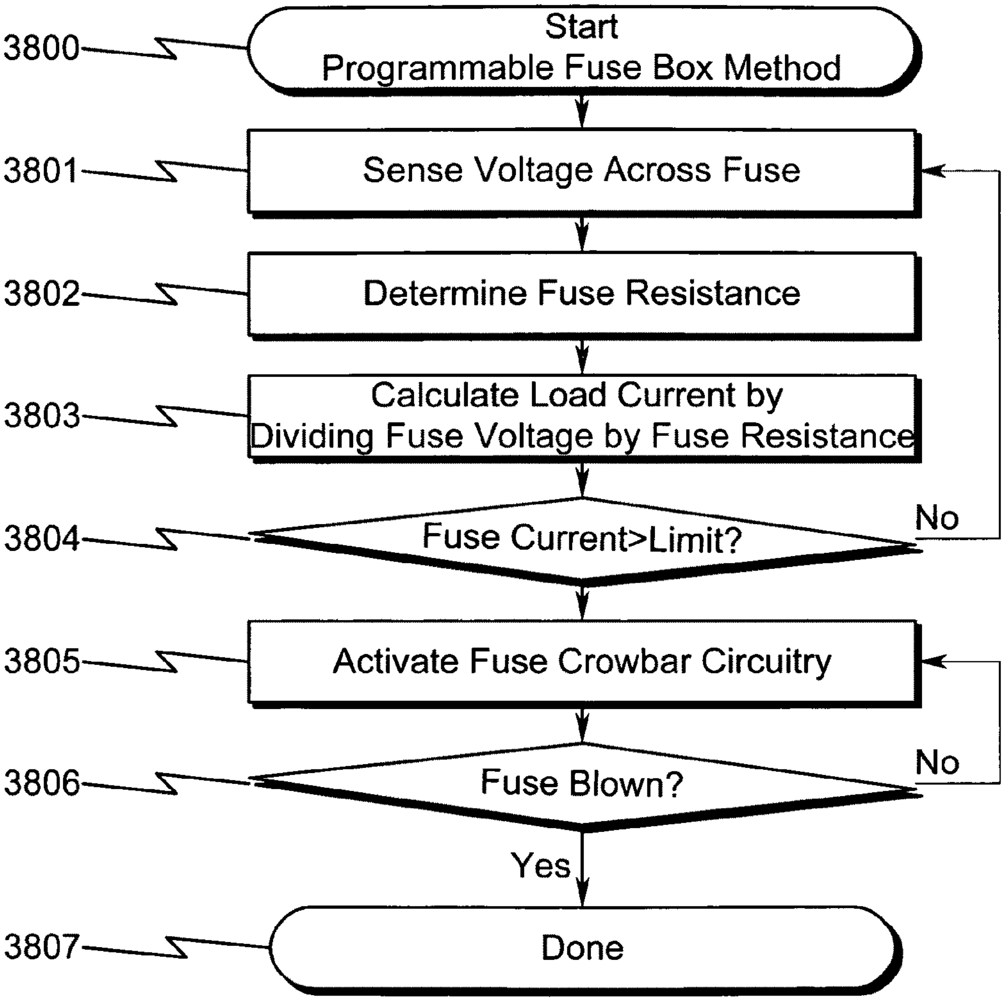
FIG. 38 illustrates an exemplary method embodiment taught by some preferred embodiments of the present invention as applied to programmable fuse embodiments.

Given the foregoing teachings of the present invention system components, a generalized programmable fuse method architecture for the present invention can be viewed as described in FIG. 38 (3800). In this context, the fuse box method incorporates a system comprising the following elements:

(a) A fuse status sensor (0211) that senses the output voltage status of a fuse and generates an output voltage proportional to the fuse output voltage;

(b) A reference voltage (0212) generator that generates a reference voltage proportional to the fuse input voltage;

(c) A comparator (0213) that compares the fuse status sensor output voltage to the reference voltage and generates an output based on this comparison; and (d) A fuse status indicator (0214) that accepts the output of the comparator and provides a status indication of the fuse based on the comparator output;

wherein the fuse input voltage is derived from a voltage source; and the fuse output voltage sources a load;

with said method comprising the steps of:

(1) Sensing the voltage across the fuse (3801);

(2) Determining the resistance of the fuse (3802);

(3) Calculating the fuse current by dividing the fuse voltage by the fuse resistance (3803);

(4) Determining if the load current is greater than the fuse trip limit, and if not, proceeding to step (1) (3804);

(5) Activating the fuse crowbar circuitry (3805); and (6) Determining if the fuse is blown, and if not, proceeding to step (5) (3806).

One skilled in the art will recognize that these method steps may be augmented or rearranged without limiting the teachings of the present invention.

Programmable Fuse Protocol Method (3900)

Figure 39:
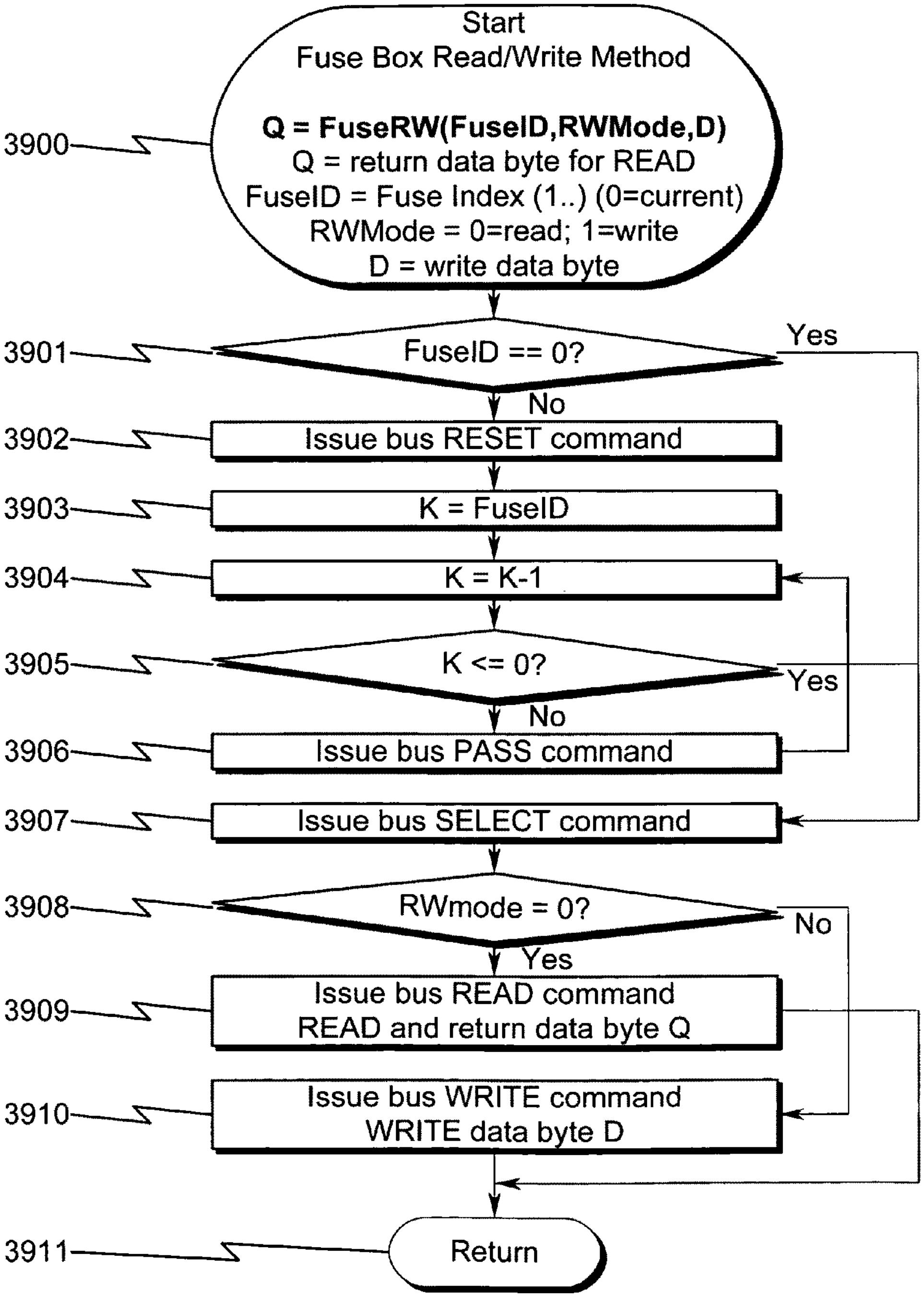
FIG. 39 illustrates an exemplary method embodiment taught by some preferred embodiments of the present invention as applied to programming protocols for programmable fuse embodiments.

The generalized programmable fuse programming protocol as represented by the exemplary state machine illustrated in FIG. 32 (3200) may be implemented via a method as generally illustrated by the flowchart in FIG. 39 (3900). This exemplary flowchart implements a read/write subroutine FuseRW having the following format:

$$Q = \text{Fuse}RW(\text{Fuse}ID, RW\text{mode}, D)$$

where

Q=the return data byte for READ commands

FuseID=the Fuse Index of the fuse to be selected, ranging from 1 to the number of fuses daisy chained, with 0 indicating that the currently selected fuse is to be READ/WRITTEN RWmode=0 for read operations and 1 for write operations;

D=the data byte value to be written to the fuse

In this context, the fuse box programming method incorporates a protocol comprising the following steps:

(1) Determining if the FuseID is zero, and if so proceeding to step (7) (3901);

(2) Issuing a bus RESET command (3902);

(3) Setting the index value K equal to the FuseID value (3903);

(4) Decrementing the index value K (3904);

(5) Determining if the index value K is less than or equal to zero, and if so, proceeding to step (7) (3905);

(6) Issuing a bus PASS command and proceeding to step (4) (3906);

(7) Issuing a bus SELECT command (3907);

(8) Determining if the RWmode value is zero, and if not, proceeding to step (10) (3908);

(9) Issuing a bus READ command and READing a byte from the bus to return as data value Q and terminating the method (3909);

(10) Issuing a bus WRITE command and WRITING the data value D to the currently selected fuse and terminating the method (3910).

One skilled in the art will recognize that these method steps may be augmented or rearranged without limiting the teachings of the present invention. Additionally, it may be apparent to those skilled in the art that the SELECT state may be dispensed with in some embodiments to achieve additional simplicity in the overall design with no loss in overall functionality.

This basic subroutine when used in conjunction with the pass-thru features of the disclosed fuse bus programming architecture permits strings of fuses to be connected and selected individually for programming, identification, and/or status retrieval.

Programmable Fuse Diagnostic Method (4000)

Figure 40:
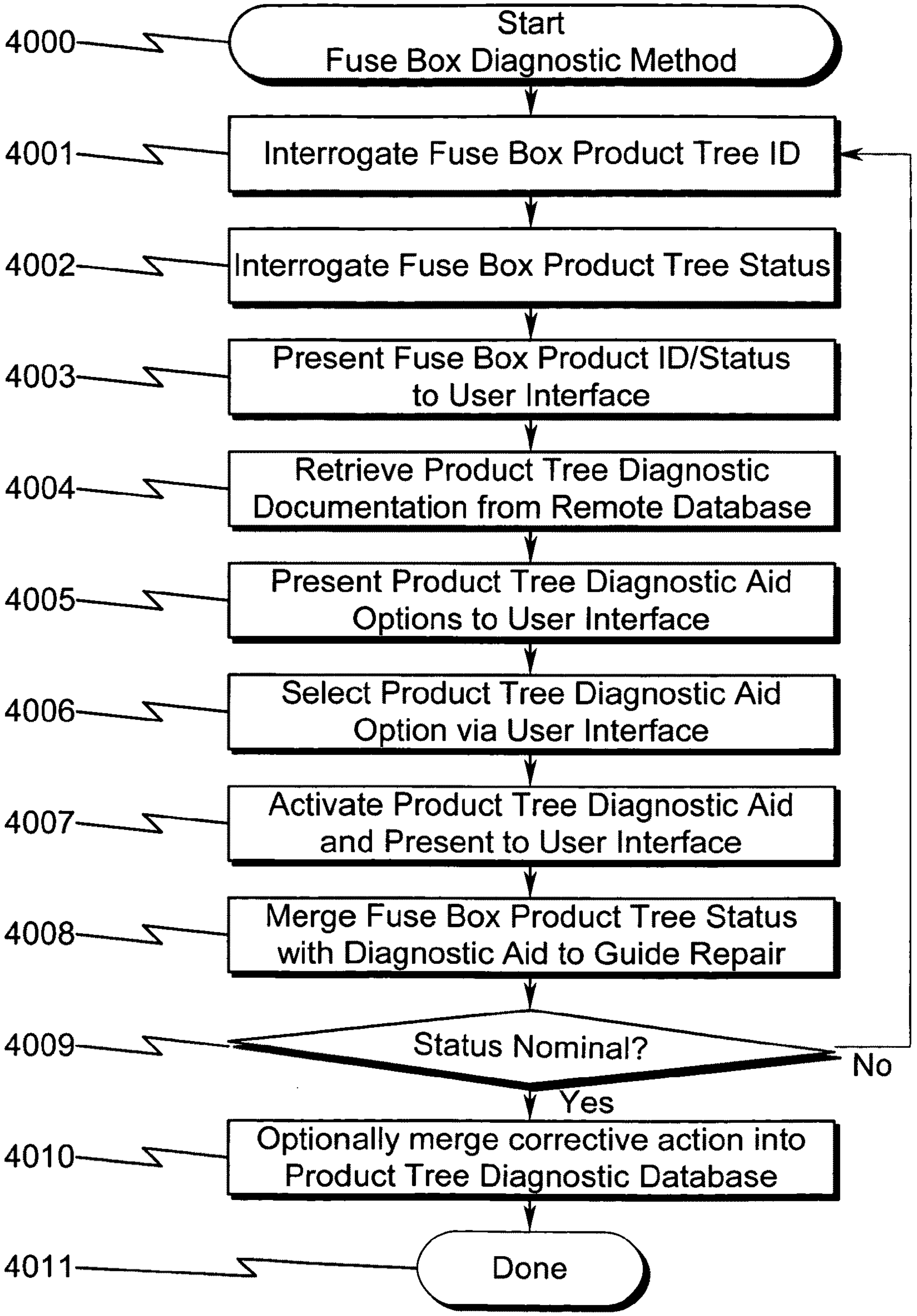
FIG. 40 illustrates an exemplary method embodiment taught by some preferred embodiments of the present invention as applied to remote diagnostic systems utilizing the disclosed fuse box system.

The generalized programmable fuse diagnostic system as represented by the exemplary system diagram illustrated in FIG. 33 (3300) may be implemented via a method as generally illustrated by the flowchart in FIG. 40 (4000). This exemplary flowchart implements a generalized diagnostic system in which the fuse box system described herein communicates with a technician via a computer interface tied to a remote database comprising product tree profiles containing a variety of diagnostic aids associated with repair and maintenance of a particular product tree in which the fuse box system is connected.

In this context, the fuse box diagnostic method comprises the following steps:

(1) Interrogate Fuse Box Product Tree ID (4001). This step interrogates the identification of each product element within the product tree.

(2) Interrogate Fuse Box Product Tree Status (4002). This step interrogates the status of each of the product tree elements to determine if it is functioning normally or is in need of service.

(3) Present Fuse Box Product ID/Status to User Interface (4003). This step displays the product tree identification and retrieved status to the technician operator as well as issues regarding any required service.

(4) Retrieve Product Tree Diagnostic Documentation from Remote Database (4004). This step retrieves information matching the specific product tree elements found within the product tree search performed by the fuse box system.

(5) Present Product Tree Diagnostic Aid Options to User Interface (4005). This step displays the diagnostic aids available to the user to address the service needs of a particular product tree element that requires service. As mentioned previously, this might include (but is not limited to) wiring diagrams, pictorial repair examples, troubleshooting flowcharts, instructional lectures, instructional videos, shop manuals, parts, lists, repair FAQ/blogs, service bulletins, etc.

(6) Select Product Tree Diagnostic Aid Option via User Interface (4006). This step permits the user/technician to select the desired form of diagnostic aid for delivery to the user.

(7) Activate Product Tree Diagnostic Aid and Present to User Interface (4007). This step loads and presents the diagnostic aid to the user from the remote product tree diagnostic database.

(8) Merge Fuse Box Product Tree Status with Diagnostic Aid to Guide Repair (4008). This step merges the information from the product tree fuse box status interrogation with the product tree diagnostic aid selected to present a plan of repair action to the user/technician.

(9) Determining if the product tree hardware status is nominal, and if not, proceeding to step (1) (4009). This step determines if the maintenance function is successful in clearing the product tree status error. If not, additional measures are taken to provide diagnostic aids to complete the repair.

(10) Optionally merge corrective action into Product Tree Diagnostic Database (4010). This optional step determines the corrective action needed to solve the product tree status error condition and feeds this information back into the product tree diagnostic database to permit historical and statistical data to be used to address product tree status errors from other sites or systems.

One skilled in the art will recognize that these method steps may be augmented or rearranged without limiting the teachings of the present invention. Additionally, it should be noted that the retrieval of product tree diagnostic information in step (4) can also result in preemptive suggestions of preferred or optimal diagnostic aids to solve the errors associated with the retrieved product tree status codes. In some circumstances the combination of the product tree ID information and the retrieved product tree status codes may be sufficient for the system to immediately suggest a course of corrective action to the problem based on historical data stored in the product tree diagnostic database. Thus, the optional step (10) above may permit feedback from the field with respect to corrective actions needed to clear the product tree status error codes. This feedback information can be used to provide statistical and historical information necessary to support diagnostics for other sites or systems with similar (but as yet undiagnosed) problems.

Generalized Programmable Fuse Diagnostic Method

The generalized programmable fuse diagnostic system as represented by the flowchart in FIG. 40 (4000) may be implemented further described as follows:

A fuse box diagnostic method wherein the method controls a fuse box diagnostic system comprising:

(a) A product diagnostic database, wherein the product comprises a product tree of hierarchical product components and subsystem mappings;

(b) A file server that maintains the product diagnostic database;

(c) A human interface/display device; and (d) A communication media connecting the file server and the human interface/display device;

wherein the human interface communicates with the product to interrogate the identification of the product tree components and subsystem mappings via a fuse box system interface;

the human interface communicates with the product to interrogate the status of the product tree via a fuse box system interface;

the human interface communicates with the file server the identification of the product tree components and subsystem mappings and retrieves from the file server diagnostic aids from the product diagnostic database; and the human interface presents the diagnostic aids to a user for the purpose of diagnosing and correcting errors detected in the product tree status retrieved from the fuse box system interface;

with the method comprising the steps of:

(1) Interrogating a product tree ID from the fuse box system;

(2) Interrogating a product tree status from the fuse box system;

(3) Presenting the fuse box product ID/status to a user interface;

(4) Retrieving diagnostic documentation from the product database for the product tree;

(5) Presenting diagnostic aid options for the product tree to the user interface;

(6) Selecting one of the product tree diagnostic aid options via the user interface;

(7) Activating the selected product tree diagnostic aid and presenting the selection to the user interface;

(8) Merge the product tree status for the fuse box system with the selected diagnostic aid to guide repair of the product tree;

(9) Determining if the product tree hardware status is nominal, and if not, proceeding to step (1); and

(10) Optionally merging corrective action into the product database.

One skilled in the art will recognize that these method steps may be augmented or rearranged without limiting the teachings of the present invention. Additionally, it should be noted that the retrieval of product tree diagnostic information in step (4) can also result in preemptive suggestions of preferred or optimal diagnostic aids to solve the errors associated with the retrieved product tree status codes. In some circumstances the combination of the product tree ID information and the retrieved product tree status codes may be sufficient for the system to immediately suggest a course of corrective action to the problem based on historical data stored in the product tree diagnostic database.

Method Variations

The present invention anticipates a wide variety of method variations in the basic theme of construction. The examples presented previously do not represent the entire scope of possible usages. They are meant to cite a few of the almost limitless possibilities. Some preferred method embodiments include the following options for incorporation in the basic system architecture to which the methods above generally control:

An embodiment wherein the comparator comprises an operational amplifier (OPAMP).

An embodiment wherein the comparator comprises an operational transconductance amplifier (OTA).

An embodiment wherein the fuse status indicator comprises an audible alarm.

An embodiment wherein the fuse status indicator activates an audible alarm if the fuse is determined by the comparator to be blown (failed).

An embodiment wherein the fuse status indicator comprises a light emitting diode (LED).

An embodiment wherein the fuse status indicator illuminates a light emitting diode (LED) if the fuse is determined by the comparator to be blown (failed).

An embodiment wherein the fuse status indicator illuminates a light emitting diode (LED) if the fuse is determined by the comparator to be not blown (operational).

An embodiment wherein the status of the fuse is statically sampled.

An embodiment wherein the status of the fuse is dynamically sampled.

An embodiment wherein the fuse status indicator comprises a controlled current source that incorporates a gated enable to oscillate the illumination of a visual indicator.

An embodiment wherein the fuse status indicator comprises a controlled current source that incorporates a bandgap reference to stabilize the current through a visual indicator.

An embodiment wherein the fuse status indicator comprises a controlled current source that incorporates a bandgap reference with startup circuitry to stabilize the current through a visual indicator.

An embodiment wherein the fuse status indicator comprises a controlled current source that incorporates a bandgap reference with startup circuitry having zero quiescent current consumption to stabilize the current through a visual indicator.

An embodiment wherein the fuse status sensor further comprises an analog multiplexer to permit sampling more than one fuse within an array of fuses.

An embodiment wherein the fuse status indicator further comprises latch to store the resulting output of the fuse status sensor and a shift register to transmit the fuse status sensor resulting output via a wireless communication system to a wireless receiver.

An embodiment wherein the fuse status sensor further comprises a retrofit connection for attachment to a circuit breaker screw terminal.

An embodiment wherein the fuse status sensor further comprises a modular form factor compatible with a circuit breaker and further comprising a screw terminal output lug.

An embodiment wherein the fuse status indicator further comprises a power line communications interface for communication of the comparator output over power line wiring to a control computer.

An embodiment wherein the fuse status indicator further comprises X-10 communications capability for communication over power line wiring to a control computer.

An embodiment wherein the fuse status sensor further comprises a load sensor to monitor the load current drawn by the load from the voltage source through the fuse.

An embodiment wherein the fuse status sensor further comprises a load sensor to monitor the load current drawn by the load from the voltage source through the fuse and wherein the load current may be communicated via the fuse status indicator.

An embodiment wherein the system further comprises:

(a) fuse settings memory;

(b) fuse current sensor; and (c) fuse crowbar circuitry;

wherein the fuse settings memory specifies a fusing current trip point value;

the fuse current sensor determines the current flowing through the fuse by subtracting the output fuse voltage from the input fuse voltage and dividing the subtraction difference by the resistance of the fuse; and the fuse crowbar circuitry activates a current switch at the load when the current flowing through the fuse exceeds the fusing current trip point value from the fuse settings memory.

One skilled in the art will recognize that other embodiments are possible based on combinations of elements taught within the above invention description.

CONCLUSION

A fuse box system and method providing for visual and/or remote sensing of interrupted fusing elements has been disclosed. The system incorporates LEDs and/or remote sensing apparatus to permit indication of a "blown" fuse and/or circuit protection breaker. This system may be configured for both polarized and/or non-polarized applications and generally provides for indicator illumination when a fuse/breaker is blown. Some preferred embodiments may incorporate current sourcing technologies to permit operation of the system over wide range of system voltages, as well as provisions for wired and/or RF/wireless interrogation of the fuse/breaker status. Alternate embodiments including systems/methods to permit remote sensing of fuse status and/or circuit current monitoring, and may be retrofit within existing fuse/breaker panel systems in some configurations.

What is claimed is:

1. A fuse box system comprising:

(a) A fuse status sensor that senses the output voltage status of a fuse and generates an output voltage proportional to said fuse output voltage;

(b) A reference voltage generator that generates a reference voltage proportional to said fuse input voltage;

(c) A comparator that compares said fuse status sensor output voltage to said reference voltage and generates an output based on this comparison; and (d) A fuse status indicator that accepts the output of said comparator and provides a status indication of said fuse based on said comparator output;

wherein said fuse input voltage is derived from a voltage source; and said fuse output voltage sources a load.

2. The fuse box system of claim 1 wherein said fuse status indicator comprises an audible alarm.

3. The fuse box system of claim 1 wherein said fuse status indicator activates an audible alarm if said fuse is determined by said comparator to be blown (failed).

4. The fuse box system of claim 1 wherein said fuse status indicator comprises a light emitting diode (LED).

5. The fuse box system of claim 1 wherein said fuse status indicator illuminates a light emitting diode (LED) if said fuse is determined by said comparator to be blown (failed).

6. The fuse box system of claim 1 wherein said fuse status indicator illuminates a light emitting diode (LED) if said fuse is determined by said comparator to be not blown (operational).

7. The fuse box system of claim 1 wherein the status of said fuse is statically sampled.

8. The fuse box system of claim 1 wherein the status of said fuse is dynamically sampled.

9. The fuse box system of claim 1 wherein said fuse status indicator comprises a controlled current source that incorporates a gated enable to oscillate the illumination of a visual indicator.

10. The fuse box system of claim 1 wherein said fuse status indicator comprises a controlled current source that incorporates a bandgap reference to stabilize the current through a visual indicator.

11. The fuse box system of claim 1 wherein said fuse status indicator comprises a controlled current source that incorporates a bandgap reference with startup circuitry to stabilize the current through a visual indicator.

12. The fuse box system of claim 1 wherein said fuse status indicator comprises a controlled current source that incorporates a bandgap reference with startup circuitry having zero quiescent current consumption to stabilize the current through a visual indicator.

13. The fuse box system of claim 1 wherein said fuse status sensor further comprises an analog multiplexer to permit sampling more than one fuse within an array of fuses.

14. The fuse box system of claim 1 wherein said fuse status indicator further comprises latch to store the resulting output of said fuse status sensor and a shift register to transmit said fuse status sensor resulting output via a wireless communication system to a wireless receiver.

15. The fuse box system of claim 1 wherein said fuse status sensor further comprises a retrofit connection for attachment to a circuit breaker screw terminal.

16. The fuse box system of claim 1 wherein said fuse status sensor further comprises a modular form factor compatible with a circuit breaker and further comprising a screw terminal output lug.

17. The fuse box system of claim 1 wherein said fuse status indicator further comprises a power line communications interface for communication of said comparator output over power line wiring to a control computer.

18. The fuse box system of claim 1 wherein said fuse status indicator further comprises X-10 communications capability for communication over power line wiring to a control computer.

19. The fuse box system of claim 1 wherein said fuse status sensor further comprises a load sensor to monitor the load current drawn by said load from said voltage source through said fuse.

20. The fuse box system of claim 1 wherein said fuse status sensor further comprises a load sensor to monitor the load current drawn by said load from said voltage source through said fuse and wherein said load current may be communicated via said fuse status indicator.

21. A fuse box method wherein said method controls a fuse box system comprising:

(a) A fuse status sensor that senses the output voltage status of a fuse and generates an output voltage proportional to said fuse output voltage;

(b) A reference voltage generator that generates a reference voltage proportional to said fuse input voltage;

(c) A comparator that compares said fuse status sensor output voltage to said reference voltage and generates an output based on this comparison; and (d) A fuse status indicator that accepts the output of said comparator and provides a status indication of said fuse based on said comparator output;

wherein said fuse input voltage is derived from a voltage source; and said fuse output voltage sources a load;

with said method comprising the steps of:

(1) Generating a reference voltage from a voltage source sourcing a fuse;

(2) Determining if a load current for said fuse is available, and if not proceeding to step (5);

(3) Sensing said fuse load current;

(4) Determining if said fuse load current is zero, and if not proceeding to step (7);

(5) Sensing the status of said fuse;

(6) Determining if said fuse is blown, and if so, proceeding to step (8);

(7) Indicating the status of said fuse as GOOD and proceeding to said step (1); and (8) Indicating the status of said fuse as BAD and proceeding to said step (1).

22. The fuse box method of claim 21 wherein said fuse status indicator comprises an audible alarm.

23. The fuse box method of claim 21 wherein said fuse status indicator activates an audible alarm if said fuse is determined by said comparator to be blown (failed).

24. The fuse box method of claim 21 wherein said fuse status indicator comprises a light emitting diode (LED).

25. The fuse box method of claim 21 wherein said fuse status indicator illuminates a light emitting diode (LED) if said fuse is determined by said comparator to be blown (failed).

26. The fuse box method of claim 21 wherein said fuse status indicator illuminates a light emitting diode (LED) if said fuse is determined by said comparator to be not blown (operational).

27. The fuse box method of claim 21 wherein the status of said fuse is statically sampled.

28. The fuse box method of claim 21 wherein the status of said fuse is dynamically sampled.

29. The fuse box method of claim 21 wherein said fuse status indicator comprises a controlled current source that incorporates a gated enable to oscillate the illumination of a visual indicator.

30. The fuse box method of claim 21 wherein said fuse status indicator comprises a controlled current source that incorporates a bandgap reference to stabilize the current through a visual indicator.

31. The fuse box method of claim 21 wherein said fuse status indicator comprises a controlled current source that incorporates a bandgap reference with startup circuitry to stabilize the current through a visual indicator.

32. The fuse box method of claim 21 wherein said fuse status indicator comprises a controlled current source that incorporates a bandgap reference with startup circuitry having zero quiescent current consumption to stabilize the current through a visual indicator.

33. The fuse box method of claim 21 wherein said fuse status sensor further comprises an analog multiplexer to permit sampling more than one fuse within an array of fuses.

34. The fuse box method of claim 21 wherein said fuse status indicator further comprises latch to store the resulting output of said fuse status sensor and a shift register to transmit said fuse status sensor resulting output via a wireless communication system to a wireless receiver.

35. The fuse box method of claim 21 wherein said fuse status sensor further comprises a retrofit connection for attachment to a circuit breaker screw terminal.

36. The fuse box method of claim 21 wherein said fuse status sensor further comprises a modular form factor compatible with a circuit breaker and further comprising a screw terminal output lug.

37. The fuse box method of claim 21 wherein said fuse status indicator further comprises a power line communications interface for communication of said comparator output over power line wiring to a control computer.

38. The fuse box method of claim 21 wherein said fuse status indicator further comprises X-10 communications capability for communication over power line wiring to a control computer.

39. The fuse box method of claim 21 wherein said fuse status sensor further comprises a load sensor to monitor the load current drawn by said load from said voltage source through said fuse.

40. The fuse box method of claim 21 wherein said fuse status sensor further comprises a load sensor to monitor the load current drawn by said load from said voltage source through said fuse and wherein said load current may be communicated via said fuse status indicator.

41. A fuse box system comprising:

(a) A fuse status sensor that senses the output voltage status of a fuse and generates an output voltage proportional to said fuse output voltage;

(b) A reference voltage generator that generates a reference voltage proportional to said fuse input voltage;

(c) A comparator that compares said fuse status sensor output voltage to said reference voltage and generates an output based on this comparison;

(d) A fuse status indicator that accepts the output of said comparator and provides a status indication of said fuse based on said comparator output;

(e) fuse settings memory;

(f) fuse current sensor; and (g) fuse crowbar circuitry;

wherein said fuse input voltage is derived from a voltage source;

said fuse output voltage sources a load;

said fuse settings memory specifies a fusing current trip point value;

said fuse current sensor determines the current flowing through said fuse by subtracting said output fuse voltage from said input fuse voltage and dividing said subtraction difference by the resistance of said fuse; and said fuse crowbar circuitry activates a current switch at said load when said current flowing through said fuse exceeds said fusing current trip point value from said fuse settings memory.

42. The fuse box system of claim 41 wherein said fuse status indicator comprises an audible alarm.

43. The fuse box system of claim 41 wherein said fuse status indicator activates an audible alarm if said fuse is determined by said comparator to be blown (failed).

44. The fuse box system of claim 41 wherein said fuse status indicator comprises a light emitting diode (LED).

45. The fuse box system of claim 41 wherein said fuse status indicator illuminates a light emitting diode (LED) if said fuse is determined by said comparator to be blown (failed).

46. The fuse box system of claim 41 wherein said fuse status indicator illuminates a light emitting diode (LED) if said fuse is determined by said comparator to be not blown (operational).

47. The fuse box system of claim 41 wherein the status of said fuse is statically sampled.

48. The fuse box system of claim 41 wherein the status of said fuse is dynamically sampled.

49. The fuse box system of claim 41 wherein said fuse status indicator comprises a controlled current source that incorporates a gated enable to oscillate the illumination of a visual indicator.

50. The fuse box system of claim 41 wherein said fuse status indicator comprises a controlled current source that incorporates a bandgap reference to stabilize the current through a visual indicator.

51. The fuse box system of claim 41 wherein said fuse status indicator comprises a controlled current source that incorporates a bandgap reference with startup circuitry to stabilize the current through a visual indicator.

52. The fuse box system of claim 41 wherein said fuse status indicator comprises a controlled current source that incorporates a bandgap reference with startup circuitry having zero quiescent current consumption to stabilize the current through a visual indicator.

53. The fuse box system of claim 41 wherein said fuse status sensor further comprises an analog multiplexer to permit sampling more than one fuse within an array of fuses.

54. The fuse box system of claim 41 wherein said fuse status indicator further comprises latch to store the resulting output of said fuse status sensor and a shift register to transmit said fuse status sensor resulting output via a wireless communication system to a wireless receiver.

55. The fuse box system of claim 41 wherein said fuse status sensor further comprises a retrofit connection for attachment to a circuit breaker screw terminal.

56. The fuse box system of claim 41 wherein said fuse status sensor further comprises a modular form factor compatible with a circuit breaker and further comprising a screw terminal output lug.

57. The fuse box system of claim 41 wherein said fuse status indicator further comprises a power line communications interface for communication of said comparator output over power line wiring to a control computer.

58. The fuse box system of claim 41 wherein said fuse status indicator further comprises X-10 communications capability for communication over power line wiring to a control computer.

59. The fuse box system of claim 41 wherein said fuse status sensor further comprises a load sensor to monitor the load current drawn by said load from said voltage source through said fuse.

60. The fuse box system of claim 41 wherein said fuse status sensor further comprises a load sensor to monitor the load current drawn by said load from said voltage source through said fuse and wherein said load current may be communicated via said fuse status indicator.

61. A fuse box method wherein said method controls a fuse box system comprising:

(a) A fuse status sensor that senses the output voltage status of a fuse and generates an output voltage proportional to said fuse output voltage;

(b) A reference voltage generator that generates a reference voltage proportional to said fuse input voltage;

(c) A comparator that compares said fuse status sensor output voltage to said reference voltage and generates an output based on this comparison;

(d) A fuse status indicator that accepts the output of said comparator and provides a status indication of said fuse based on said comparator output;

(e) fuse settings memory;

(f) fuse current sensor; and (g) fuse crowbar circuitry;

wherein said fuse input voltage is derived from a voltage source;

said fuse output voltage sources a load;

said fuse settings memory specifies a fusing current trip point value;

said fuse current sensor determines the current flowing through said fuse by subtracting said output fuse voltage from said input fuse voltage and dividing said subtraction difference by the resistance of said fuse; and said fuse crowbar circuitry activates a current switch at said load when said current flowing through said fuse exceeds said fusing current trip point value from said fuse settings memory;

with said method comprising the steps of:

(1) Sensing the voltage across said fuse;

(2) Determining the resistance of said fuse;

(3) Calculating the fuse current by dividing said fuse voltage by said fuse resistance;

(4) Determining if said load current is greater than a fuse trip limit, and if not, proceeding to said step (1);

(5) Activating said fuse crowbar circuitry; and (6) Determining if said fuse is blown, and if not, proceeding to said step (5).

62. The fuse box method of claim 61 wherein said fuse status indicator comprises an audible alarm.

63. The fuse box method of claim 61 wherein said fuse status indicator activates an audible alarm if said fuse is determined by said comparator to be blown (failed).

64. The fuse box method of claim 61 wherein said fuse status indicator comprises a light emitting diode (LED).

65. The fuse box method of claim 61 wherein said fuse status indicator illuminates a light emitting diode (LED) if said fuse is determined by said comparator to be blown (failed).

66. The fuse box method of claim 61 wherein said fuse status indicator illuminates a light emitting diode (LED) if said fuse is determined by said comparator to be not blown (operational).

67. The fuse box method of claim 61 wherein the status of said fuse is statically sampled.

68. The fuse box method of claim 61 wherein the status of said fuse is dynamically sampled.

69. The fuse box method of claim 61 wherein said fuse status indicator comprises a controlled current source that incorporates a gated enable to oscillate the illumination of a visual indicator.

70. The fuse box method of claim 61 wherein said fuse status indicator comprises a controlled current source that incorporates a bandgap reference to stabilize the current through a visual indicator.

71. The fuse box method of claim 61 wherein said fuse status indicator comprises a controlled current source that incorporates a bandgap reference with startup circuitry to stabilize the current through a visual indicator.

72. The fuse box method of claim 61 wherein said fuse status indicator comprises a controlled current source that incorporates a bandgap reference with startup circuitry having zero quiescent current consumption to stabilize the current through a visual indicator.

73. The fuse box method of claim 61 wherein said fuse status sensor further comprises an analog multiplexer to permit sampling more than one fuse within an array of fuses.

74. The fuse box method of claim 61 wherein said fuse status indicator further comprises latch to store the resulting output of said fuse status sensor and a shift register to transmit said fuse status sensor resulting output via a wireless communication system to a wireless receiver.

75. The fuse box method of claim 61 wherein said fuse status sensor further comprises a retrofit connection for attachment to a circuit breaker screw terminal.

76. The fuse box method of claim 61 wherein said fuse status sensor further comprises a modular form factor compatible with a circuit breaker and further comprising a screw terminal output lug.

77. The fuse box method of claim 61 wherein said fuse status indicator further comprises a power line communications interface for communication of said comparator output over power line wiring to a control computer.

78. The fuse box method of claim 61 wherein said fuse status indicator further comprises X-10 communications capability for communication over power line wiring to a control computer.

79. The fuse box method of claim 61 wherein said fuse status sensor further comprises a load sensor to monitor the load current drawn by said load from said voltage source through said fuse.

80. The fuse box method of claim 61 wherein said fuse status sensor further comprises a load sensor to monitor the load current drawn by said load from said voltage source through said fuse and wherein said load current may be communicated via said fuse status indicator.

* * * * *